(12) United States Patent
Juniper et al.

(10) Patent No.: US 12,481,012 B2
(45) Date of Patent: Nov. 25, 2025

(54) METHODS AND SYSTEMS FOR IMPROVED RECONSTRUCTION OF MAGNETIC RESONANCE VELOCIMETRY DATA AND A METHOD OF COMPRESSING FLOW DATA OF A FLUID

(71) Applicant: CAMBRIDGE ENTERPRISE LIMITED, Cambridge (GB)

(72) Inventors: Matthew Juniper, Cambridge (GB); Alexandros Kontogiannis, Cambridge (GB)

(73) Assignee: CAMBRIDGE ENTERPRISE LIMITED, Cambridge (GB)

( * ) Notice: Subject to any disclaimer, the term of this patent is extended or adjusted under 35 U.S.C. 154(b) by 161 days.

(21) Appl. No.: 18/291,138

(22) PCT Filed: Aug. 2, 2022

(86) PCT No.: PCT/GB2022/052027
§ 371 (c)(1),
(2) Date: Jan. 22, 2024

(87) PCT Pub. No.: WO2023/012467
PCT Pub. Date: Feb. 9, 2023

(65) Prior Publication Data
US 2025/0004084 A1  Jan. 2, 2025

(30) Foreign Application Priority Data

Aug. 2, 2021 (GB) ........................... 2111141
May 17, 2022 (GB) ........................... 2207201

(51) Int. Cl.
*G01V 3/00* (2006.01)
*G01R 33/56* (2006.01)
*G01R 33/561* (2006.01)

(52) U.S. Cl.
CPC ...... *G01R 33/5611* (2013.01); *G01R 33/5608* (2013.01)

(58) Field of Classification Search
CPC .............. G01R 33/287; G01R 33/4835; G01R 33/5608; A61B 2090/374
(Continued)

(56) References Cited

U.S. PATENT DOCUMENTS 5,408,180 A    4/1995  Mistretta et al.
2012/0076380 A1*  3/2012  Guhring ................. A61B 5/055
                                                  382/131

(Continued)

OTHER PUBLICATIONS

Benning Martin et al, "Phase reconstruction from velocity-encoded MRI measurements—A survey of sparsity-promoting variational approa", Journal of Magnetic Resonance, Academic Press, Orlando, FL, US, vol. 238, Oct. 28, 2013 (Oct. 28, 2013), p. 26-43,XP028670711DOI: 10.1016/J.JMR.2013.10.003 external linkISSN: 1090-7807.

(Continued)

*Primary Examiner* — Walter L Lindsay, Jr.
*Assistant Examiner* — Frederick Wenderoth
(74) *Attorney, Agent, or Firm* — INNOVATION CAPITAL LAW GROUP, LLP; Vic Lin

(57) ABSTRACT

The application relates to methods and systems for reconstructing flow data from Magnetic Resonance Velocimetry data. Reconstruction occurs based on physical considerations of the system, and in particular leverages the Navier-Stokes Equations to provide physically realistic outputs. The application also discloses systems and methods for compressing and decompressing measured flow data of a fluid. The method begins by receiving raw data encoding information in an imaging region I relating to a fluid velocity field. u*, within a subset of the imaging region I forming a region, $\Omega$, enclosed by a boundary, $\delta\Omega$. The boundary (Continued)

includes at least a physical boundary portion, Γ. From this data, a modelled flow field over the region Ω is extracted and a shape of the boundary δΩ is derived along with a kinematic viscosity, ν, of the fluid. The modelled flow field is compressed by representing the flow field with the shape of the boundary, the kinematic viscosity, and inlet and/or outlet boundary conditions where an inlet and/or outlet exists.

20 Claims, 21 Drawing Sheets

(58) Field of Classification Search
USPC .......................................................... 324/309
See application file for complete search history.

(56) References Cited

U.S. PATENT DOCUMENTS

| | | | | |
|---|---|---|---|---|
| 2012/0116206 | A1* | 5/2012 | Miyazaki | G01R 33/5635 600/410 |
| 2014/0149055 | A1 | 5/2014 | Falahatpisheh et al. | |
| 2017/0352151 | A1* | 12/2017 | Spottiswoode | G06T 7/20 |

OTHER PUBLICATIONS

Benning, Martin et al., "Modern regularization methods for inverse problems", Acta Numerica (2018), pp. 1-111 (112 pp).
Corona, Veronica et al., "Joint phase reconstructions and magnitude segmentation from velocity-encoded MRI data", arXiv:1908.05285v1 [eess.IV] Aug. 14, 2019 (22 pp).
Cotter, S L et al., "Bayesian inverse problems for functions and applications to fluid mechanics", IOP Publishing, Inverse Problems 25 (2009) 115008 (44pp).
Donoho, David, "Compressed Sensing", IEEE Transactions On Information Theory, vol. 52, No. 4, Apr. 2006, 1289-1306. (18pp).
Egger H et al, "Enhancement of flow measurements using fluid-dynamic constraints", Journal of Computational Physics, London, GB, vol. 344, May 15, 2017 (May 15, 2017), p. 558-574, XP085052916DOI: 10.1016/J.JCP.2017.04.080 external linkISSN:0021-9991.
Elkins, Christopher J. et al., "Magnetic resonance velocimetry: applications of magnetic resonance imaging in the measurement of fluid motion", Exp Fluids (2007) 43:823-858 (36 pp).
Fukushima, Euchi "Nuclear Magnetic Resonance as a Tool To Study Flow" Annu. Rev. Fluid Mech. 1999. 31:95-123 (30 pp).
Funke, Simon Wolfgang et al., "Variational data assimilation for transient blood flow simulations: Cerebral aneurysms as an illustrative example", Int J Numer Meth Biomed Engng. 2019;35:e3152. (27 pp).
Gillissen, Jurriaan et al., "Data assimilation method to de-noise and de-filter particle image velocimetry data", J. Fluid Mech. (2019), vol. 877, pp. 196-213. (18pp).

Gillissen, Jurriann et al., "A space-time integral minimisation method for the reconstruction of velocity fields from measured scalar fields", J. Fluid Mech. (2018), vol. 854, pp. 348-366. (19 pages).
Hoang, Viet Ha et al., "Determining white noise forcing from Eulerian observations in the Navier-Stokes equation", Stoch PDE: Anal Comp (2014) 2:233-261DOI 10.1007/s40072-014-0028-4 (29pp).
International Search Report & Written Opinion dated Jan. 5, 2023 from PCT Application No. PCT/GB2022/052027.
Katritsis, Demosthenes et al., "Wall Shear Stress: Theoretical Considerations and Methods of Measurement", Progress in Cardiovascular Diseases, vol. 49, No. 5 Mar./Apr. 2007: pp. 307-329 (23 pp).
Koltukluglu, Taha et al., "Harmonic Balance Techniques in Cardiovascular Fluid Mechanics", MICCAI 2019, LNCS 11765, pp. 486-494, 2019. (9 pp).
Koltukluoglu, T.S. "Fourier Spectral Dynamic Data Assimilation: Interlacing CFD with 4D Flow MRI", Seminar for Applied Mathematics, ETH, Zurich, CH, Research Report No. 2019-56, Sep. 2019 (10 pp).
Koltukluoglu, Taha et al., "Boundary control in computational haemodynamics", J. Fluid Mech. (2018), vol. 847, pp. 329-364. (56 pp).
Lustig, Michael et al., "Sparse MRI: The Application of Compressed Sensing for Rapid MR Imaging", Magnetic Resonance in Medicine 58:1182-1195 (2007) (14 pp).
Mantle et al., "Dynamic MRI in chemical process and reaction engineering", Progress in Nuclear Magnetic Resonance Spectroscopy 43 (2003) 3-60 (58pp).
Mons, Vincent et al., "Optimal sensor placement for variational data assimilation of unsteady flows past a rotationally oscillating cylinder", J. Fluid Mech. (2017), vol. 823, pp. 230-277. (48 pp).
Morris, Paul et al., "Computational fluid dynamics modelling in cardiovascular medicine", Heart 2016; 102:18-28. doi: 10.1136/heartjnl-2015-308044 (11pp).
Sankaran, Sethuraman et al., "Uncertainty quantification in coronary blood flow simulations: Impact of geometry, boundary conditions and blood viscosity", Journal of Biomechanics 49 (2016) 2540-2547 (8 pp).
Schmalzl, Jorg "Using standard image compression algorithms to store data from computational fluid dynamics", Computers & Geosciences 29 (2003) 1021-1031 (11 pages).
Sengupta, Ushnish et al, "Simultaneous boundary shape estimation and velocity field de-noising in Magnetic Resonance Velocimetry using Physics-informed Neural Networks", arxiv.org, Cornell University Library, 201 Olin Library Cornell University Ithaca, NY 14853, Jul. 16, 2021 (Jul. 16, 2021),XP091012270.
Sharma, Arjun et al., "Analytic Reconstruction of a Two-Dimensional Velocity Field from an Observed Diffusive Scalar", arXiv:1904.04919v2 [physics.flu-dyn] Apr. 11, 2019 (20 pages).
Stuart, A.M. "Inverse problems: A Bayesian perspective", Acta Numerica (2010), pp. 451-559 (109 pp).
Verma, Siddhartha et al., "Optimal sensor placement or artificial swimmers", J. Fluid Mech. (2020), vol. 884, A24.(29 pp).

* cited by examiner

METHODS AND SYSTEMS FOR IMPROVED RECONSTRUCTION OF MAGNETIC RESONANCE VELOCIMETRY DATA AND A METHOD OF COMPRESSING FLOW DATA OF A FLUID

FIELD OF THE INVENTION

The present invention relates to processing of Magnetic Resonance Velocimetry (MRV) data, including for example to reconstruction of noisy or incomplete data. In addition, techniques described herein relate to compression and decompression of flow fields extracted from such data.

BACKGROUND

Experimental measurements of fluid flows inside or around an object often produce velocity images which contain noise. For example, magnetic resonance velocimetry (MRV) (Fukushima 1999; Mantle & Sederman 2003; Elkins & Alley 2007) can measure all three components of a time varying velocity field as set out in "Nuclear magnetic resonance as a tool to study flow" *Annual Review of Fluid Mechanics* 31, 95-123 (1999), "Dynamic MRI in chemical process and reaction engineering". *Progress in Nuclear Magnetic Resonance Spectroscopy* 43 (1), 3-60 (2003), and "Magnetic resonance velocimetry: applications of magnetic resonance imaging in the measurement of fluid motion" *Experiments in Fluids* 43 (6), 823-858 (2007). However, the measurements become increasingly noisy as the spatial resolution is increased.

To achieve an image of acceptable signal to noise ratio (SNR), repeated scans are often required, leading to long signal acquisition times. To address that problem, fast acquisition protocols (pulse sequences) can be used, but these may be difficult to implement and can lead to artefacts depending on the magnetic relaxation properties and the magnetic field homogeneity of the system studied. Another way to accelerate signal acquisition is by using sparse sampling techniques in conjunction with a reconstruction algorithm. The latter approach is an active field of research, commonly referred to as compressed sensing as discussed in "Compressed sensing" IEEE *Transactions on Information Theory* 52 (4), 1289-1306 (2006), "Sparse MRI: The application of compressed sensing for rapid MR imaging" *Magnetic Resonance in Medicine* 58 (6), 1182-1195 (2007), "Phase reconstruction from velocity-encoded MRI measurements—A survey of sparsity-promoting variational approaches" *Journal of Magnetic Resonance* 238, 26-43 (2014), "Joint phase reconstruction and magnitude segmentation from velocity-encoded MRI data" pp. 1-22, arXiv: 1908.05285 (2019).

Compressed sensing algorithms exploit a priori knowledge about the structure of the data, which is encoded in a regularization norm (e.g. total variation, wavelet bases), but without considering the physics of the problem.

For images depicting fluid flow, a priori knowledge can come in the form of a Navier-Stokes problem. The problem of reconstructing and segmenting a flow image then can be expressed as a generalized inverse Navier-Stokes problem whose flow domain, boundary conditions, and model parameters have to be inferred in order for the modelled velocity to approximate the measured velocity in an appropriate metric space. This approach not only produces a reconstruction that, by construction, is an accurate fluid flow inside or around the object (a solution to a Navier-Stokes problem), but also provides additional physical knowledge (e.g. pressure), which is otherwise difficult to measure.

Inverse Navier-Stokes problems have been intensively studied during the last decade, mainly enabled by the increase of available computing power. Recent applications in fluid mechanics range from the forcing inference problem (discussed in "Determining white noise forcing from Eulerian observations in the Navier-Stokes equation" *Stochastics and Partial Differential Equations: Analysis and Computations* 2 (2), 233-261 (2014)), to the reconstruction of scalar image velocimetry (SIV) (see "A space-time integral minimisation method for the reconstruction of velocity fields from measured scalar fields" *Journal of Fluid Mechanics* 854, 348-366 (2018); "Analytic reconstruction of a two-dimensional velocity field from an observed diffusive scalar" *Journal of Fluid Mechanics* 871, 755-774, arXiv: 1904.04919 (2019)) and particle image velocimetry (PIV) ("Data assimilation method to de-noise and de-filter particle image velocimetry data" *Journal of Fluid Mechanics* 877, 196-213 (2019)) signals, and the identification of optimal sensor arrangements ("Optimal sensor placement for variational data assimilation of unsteady flows past a rotationally oscillating cylinder" *Journal of Fluid Mechanics* 823, 230-277 (2017); "Optimal sensor placement for artificial swimmers" *Journal of Fluid Mechanics* 884, arXiv: 1906.07585 (2019)). Regularization methods that can be used for model parameters are reviewed in "Inverse problems: A Bayesian perspective" *Acta Numerica* 19 451-459. (2010) from a Bayesian perspective and in "Modern regularization methods for inverse problems" *Acta Numerica* 27, 1-111, arXiv: 1801.09922 (2018) from a variational perspective. The well-posedness of Bayesian inverse Navier-Stokes problems is addressed in "Bayesian inverse problems for functions and applications to fluid mechanics" *Inverse Problems* 25 (11) (2009).

Recently, "Boundary control in computational haemodynamics" *Journal of Fluid Mechanics* 847, 329-364 (2018) treats the reduced inverse Navier-Stokes problem of finding only the Dirichlet boundary condition for the inlet velocity that matches the modelled velocity field to MRV data for a steady 3D flow in a glass replica of the human aorta. The authors measure the model-data discrepancy using the $L^2$-norm and introduce additional variational regularization terms for the Dirichlet boundary condition. The same formulation is extended to periodic flows in "Fourier Spectral Dynamic Data Assimilation: Interlacing CFD with 4D Flow MRI." *Tech. Rep.* Research Report No. 2019-56, ETH Zurich. (2019) and in "Harmonic balance techniques in cardiovascular fluid mechanics" In *Medical Image Computing and Computer Assisted Intervention—MICCAI* 2019, pp. 486-494. Cham: Springer International Publishing (2019), which uses the harmonic balance method for the temporal discretization of the Navier-Stokes problem. "Variational data assimilation for transient blood flow simulations: Cerebral aneurysms as an illustrative example" *International Journal for Numerical Methods in Biomedical Engineering* 35 (1), 1-27 (2019) addresses the problem of inferring both the inlet velocity (Dirichlet) boundary condition and the initial condition, for unsteady blood flows and 4D MRV data, with applications to cerebral aneurysms.

The above studies consider rigid boundaries and require a priori an accurate, and time-averaged, geometric representation of the blood vessel or other boundary containing the fluid. To find the shape of the flow domain, e.g. the blood vessel boundaries, computed tomography (CT) or magnetic resonance angiography (MRA) is often used. The acquired image is then reconstructed, segmented, and smoothed. This process not only requires substantial effort and the design of an additional experiment (e.g. CT, MRA), but it also introduces geometric uncertainties ("Computational fluid dynamics modelling in cardiovascular medicine" *Heart* 102 (1), 18-28 (2016); "Uncertainty quantification in coronary blood flow simulations: Impact of geometry, boundary conditions and blood viscosity" *Journal of Biomechanics* 49 (12), 2540-2547 (2016)), which, in turn, affect the predictive confidence of arterial wall shear stress distributions and their mappings ("Wall Shear Stress: Theoretical Considerations and Methods of Measurement" *Progress in Cardiovascular Diseases* 49 (5), 307-329 (2007)).

For example, "Variational data assimilation for transient blood flow simulations: Cerebral aneurysms as an illustrative example" *International Journal for Numerical Methods in Biomedical Engineering* 35 (1), 1-27 (2019) reports discrepancies between the modelled and the measured velocity fields near the flow boundaries, which the authors suspect are caused by geometric errors that were introduced during the segmentation process. In general, the assumption of rigid boundaries either implies that a time-averaged geometry has to be used, or that an additional experiment (e.g. CT, MRA) has to be conducted to register the moving boundaries to the flow measurements.

This application addresses the problem of simultaneous reconstruction and segmentation of velocity fields, to attempt to overcome some or all of the drawbacks of the disclosures discussed above.

SUMMARY OF THE INVENTION

The present application provides a more consistent approach to the problem by treating the blood vessel geometry as an unknown when solving a generalized inverse Navier-Stokes problem. In this way, the inverse Navier-Stokes problem simultaneously reconstructs and segments the velocity fields and can better adapt to the MRV experiment by correcting the geometric errors and improving the reconstruction.

In this application the problem of simultaneous reconstruction and segmentation of velocity fields is addressed by formulating a generalized inverse Navier-Stokes problem, whose flow domain, boundary conditions, and model parameters are all considered unknown. To regularize the problem, a Bayesian framework and Gaussian measures in Hilbert spaces are used. This further allows estimation of the posterior Gaussian distributions of the unknowns using a quasi-Newton method, and thereby to estimate the uncertainties of the unknowns by approximating their posterior covariance with the quasi-Newton method, which has not yet been addressed for this type of problem. An algorithm (or method) for the solution of this generalized inverse Navier-Stokes problem is provided. Detailed demonstrations on synthetic images of 2D steady flows and real MRV images of a steady axisymmetric flow are provided to highlight the quality of the reconstruction.

The methods described herein formulate and solve a generalized inverse Navier-Stokes problem for the joint reconstruction and segmentation of noisy flow velocity images. This amounts to a reduction of the total scanning time. In some examples shown below, there is a reduction in scanning time by a factor of 27, for example. At the same time, the method provides additional knowledge about the physics of the flow (e.g. pressure), and addresses the shortcomings of MRV (low spatial resolution and partial volume effect) that hinder the accurate estimation of wall shear stresses using existing methods. The images derived by the methods disclosed herein may be further post-processed in order to either reveal obscured flow patterns or to extract a quantity of interest (e.g. pressure, wall shear stress, etc.).

Disclosed herein is a computer implemented method for reconstruction of magnetic resonance velocimetry, MRV, data, the method comprising the steps of: (a) receiving MRV data encoding information relating to a fluid velocity field, u*, within a subset of the MRV data forming a region, $\Omega$, enclosed by a boundary, $\partial\Omega$, the boundary including at least a physical boundary portion, $\Gamma$, and optionally further including an inlet portion, $\Gamma_i$, and/or an outlet portion, $\Gamma_o$; and wherein the region $\Omega$ is a subset of an imaging region, I, over which the MRV data encodes information; (b) receiving initial values for a set of unknown parameters, $\{x\}$, including at least: a shape of the boundary, $\partial\Omega$, within which the fluid is located; a kinematic viscosity of the fluid, $\nu$, and optionally an inlet boundary condition for the fluid, $g_i$ where an inlet portion exists; and/or an outlet boundary condition for the fluid, $g_o$ where an outlet portion exists; (c) calculating a model fluid velocity field, $u^o$, using the initial values as inputs to a Navier-Stokes problem, and solving for the velocity field within and at the boundary; (d) constructing an error functional, $\mathcal{J}$, of the form:

$$\mathcal{J} = \mathcal{E} + \mathcal{P} + \mathcal{M}$$

in which $\mathcal{E}$ is a penalty term which penalises deviations in $u^o$ from the received MRV data; $\mathcal{P}$ is a penalty term which penalises outcomes for in $u^o$ which arise from statistically unlikely values for the parameters in the set of unknown parameters, $\{x\}$, and $\mathcal{M}$ is a penalty term which penalises deviations in $u^o$ from the Navier Stokes problem; (e) determining a generalised gradient of $\mathcal{J}$ with respect to each of the unknown parameters in the set $\{x\}$; (f) for each of the unknown parameters in the set $\{x\}$, using the generalised gradient for that parameter, evaluated at the initial value of all of the parameters, to determine a direction in which perturbing each parameter reduces the magnitude of $\mathcal{J}$; and thereby determining improved values for each of the unknown parameters in the set $\{x\}$; and (g) reconstructing the MRV data by outputting the improved values from step (f) and calculating the reconstructed velocity, u, across at least the region $\Omega$.

The MRV data may be supplied "live", i.e. from a measurement taken just prior to the method being enacted on that data, or the method may be performed on MRV data taken at an earlier time, at a different location, etc. Receiving initial values can take many forms. For example, they may be supplied by a user (e.g. in the form of an estimate or best guess), they may be derived from the data by calculation. For example estimates for the boundary location and inlet boundary condition can be obtained from the MRV data itself. The method (sometimes referred to as the algorithm) may include features which automatically estimate the boundary location and/or inlet boundary condition from the MRV data and propose a suitable initial value, or a user may use the data to extract the initial values manually.

"Values" is used here in the most general sense, and includes e.g. functions for boundary conditions and topographical information relating to the location and/or shape of the boundary. In general, "values" refers to a set of values defined over a domain (e.g. along a boundary, or portion of boundary, across the entire imaging area, etc.). Improved values means values which are improved relative to the initial guess. "Improved" in this sense means values for the parameters {x} which result in a lower magnitude of $\mathcal{F}$, , relative to the magnitude of $\mathcal{F}$ calculated with the initial values for the parameters.

In some cases (e.g. 2D imaging of a tube viewed with its axis into/out of the imaging plane, modelling of a complete 3D system), there may not be an inlet or an outlet, and it is in this sense that the inclusion of inlet and/or outlet boundary conditions is optional.

The above procedure uses physics considerations (via the Navier-Stokes equations) and statistical likelihood to reduce the space of suitable reconstructions. In general the direction of change of the unknown parameters which causes a reduction in $\mathcal{F}$ is calculated independently for each parameter, and the collective result of changing all the parameters in their respective direction is assessed by considering whether the collective result also reduces the magnitude of $\mathcal{F}$,. Where a full global inverse Hessian reconstruction is possible to calculate, the directions of change of each parameter could be chosen to guarantee that the collective effect of all changes in parameters is to reduce the magnitude of $\mathcal{F}$.

It is an interesting and unexpected effect that starting with less information (that is by also treating the boundary location as unknown and allowing this to be optimised along with the other unknown parameters) allows for improved image reconstruction. This is important because MRV data is time consuming to obtain and obtaining low noise data is yet more time consuming as many scans must be made and averaged. By providing an efficient and reliable reconstruction algorithm, the overall time to acquire low-noise MRV data can be reduced substantially.

Optionally, the MRV data is raw data in the form of a series of incomplete frequency space data sets, $s_j$; wherein: the method includes the step of calculating the measured velocity field, $u^*$, by performing an inverse Fourier transform on each $s_j$, $F^{-1}$ s and deriving $u^*$ from the arguments of $F^{-1}$ $s_j$; the construction of the error functional modifies the $\mathcal{E}$ penalty term to:

$$\mathcal{E}' = \frac{1}{2n\sigma^2} \sum_{j=1}^{4d} \|s_j - \mathcal{PF}(\rho_j e^{i\varphi_j})\|^2_{l^2(\mathbb{C}^n)}$$

in which j is an index representing each data set, d is the number of physical dimensions in which reconstruction is to occur, $$\frac{1}{2n\sigma^2} \| \ldots \|_{l^2(\mathbb{C}^n)}$$

represents a Euclidean norm in the space of complex numbers ($\mathbb{C}$) representing a multivariate normal distribution, and in which $\sigma$ is the variance of that distribution, $\mathcal{P}$ is a sparse sampling operator mapping reconstructed data back to the sparse raw data space, $\mathcal{F}$ is the Fourier transform operator, $\rho_j$ is the reconstructed magnitude of the $j^{th}$ data set, e is Euler's constant, i=$\sqrt{-1}$ and $\varphi_j$ is the reconstructed phase of the $j^{th}$ data set; the error functional, $\mathcal{F}$,, has the form:

$$\mathcal{F} = \mathcal{E}' + \mathcal{P} + \mathcal{R}_u + \mathcal{M} + \mathcal{S}$$

in which $\mathcal{S}$i is a segmentation term for partitioning the raw data and in which the additional term $\mathcal{R}_u$ has the form:

$$\mathcal{R}_u = \frac{1}{2} \sum_{k=1}^{d} \|u_k^* - Su_k\|^2_{C_{u_k}}$$

where S is the projection from model space to data space, k is an index indicating the physical direction of velocity which is being regularised, d is the number of physical dimensions in which reconstruction is to occur, and $C_{u_k}$ is an appropriate covariance operator for generating a norm in a covariance-weighted $L^2$ space (denoted $\| \ldots \|_C$ for a covariance operator C). The effect of the covariance operator is to introduce Gaussian noise into this penalty term.

This allows a further reduction in time to acquire low noise reliable MRV images, since the MRV data to be processed by the method need not even be fully sampled in k-space because the method can be extended to reconstruct the missing k-space information as well as to derive physically and statistically realistic parameters for the unknown parameters.

Raw data is taken in four scans at different magnetic field gradients per spatial dimension, which is required to extract the phase information (which in turn allows extraction of velocimetry information). Raw data in this example therefore comprises four (incomplete) scans in frequency space per spatial dimension being imaged, i.e. 4, 8, or 12 scans for 1D, 2D, or 3D imaging.

In some cases, this k-space reconstruction may be thought of as a computer implemented method for reconstruction of magnetic resonance velocimetry, MRV, data, the method comprising the steps of: (a) receiving raw MRV data in the form of a series of incomplete frequency space data sets, $s_j$, encoding information relating to a fluid velocity field, $u^*$, within a subset of the MRV data forming a region, $\Omega$, enclosed by a boundary, $\partial\Omega$, the boundary including at least a physical boundary portion, $\Gamma$, and optionally further including an inlet portion, $\Gamma_i$, and/or an outlet portion, $\Gamma_o$; and wherein the region $\Omega$ is a subset of an imaging region, I, over which the MRV data encodes information; (b) receiving initial values for a set of unknown parameters, {x}, including at least: a shape of the boundary, $\partial\Omega$, within which the fluid is located; a kinematic viscosity of the fluid, $v$, and optionally an inlet boundary condition for the fluid, $g_i$ where an inlet portion exists; and/or an outlet boundary condition for the fluid, $g_o$ where an outlet portion exists; (c) calculating a model fluid velocity field, $u^o$, using the initial values as inputs to a Navier-Stokes problem, and solving for the velocity field within and at the boundary and calculating the measured velocity field, $u^*$, by performing an inverse Fourier transform on each $s_j$, $\mathcal{F}^{-1}$ s and deriving $u^*$ from the arguments of $\mathcal{F}^{-1} s_j$; (d) constructing an error functional, $\mathcal{F}$, , of the form:

$$\mathcal{F} = \mathcal{E}' + \mathcal{P} + \mathcal{R}_u + \mathcal{M} + \mathcal{S}$$

in which $\mathcal{E}'$ is a penalty term which penalises deviations in $u^o$ from the received MRV data; $\mathcal{P}$ is a penalty term which penalises outcomes for in $u^o$ which arise from statistically unlikely values for the parameters in the set of unknown parameters, {x}, $\mathcal{M}$i is a penalty term which penalises deviations in $u^o$ from the Navier Stokes problem, $\mathcal{S}$i is a segmentation term for partitioning the raw data and in which $\mathcal{R}_u$ it is a penalty term which penalises deviations in $u^o$ from the calculated measured velocity field $u^*$; (e) determining a generalised gradient of $\mathcal{J}$ with respect to each of the unknown parameters in the set {x}; (f) for each of the unknown parameters in the set {x}, using the generalised gradient for that parameter, evaluated at the initial value of all of the parameters, to determine a direction in which perturbing each parameter reduces the magnitude of $\mathcal{J}$; and thereby determining improved values for each of the unknown parameters in the set {x}; and (g) reconstructing the MRV data by outputting the improved values from step (f) and calculating the reconstructed velocity, u, across at least the region $\Omega$ and reconstructing a phase and magnitude of the received raw data from the reconstructed velocity field, u.

That is, in this example u* is not an input, but the process begins at a step prior to u* being derived from the raw data (this being derived by inverse Fourier transform).

Optionally, $\mathcal{R}_u$, has the form:

$$\mathcal{R}_u = \frac{1}{2}\sum_{k=1}^{d}\|u_k^* - Su_k\|_{C_{u_k}}^2$$

where S is the projection from model space to data space in which, k is an index indicating the physical direction of velocity which is being regularised, d is the number of physical dimensions in which reconstruction is to occur, and $C_{u_k}$ is an appropriate covariance operator for generating a norm in a covariance-weighted $L^2$ space (denoted $\|\ldots\|_C$ for a covariance operator C). The effect of the covariance operator is to introduce Gaussian noise into this penalty term.

Optionally, the $\mathcal{E}$ penalty term has the form:

$$\mathcal{E} = \frac{1}{2n\sigma^2}\sum_{j=1}^{4d}\|s_j - \mathcal{PF}(\rho_j e^{i\varphi_j})\|_{\ell^2(\mathbb{C}^n)}^2$$

where n is the number of samples (and is less than the dimension of frequency space in which samples are taken, which defines the "sparse sampling" condition) j is an index representing each data set, d is the number of physical dimensions in which reconstruction is to occur, $$\frac{1}{2n\sigma^2}\|\ldots\|_{\ell^2(\mathbb{C}^n)}$$

represents a Euclidean norm in the space of complex numbers representing a multivariate normal distribution, and in which $\sigma$ is the variance of that distribution, $\mathcal{P}$ is a sparse sampling operator mapping reconstructed data back to the sparse raw data space, $\mathcal{F}$ is the Fourier transform operator, $\rho_j$ is the reconstructed magnitude of the $j^{th}$ data set, e is Euler's constant, $i=\sqrt{-1}$ and $\varphi_j$ is the reconstructed phase of the $j^{th}$ data set.

Either of the above methods may incorporate any of the following additional refinements.

Optionally, the Navier-Stokes problem constrains u such that u satisfies:

$$u \cdot \nabla u - v\Delta u + \nabla p = 0 \quad \text{in } \Omega \quad \text{(i)}$$

$$\nabla \cdot u = 0 \quad \text{in } \Omega \quad \text{(ii)}$$

$$u = 0 \quad \text{on } \Gamma \quad \text{(iii)}$$

$$u = g_i \quad \text{on } \Gamma_i \text{ where an inlet exists} \quad \text{(iv)}$$

$$-v\partial_n u + pn = g_o \quad \text{on } \Gamma_o \text{ where an outlet exists} \quad \text{(v)}$$

wherein p is the reduced pressure, $p_0/\rho$, $\rho$ is a density of the fluid, $p_0$ is the pressure, n is a unit normal vector on $\partial\Omega$, and $\partial_n \equiv n \cdot \nabla$ is a normal derivative on $\partial\Omega$.

This format ensures that the physics of fluid flows is captured and the possible results space is thereby constrained to physically realistic solutions.

Optionally the $\mathcal{M}$ penalty term includes Nitsche penalty terms for weakly imposing a Dirichlet boundary condition on at least a portion of the boundary, $\partial\Omega = \Gamma \cup \Gamma_i \cup \Gamma_o$.

This allows the fluid flow to be modelled accurately by implementing appropriate boundary conditions at specific parts of the boundary.

Optionally, the error functional, $\mathcal{J}$, is minimised using Euler-Lagrange equations, constrained to spaces of admissible perturbations in u and p, denoted u' and p' respectively, where p is the reduced pressure, $p_0/\rho$, where $\rho$ is a density of the fluid and $p_0$ is the pressure.

Euler-Lagrange equations are a powerful method, suitable for identifying the directions in which input parameters should be perturbed in order to reduce the error functional.

The Euler-Lagrange equations may be formed by considering the first variations of the $\mathcal{M}$ and $\mathcal{E}$ penalty terms with respect to {x} u and p.

This allows the effect of perturbations in the parameters which affect the $\mathcal{M}$ and $\mathcal{E}$ penalty terms to be considered. Since the $\mathcal{R}$ penalty term does not depend on u and p, there is no variation of $\mathcal{R}$ with respect to these parameters.

First variations of the $\mathcal{M}$ and $\mathcal{E}$ penalty terms may be used to provide an adjoint Navier-Stokes problem:

$$-u \cdot (\nabla v + (\nabla v)^\dagger) - v\Delta v + \nabla q = -D_u \mathcal{E} \quad \text{in } \Omega \quad \text{(vi)}$$

$$\nabla \cdot v = 0 \quad \text{in } \Omega \quad \text{(vii)}$$

$$v = 0 \quad \text{on } \Gamma \text{ and } \Gamma_i \text{ where an inlet exists} \quad \text{(viii)}$$

$$(u \cdot n)v + (u \cdot v)n + v\partial_n v - qn = 0 \quad \text{on } \Gamma_o \text{ where an outlet exists;} \quad \text{(ix)}$$

in which v is an adjoint velocity and q an adjoint pressure, $(\nabla v)^\dagger$ represents the adjoint of $(\nabla v)$, and $D_u \mathcal{E}$ is a generalised gradient of $\mathcal{E}$ with respect to u.

The adjoint problem is a useful step in elucidating the effect of changes in the input parameters on the error functional. By solving the adjoint equation the generalised gradients can be efficiently calculated.

Optionally, the calculation of the $\mathcal{E}$ penalty term is based on the norm of the difference between the MRV velocity data, u*, and the reconstructed velocity field, u, mapped onto the space of the MRV velocity data, the norm being based on a covariance operator. This is a simple yet effective means by which the reconstructed velocity data can be constrained to be consistent with the measured MRV data.

The MRV data may be assumed to have a Gaussian noise variance and the $\mathcal{E}$ penalty term is calculated as:

$$\mathcal{E}(u) = \frac{1}{2}\|u^* - Su\|_{C_{u^*}}^2$$

in which $\|\ldots\|_C$ represents a norm in a covariance-weighted $L^2$ space having covariance operator C, S projects from the model space to the data space, and the covariance operator $C_{u^*}$ introduces the Gaussian noise variance into the $\mathscr{E}$ penalty term. This format provides a clear and well-behaved model for noise inherent in the MRV data.

Optionally the calculation of the $\mathscr{R}$ penalty term includes assuming that some or all of the unknown parameters follows a Gaussian distribution of likelihood and improbable realisations are penalised by forming $\mathscr{R}$ as a linear sum of an error functional term for each unknown parameter in the set {x} which is assumed to have a Gaussian distribution of the form:

$$\mathscr{R}(x) = \frac{1}{2}\|x - \bar{x}\|_C^2$$

in which x represents any of the unknown parameters which is assumed to have a Gaussian distribution, $\bar{x}$ represents a prior value for that unknown parameter, and C is an appropriate covariance operator for that unknown parameter. In other words, the prior value of a parameter is the initial value of that parameter, which is then updated as the algorithm is executed.

Once more, the Gaussian format is one which results in clear and well-behaved functions for modelling and provides a firm statistical basis for constraining the space of possible reconstructions to statistically plausible ones.

Optionally the covariance operator for the boundary condition at the inlet, $C_{g_i}$, in cases where an inlet exists, is:

$$C_{g_i} = \sigma_{g_i}^2 (I - \ell^2 \tilde{\Delta}_i)^{-1}$$

in which $\sigma_{g_i}$ is the variance of $g_i$, $\ell$ is a characteristic length scale of an exponential covariance function, I is the identity matrix and $\tilde{\Delta}_i$ is the Laplacian operator extended to incorporate the boundary condition that $g_i=0$ on $\Gamma_i$, and/or the covariance operator for the boundary condition at the outlet, $C_{g_o}$, in cases where an outlet exists, is:

$$C_{g_o} = \sigma_{g_o}^2 (I - \ell^2 \tilde{\Delta}_o)^{-1}$$

in which $\sigma_{g_o}$ is the variance of $g_o$, $\ell$ is a characteristic length scale of an exponential covariance function, I is the identity matrix and $\tilde{\Delta}_o$ is the Laplacian operator extended to incorporate the boundary condition that $\partial_n g_o = 0$ on $\Gamma_o$.

These forms for covariance operators are suitable for encoding the boundary conditions into the respective penalty terms and which in turn ensure that the space of possible reconstructions is constrained to appropriate outputs.

Optionally the shape of the boundary is perturbed under a speed field $\mathscr{V} = \zeta n$, in which $\zeta$ represents the magnitude of the speed at which points on the boundary are perturbed and n is the unit vector normal to each point on the boundary. This provides a convenient formalism to describe the location of the boundary and to implement changes in the location of the boundary. As an example, the perturbations of the shape of the boundary may be implemented using Reynold's transport theorem.

Optionally, any boundary which is an inlet or an outlet is not perturbed. This may be a useful feature to reduce the complexity of the perturbations in cases where, for example, the inlet and/or the outlet aligns with the edge of the imaging region, so that the location of this part of the boundary is defined as being located in the same place (at the edge of the imaging area).

Optionally the perturbation of the shape of the boundary is used to derive a shape derivatives problem defined over the permissible perturbations of u and p, denoted u' and p', respectively, the shape derivatives problem having the form:

| | | |
|---|---|---|
| (x) | $-u' \cdot \nabla u + u \cdot \Delta u' - \nu \Delta u' + \nabla p' = 0$ | in $\Omega$ |
| (xi) | $\nabla \cdot u' = 0$ | in $\Omega$ |
| (xii) | $u' = -\partial_n u (\mathscr{V} \cdot n)$ | on $\Gamma$ |
| (xiii) | $u' = 0$ | on $\Gamma_i$ where an inlet exists |
| (xiv) | $-\nu \partial_n u' + p' n = 0$ | on $\Gamma_o$ where an outlet exists |

The solutions to this problem provide a convenient framework for assessing the effect of the boundary shape perturbations on the other parameters.

Optionally the boundary is represented implicitly by signed distance functions, $\varphi_\pm$ defined across the imaging region, I, in which the boundary is represented by parts of $\varphi_\pm$ which are equal to zero, and the magnitude of $\varphi_\pm$ at a given point represents a shortest distance between that point and the boundary.

For example, the signed distance function may be negative inside the boundary (region $\Omega$), and positive outside that region. The other way around (positive inside, negative outside) is of course possible if appropriate corresponding changes of sign are included in later expressions derived from the signed distance function. This implicit representation of the boundary location provides a simple yet powerful method of deforming (perturbing) the boundary and determining the effect of the perturbations on the other parameters.

The normal vector, n, may be propagated across a region corresponding to the full set of MRV data to form a normal vector field, n which runs perpendicular to contours of equal magnitude of $\varphi_\pm$. Similarly, the shape gradient may be extended away from the boundary to form an extended shape gradient, $\zeta$, covering the full set of MRV data, wherein the extension of the shape gradient comprises propagating the shape gradient along the normal vector field lines according to a convection-diffusion equation.

This propagation extends the domain of the shape gradient and the normal vector from their definitions only on the boundary to the entire imaging region. This in turn provides a general framework for understanding the effect of the boundary being located in any part of the imaging region.

Optionally the direction of perturbation of each parameter is in a direction of steepest change in $\mathscr{J}$. By perturbing the parameters in their direction of steepest change, the largest effect will be seen on the magnitude of $\mathscr{J}$. In other words, this may maximise the improvement (maximise the reduction in $\mathscr{J}$) seen in making a change to a particular value of a parameter. Note that in some cases, the appropriate direction of change may not be exactly aligned with the direction of steepest change in $\mathscr{J}$, since considering the effect of each parameter on $\mathscr{J}$ individually ignores the combined effect of changing multiple parameters at once.

Various approaches can be used to determine the "direction of steepest change", for example, the "steepest descent" method, the Broyden-Fletcher-Goldfarb-Shanno (BFGS) algorithm, conjugate gradient methods, and so forth.

Optionally, the direction of steepest change of $\mathscr{J}$ is derived by reconstructing an inverse Hessian $\tilde{H}$ matrix for each unknown parameter in the set {x}, and wherein the direction of steepest change of $\mathscr{J}$ is preconditioned by the reconstructed inverse Hessian matrix.

The direction of steepest change may be thought of as the steepest descent direction, which is given by the generalised gradients of $\mathscr{J}$. with respect to the unknown parameters. The search direction for each of the unknown parameter in the set {x} may be derived by reconstructing an approximated Hessian matrix.

Optionally the perturbation direction, s, for each individual unknown parameter in the set {x} is given by $-\tilde{H}_x \hat{D}_x \mathscr{J}$ where $\hat{D}_x$ is the steepest ascent direction of $\mathscr{J}$ for perturbations in parameter x, and $\tilde{H}_x$ is the reconstructed inverse Hessian of each unknown parameter in the set {x}, for example.

The reconstructed inverse Hessian $\tilde{H}_x$ of each unknown parameter in the set {x} may be used to provide an approximated covariance matrix for the unknown parameters thereby to estimate the uncertainties in the model parameters. The estimation of uncertainties is important for validating the output result. For example, the uncertainty can be used to assess an appropriate level of trust in the data. Thus, not only is a user provided with a reconstructed velocity field which can be used as the basis for making decisions (whether and how to operate on a patient where the data is medical, how to best optimise design of a system for e.g. mechanical systems, etc.), but also with an indication of how likely their decision is to be based on correct information. Where the errors are too large, the user may be faced with too great an uncertainty in the output data and may elect instead to repeat the data acquisition and/or the processing (e.g. with different weightings and model parameters) to try to improve the situation.

Optionally the reconstructed velocity, u, is updated by solving an Oseen problem for the improved parameters:

$$u_k \cdot \nabla u_{k+1} - \nu \Delta u_{k+1} + \nabla p_{k+1} = 0$$

$$\nabla \cdot u' = 0$$

with boundary conditions:

| | |
|---|---|
| $u = 0$ | on $\Gamma$ |
| $u = g_i$ | on $\Gamma_i$ where an inlet exists |
| $-\nu \partial_n u + pn = g_o$ | on $\Gamma_o$ where an outlet exists | in which k is an index to distinguish input values at k and improved values at k+1, p is the reduced pressure, $p_0/\rho$, $\rho$ is a density of the fluid, $p_0$ is the pressure, n is a unit normal vector on $\partial \Omega$, and $\partial n \equiv n \cdot \nabla$ is a normal derivative on $\partial \Omega$.

The updated parameters set, $\{x\}_{k+1}$, does not contain the updated velocity field $u_{k+1}$. The updated model parameters $\{x\}_{k+1}$ are used to compute the updated velocity field $u_{k+1}$. Since the Navier-Stokes problem is nonlinear, the Oseen problem, which is a linearization of the Navier-Stokes problem around $u_k$, is considered instead. To make an analogy: if the reconstructed velocity field u is a parametric curve, the set {x} contains its parameters. Computation of $u(x_{k+1})$ is necessary to find the new $u_{k+1}$.

Optionally steps (c) to (f) are repeated one or more times whereby the improved values of the unknown parameters from a preceding iteration are used in place of the initial values in each subsequent execution of steps (c) to (f); and wherein step (g) uses the improved values from the most recent iteration to calculate the reconstructed u.

By iterating the procedure, a gradual improvement in the output is seen. Over time, the process is expected to converge to a particular output, at which point the procedure fails to continue to improve the outputs (i.e. fails to continue reducing the magnitude of $\mathscr{J}$).

Optionally, each unknown parameter is adjusted a respective first step size in its respective direction during the first iteration of the method and a subsequent step size during each subsequent iteration of the method.

As noted above the direction in which each parameter is perturbed may be determined using various methods. To consider two of these: (i) simple gradient descent; and (ii) reconstructing an inverse Hessian matrix and use a preconditioned gradient descent (the BFGS algorithm). The second option allows the estimation of uncertainties, while the first does not.

If the user selects the simple gradient descent, the strategy for the step size may be chosen as follows: start with a step size t and if the line search is unsuccessful set $t_{k+1}=0.5 \cdot t_k$ and repeat the line search. If the line search is successful set $t_{k+1}=1.5 t_k$.

If the user selects BFGS, start every line-search with t=1 (i.e. each iteration's line search starts with t=1). If the line-search fails, set $t_{k+1}=0.5 t_k$ and repeat the line search.

Optionally, each subsequent step size is chosen to increase the rate at which $\mathscr{J}$ is reduced.

For example, where the rate at which $\mathscr{J}$ is reduced is too slow, the user may elect to (temporarily) increase the step size. In this way an adaptive step size can be selected to cause $\mathscr{J}$ to reduce as quickly as possible.

In other cases, the step size may be constrained to always reduce in subsequent iterations from the step size of the previous iteration. For example, the step change may reduce each time e.g. constant fraction, e.g. always ½, ⅓, ⅔ etc.

Optionally, steps (c) to (f) of the method are repeated until a stop condition is met. Optionally the stop condition is that $\mathscr{J}$ does not reduce further or where a covariant weighted norm for the perturbations in the unknown parameters is below a user-specified threshold.

Optionally the method includes outputting values of p, the pressure field, and the improved values for the unknown parameters in the set {x} as part of step (g).

Optionally, the reconstruction uses an immersed boundary finite element method. This is a suitable framework in which to apply the methods described herein because it is a natural environment in which to apply the methods, which is also well-studied and mathematically rigorous.

Optionally, a magnitude value of Magnetic Resonance Imaging (MRI) data is used as an input to provide an initial value for the shape of the boundary, $\partial \Omega$. MRI is a useful technique for imaging of a wide range of materials such as those from which a boundary may be formed and fluids which may be flowing within the boundary. MRI is non-invasive and is therefore particularly suitable for biological applications, including in vivo measurements. By directly measuring the shape of the boundary, good input data can be provided to improve the certainty and speed of the convergence process. As noted elsewhere in this document MRV data requires at least four measurements per dimension of the region of interest. By contrast, MRI data on the equivalent region can be derived by a single raster scan of the pixels (or voxels) in the region of interest.

Optionally, the magnitude value of the magnetic resonance velocimetry data is extracted from the magnetic velocimetry data. This allows the location of the boundary to be extracted from the exact same data set as that from which the flow data is extracted, thereby improving the correspondence between the initial value and the "true" location of the boundary. In cases where the same input MRI data are used for the velocimetry (e.g., phase contrast MRI) as for the initial boundary location (the magnitude of the MRI signal(s)), the convergence rate of the methods set out herein is improved since a very reliable prior for the boundary shape/location is provided. In some cases, since the MRV dataset includes multiple measurements to extract the flow information, the magnitude data may be used to extract the boundary location from more than one or even from all measurements forming part of the MRV dataset to improve confidence in the input shape of the boundary. Optionally suitable averaging or other ways of combining the information may be used to improve the accuracy of the boundary location when multiple data sets are used to derive the boundary location. This results in a higher signal-to-noise ratio for boundary locations extracted in this manner. In yet further examples the magnitude value of the magnetic resonance data is extracted from a separate magnetic resonance imaging dataset.

The methods set out above may further comprise a step of providing a compressed form of the modelled flow field, the compressed form being represented by the shape of the boundary, the kinematic viscosity, and the inlet and/or outlet boundary conditions where an inlet and/or outlet exists. Optionally, this compression step may further comprise discarding the modelled flow field and retaining only the compressed form. Once the compressed form is provided, a further decompression step may optionally further include decompressing the compressed form by: using $\partial\Omega$, v, $g_i$ and $g_o$ as inputs to a Navier-Stokes problem; and calculating the modelled flow field by solving the Navier Stokes problem to derive a flow field consistent with the inputs and the Navier-Stokes equations. The decompression may be performed in a remote location and/or at a later time relative to the compression step, for example. The benefits of the compression and decompression aspects are set out in more detail below.

Also disclosed herein is a computer implemented method for compressing flow data of a fluid, the method comprising the steps of: receiving raw data encoding information in an imaging region I relating to a fluid velocity field, u*, within a subset of the imaging region I forming a region, $\Omega$, enclosed by a boundary, $\partial\Omega$, the boundary including at least a physical boundary portion, $\Gamma$, and optionally further including an inlet portion, $\Gamma_i$, and/or an outlet portion, $\Gamma_o$; extracting from the data a modelled flow field over the region $\Omega$, a shape of the boundary $\partial\Omega$, enclosing the region $\Omega$, a boundary condition, $g_i$, at an inlet where an inlet exists, a boundary condition, $g_o$, at an outlet where an outlet exists and a kinematic viscosity, v, of the fluid; and providing a compressed form of the modelled flow field, the compressed form being represented by the shape of the boundary, the kinematic viscosity, and the inlet and/or outlet boundary conditions where an inlet and/or outlet exists.

As will be clear, any flow field can be compressed by extracting the set of parameters $\{x\} \equiv \{\partial\Omega; g_i; g_o; v\}$ from the flow data. This represents a large reduction in the space needed for storage of the flow field, in effect trading off reduced storage space (or transmission bandwidth) for increased processor usage in retrieving the full flow field because instead of simply loading the flow field data, the system must recreate it by solving a Navier-Stokes problem, using the compressed form as inputs. It can be seen in this way that the compression and decompression methods (and the corresponding compression and decompression hardware and software) operate as a plurality of interrelated products in the sense that they are intended to interoperate and to be used in conjunction with one another.

That the dataset of the compressed data is smaller than the full flow field can be seen from an analysis of the dimensionality of the system. A full flow field over the region $\Omega$ requires storing flow vectors (at the desired resolution/accuracy) for all points across the region. Note that where a full 3D analysis is performed, $\Omega$ is a 3D volume, while where the analysis is 2D, $\Omega$ is an area. By contrast the boundary $\partial\Omega$ of a 3D $\Omega$ is a 2D surface (albeit usually a curved one requiring 3 dimensions to represent) while the boundary $\partial\Omega$ of a 2D $\Omega$ is a 1D line (albeit usually a curved one requiring 2 dimensions to represent). It is clear that the boundary conditions also follow this pattern. In other words, where the flow field is modelled over a region having dimensionality d leads to compressed form of the modelled flow field which has a dimensionality of d-1. Reducing the dimensionality vastly reduces the complexity of the storage requirements of a d-dimensional flow field from $O(n^d)$ to $O(n^{d-1})$ where the kinematic viscosity is assumed to be constant over the region so has an effective dimensionality of 0.

Note that usually, the kinematic viscosity, v, is not a function of space, it is either a constant or a tensor (matrix) that depends on the velocity and certain physical constants. In certain cases, the viscosity may be more complex than this, for example in turbulence modelling, viscosity may be effectively variable in space. However, this variation in space would be controlled by a turbulence model which once more contains just a few physical parameters. Therefore, even though turbulent flows are not the focus of the present work, for under-resolved turbulent flow the compression/decompression methods set out herein would apply in the same general manner but with an additional a turbulence model. This slightly increases the complexity of the v term in the compressed flow, but nevertheless results still in a large reduction in the storage and/or bandwidth requirements for storage and/or transmission respectively of the compressed flow field.

In this way, the richness of the flow field can be captured in a compressed form requiring far less storage or transmission capacity. In general the compression and decompression aspects set out herein can use the data provided by the MRV methods set out above, although this is not necessary. However, when the MRV methods set out herein are used, a synergistic benefit is seen. Since the methods for extracting flow filed data set out herein lead to a set of parameters $\{x\}$ in which a high degree of confidence can be placed, the compression of this data is highly effective since the high-accuracy parameters derived in this way capture a large amount of information related to the flow field. Much of the same concepts can be used in decompressing the data later, as will be seen.

Once the data are compressed in this way, the modelled flow field may be discarded.

The method may be repeated on a series of received raw data sets, each raw data set representing the same system at different times. A full time evolution of a system represents a very large dataset and in some cases the data handling requirements of such a system may be prohibitive. By compressing each time step of the data much more can be captured of the time evolution of the system.

As noted above the raw data may be derived from a Magnetic Resonance Velocimetry measurement. In particular extracting the modelled flow field may include: receiving initial values for a set of unknown parameters, {x}, including at least: a shape of the boundary, $\partial\Omega$, within which the fluid is located; a kinematic viscosity of the fluid, v, and optionally an inlet boundary condition for the fluid, $g_i$ where an inlet portion exists; and/or an outlet boundary condition for the fluid, $g_o$ where an outlet portion exists. Receiving initial values of the unknown parameters {x} may further include performing a separate measurement of one or more of the parameters. An initial value of the shape of the boundary may be provided by a magnetic resonance imaging measurement. As noted above, this can improve the accuracy of the process. The method may further include calculating a model fluid velocity field, $u^o$, using the initial values as inputs to a Navier-Stokes problem, and solving for the velocity field within and at the boundary. In some cases, method includes constructing an error functional, $\mathcal{J}$ is constructed, having the form:

$$\mathcal{J} = \mathcal{E} + \mathcal{P} + \mathcal{M}$$

in which $\mathcal{E}$ is a penalty term which penalises deviations in $u^o$ from the received MRV data; $\mathcal{P}$ is a penalty term which penalises outcomes for in $u^o$ which arise from statistically unlikely values for the parameters in the set of unknown parameters, {x}, and $\mathcal{M}$ is a penalty term which penalises deviations in $u^o$ from the Navier Stokes problem, and the method includes: determining a generalised gradient of $\mathcal{J}$ with respect to each of the unknown parameters in the set {x}; for each of the unknown parameters in the set {x}, using the generalised gradient for that parameter, evaluated at the initial value of all of the parameters, to determine a direction in which perturbing each parameter reduces the magnitude of $\mathcal{J}$ and thereby determining improved values for each of the unknown parameters in the set {x}; and reconstructing the MRV data by outputting the improved values for the unknown parameters and calculating the reconstructed velocity, u, across at least the region $\Omega$.

In some cases (e.g. 2D imaging of a tube viewed with its axis into/out of the imaging plane, modelling of a complete 3D system), there may not be an inlet or an outlet, and it is in this sense that the inclusion of inlet and/or outlet boundary conditions is optional.

The above procedure uses physics considerations (via the Navier-Stokes equations) and statistical likelihood to reduce the space of suitable reconstructions. In general the direction of change of the unknown parameters which causes a reduction in $\mathcal{J}$ is calculated independently for each parameter, and the collective result of changing all the parameters in their respective direction is assessed by considering whether the collective result also reduces the magnitude of $\mathcal{J}$. Where a full global inverse Hessian reconstruction is possible to calculate, the directions of change of each parameter could be chosen to guarantee that the collective effect of all changes in parameters is to reduce the magnitude of $\mathcal{J}$.

It is an interesting and unexpected effect that starting with less information (that is by also treating the boundary location as unknown and allowing this to be optimised along with the other unknown parameters) allows for improved image reconstruction. This is important because MRV data is time consuming to obtain and obtaining low noise data is yet more time consuming as many scans must be made and averaged. By providing an efficient and reliable reconstruction algorithm, the overall time to acquire low-noise MRV data can be reduced substantially. This allows high quality values for the parameters {x} to be derived, which in turn means that the compressed form of the modelled flow field retains a high level of accuracy.

The method steps may be repeated one or more times whereby the improved values of the unknown parameters from a preceding iteration are used in place of the initial values in each subsequent execution; and wherein the reconstructing step uses the improved values from the most recent iteration to calculate the reconstructed u. By iterating the procedure, a gradual improvement in the output is seen. Over time, the process is expected to converge to a particular output, at which point the procedure fails to continue to improve the outputs (i.e. fails to continue reducing the magnitude of $\mathcal{J}$).

Each unknown parameter may be adjusted a respective first step size in its respective direction during the first iteration of the method and a subsequent step size during each subsequent iteration of the method. As noted above the direction in which each parameter is perturbed may be determined using various methods. To consider two of these: (i) simple gradient descent; and (ii) reconstructing an inverse Hessian matrix and use a preconditioned gradient descent (the BFGS algorithm). The second option allows the estimation of uncertainties, while the first does not. If the user selects the simple gradient descent, the strategy for the step size may be chosen as follows: start with a step size t and if the line search is unsuccessful set $t_{k+1}=0.5*t_k$ and repeat the line search. If the line search is successful set $t_{k+1}=1.5t_k$. If the user selects BFGS, start every line-search with t=1 (i.e. each iteration's line search starts with t=1). If the line-search fails, set $t_{k+1}=0.5t_k$ and repeat the line search.

Each subsequent step size may be chosen to increase the rate at which $\mathcal{J}$ is reduced. For example, where the rate at which $\mathcal{J}$ is reduced is too slow, the user may elect to (temporarily) increase the step size. In this way an adaptive step size can be selected to cause $\mathcal{J}$ to reduce as quickly as possible.

In other cases, the step size may be constrained to always reduce in subsequent iterations from the step size of the previous iteration. For example, the step change may reduce each time e.g. constant fraction, e.g. always ½, ⅓, ⅔ etc.

Optionally, the method steps are repeated until a stop condition is met, optionally wherein the stop condition is that $\mathcal{J}$ does not reduce further or where a covariant weighted norm for the perturbations in the unknown parameters is below a user-specified threshold.

Optionally, the method further comprises storing or transmitting to a remote location the compressed form of the modelled flow field.

A corresponding computer implemented method of decompressing a compressed modelled flow field of measured flow data of a fluid is also disclosed. The compressed flow data includes a shape of a boundary, $\partial\Omega$, of a region, $\Omega$, in which the flow field is defined, a kinematic viscosity, v, of the fluid, and an inlet boundary condition, $g_i$, and/or an outlet boundary condition, $g_o$, where an inlet and/or outlet exists, and the decompression method comprising the steps of: using $\partial\Omega$, v, $g_i$ and $g_o$ as inputs to a Navier-Stokes problem; and calculating the modelled flow field by solving the Navier Stokes problem to derive a flow field consistent with the inputs and the Navier-Stokes equations. Note that this allows the storage of a full flow field in its compressed format, by storing the set of parameters. In particular, the compressed modelled flow field may be derived from the compression methods set out above. This is particularly advantageous as there are few, if any, other known methods of providing high quality information on the unknown parameters {x}. Consequently, the disclosure of the present document as a whole represents a complete solution which is simply not possible using methods for analysing flow data other than those set out herein. Moreover, since no existing methods exist which allow the data to be compressed in the manner set out above, the decompression step inherently and independently makes an inventive contribution to the art because decompression of compressed data derived from real world measurements simply isn't possible with a reasonable degree of accuracy unless high quality value for the parameters {x} are available.

As will be apparent, the compression method set out above may be followed by at least one of a transmission or a storage step of the compressed form of the flow field, followed by the decompression method set out above, applied to the compressed form of the flow field at a later time and/or a different location.

Also disclosed herein is an apparatus for reconstruction of magnetic resonance velocimetry, MRV, data, the apparatus comprising: a processor configured to perform any of the method steps set out above.

The apparatus may further comprise a magnetic resonance imaging system, arranged to provide the MRV data.

Also disclosed herein is a non-transient computer readable medium comprising instructions which cause a computer to enact any of the method steps set out above.

The systems and methods described above may be applied to any MRV data, for example to medical MRV data, but also to non-medical MRV data (e.g. petrochemical, monitoring of flows in pipelines and other fluid delivery infrastructure). That is to say that without loss of generality, the invention may be segregated into medical uses and non-medical uses.

BRIEF DESCRIPTION OF THE FIGURES

The invention will now be described with reference to the Figures, by way of illustration only, in which.

DETAILED DESCRIPTION

Figure 1:
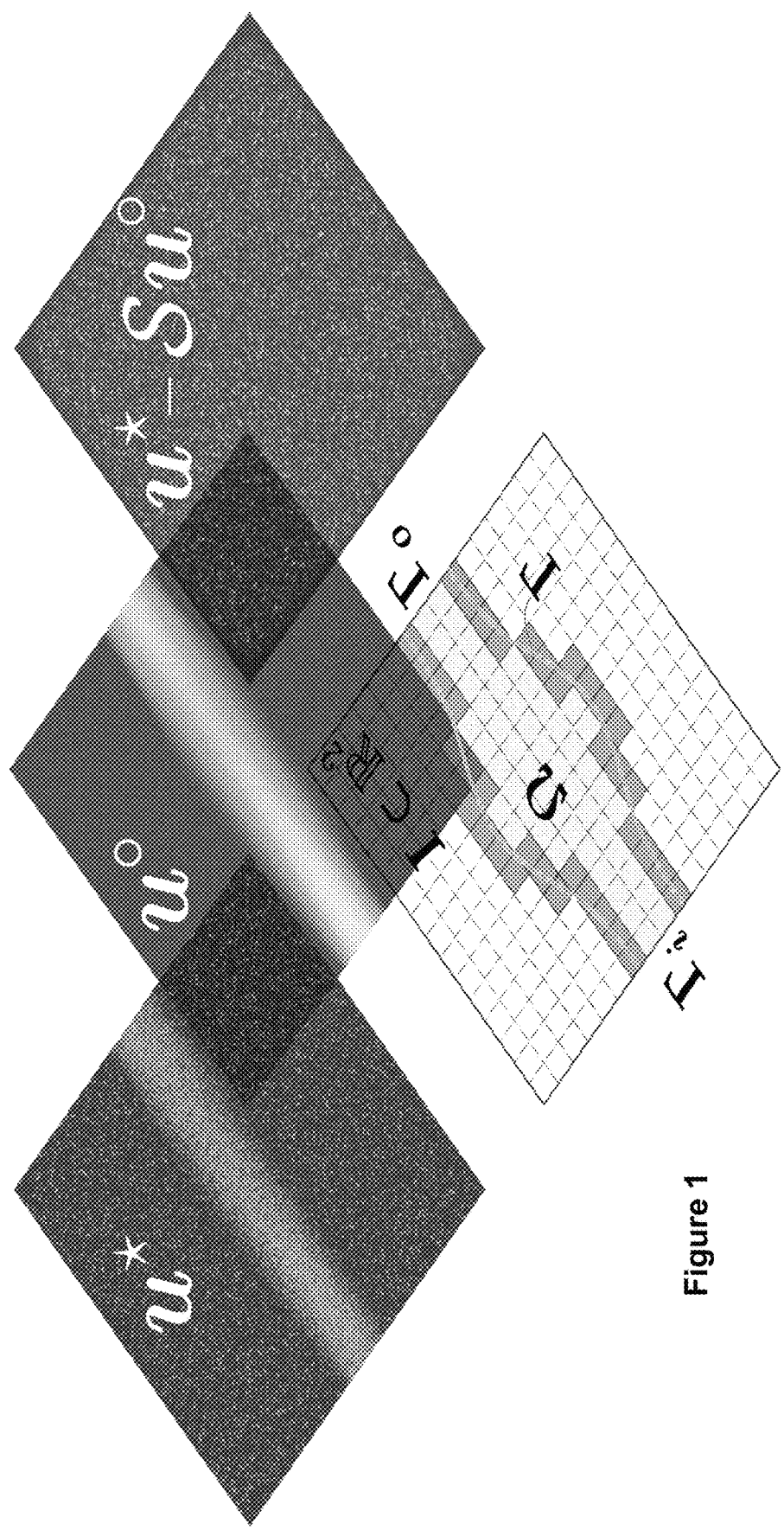
FIG. 1 shows a schematic of the imaging space and introduces the various different spaces (data space, model space, extracted noise)

A generalized inverse Navier-Stokes problem for the joint reconstruction and segmentation of noisy velocity images of incompressible flow is described below. To regularize the inverse problem, a Bayesian framework is adopted by assuming Gaussian prior distributions for the unknown model parameters. Although the inverse problem is formulated using variational methods, every iteration of the nonlinear problem is actually equivalent to a Gaussian process in Hilbert spaces. The boundaries of the flow domain are implicitly defined in terms of signed distance functions and use Nitsche's method to weakly enforce the Dirichlet boundary condition on the moving front. The moving of the boundaries is expressed by a convection-diffusion equation for the signed distance function, which allows control of the regularity of the boundary by tuning an artificial diffusion coefficient. The steepest ascent directions of the model parameters are used in conjunction with a quasi-Newton method (BFGS), and it is shown how the posterior Gaussian distribution of a model parameter can be estimated from the reconstructed inverse Hessian.

An algorithm for running on a computer is devised that solves this inverse Navier-Stokes problem and is tested for noisy (SNR=3) 2D synthetic images of Navier-Stokes flows. The algorithm successfully reconstructs the velocity images, infers the most likely boundaries of the flow and estimates their posterior uncertainty. A magnetic resonance velocimetry (MRV) experiment is then designed to obtain images of a 3D axisymmetric Navier-Stokes flow in a converging nozzle.

MRV images are acquired, having poor quality (SNR≅6), intended for reconstruction/segmentation, and images of higher quality (SNR>30) that serve as the ground truth. It is shown that the algorithm performs very well in reconstructing and segmenting the poor MRV images, which were obtained in just 10.2 minutes, and that the reconstruction compares well to the high SNR images, which required a total acquisition time of ≅4.6 hours.

The reconstructed images and the segmented (smoothed) domain are used to estimate the posterior distribution of the wall shear rate and compare it with the ground truth. Since the wall shear rate depends on both the shape and the velocity field, it is seen that the algorithm provides a consistent treatment to this problem by jointly reconstructing and segmenting the flow images, avoiding the design of an additional experiment (e.g. CT, MRA) for the measurement of the geometry, or the use of external (non-physics-informed) segmentation software.

Lastly, an extension of the method is presented which addresses cases where the received signals are sparse (i.e. incomplete in k-space).

The present method has several advantages over general image reconstruction and segmentation algorithms, which do not respect the underlying physics and the boundary conditions and provides additional knowledge of the flow physics (e.g. pressure field), which is otherwise difficult to measure. The method naturally extends to 3D, periodic Navier-Stokes problems in complicated geometries to substantially decrease signal acquisition times and provide additional knowledge of the physical system being imaged.

The generalized inverse Navier-Stokes problem is formulated in the following manner, including the derivation of an algorithm for its solution. In what follows, $L^2(\Omega)$ denotes the space of square-integrable functions in $\Omega$, with inner product $\langle \bullet, \bullet \rangle$ and norm $\|\bullet\|_{L^2(\Omega)}$. $H^k(\Omega)$ is the space of square-integrable functions with k square-integrable derivatives in $\Omega$. For a given covariance operator, C, also defined are the covariance-weighted $L^2$ spaces, endowed with the inner product $\langle \bullet, \bullet \rangle_C := \langle \bullet, C^{-1} \bullet \rangle$, which generates the norm $\|\bullet\|_C$. The Euclidean norm in the space of real numbers $\mathbb{R}_n$ is denoted by $|\bullet|_{\mathbb{R}n}$.

In general, an n-dimensional velocimetry experiment usually provides noisy flow velocity images on a domain $I \subset \mathbb{R}^n$, depicting the measured flow velocity u* inside an object $\Omega \subset I$ that is the boundary is a subset of the overall domain (sometimes called the imaging region), I with boundary $\partial \Omega = \Gamma \cup \Gamma_i \cup \Gamma_o$—that is, a boundary, $\Gamma$, delimiting regions of I which do and do not contain the fluid, and inlet and outlet boundaries, $\Gamma_i$, and $\Gamma_o$ respectively located at the edges of I. These features can be seen, for example in FIG. 1.

An appropriate model for this procedure is the Navier-Stokes problem:

$$u \cdot \nabla u - v \Delta u + \nabla p = 0 \quad \text{in } \Omega \quad (2.1)$$
$$\nabla \cdot u = 0 \quad \text{in } \Omega$$
$$u = 0 \quad \text{on } \Gamma$$
$$u = g_i \quad \text{on } \Gamma_i \text{ where an inlet exists}$$
$$-v \partial_n u + pn = g_o \quad \text{on } \Gamma_o \text{ where an outlet exists}$$

where u is the velocity, p is the reduced pressure calculated as the raw pressure $p_0$ divided by the fluid density, $\rho$, v is a kinematic velocity, n is a unit normal vector on $\partial \Omega$, and $\partial_n = n \cdot \nabla$ is a normal derivative on $\partial \Omega$. Here boundary conditions are needed to describe behaviour on parts of the boundary which exist at the edge of the imaging space (so do not necessarily restrict the fluid flow, but allow flow in and out, for example) are $g_i$ for the inlet $\Gamma_i$, and $g_o$ for the outlet $\Gamma_o$. These are Dirichlet boundary conditions.

The data space is denoted by $\mathcal{D}$ and the model space by $\mathcal{M}$, and it is assumed that both spaces are subspaces of $L^2$. In the 2D case, $u^* = (u_x^*, u_y^*)$, and the covariance operator is introduced as:

$$C_{u^*} = \text{diag}\left(\sigma_{u_x^*}^2 I, \sigma_{u_y^*}^2 I\right) \quad (2.2)$$

where $\sigma_{u_x^*}^2$ and $\sigma_{u_y^*}^2$ are the Gaussian noise variances of $u_x^*$ and $u_y^*$ respectively, and I is the identity operator. The discrepancy between the measured velocity field $u^* \in D$ and the modelled velocity field $u \in M$ is measured on the data space D using the reconstruction error functional:

$$\mathscr{E}(u) = \frac{1}{2}\|u^* - Su\|_{C_{u^*}}^2 = \frac{1}{2}\int_I (u^* - Su) C_u^{-1} (u^* - Su) \quad (2.3)$$

where $S: \mathcal{M} \to \mathcal{D}$ is the $L^2$-projection from the model space $\mathcal{M}$ to the data space $\mathcal{D}$.

The goal in this invention is to infer the unknown parameters of the Navier-Stokes problem (2.1) such that the model velocity u approximates the noisy measured velocity u* in the covariance-weighted $L^2$-metric defined by $\mathscr{E}$. In the general case, the unknown model parameters of (2.1) are the shape of $\Omega$ (i.e. exactly where the boundary constraining the fluid is located), the kinematic viscosity v, and the boundary conditions $g_i$, $g_o$.

This inverse Navier-Stokes problem leads to the nonlinearly constrained optimization problem:

$$\text{find } u^\circ \equiv \underset{\Omega, x}{\text{argmin}}\, \mathscr{E}(u(\Omega; x)), \text{ such that } u \text{ satisfies equation (2.1)} \quad (2.4)$$

where $u^\circ$ is the reconstructed velocity field, and $x = (g_i; g_o; v)$. Like most inverse problems, (2.4) is ill-posed and hard to solve. To alleviate the ill-posedness of the problem the search for values of the unknowns $(\Omega; x)$ needs restricting to function spaces of sufficient regularity.

Consider FIG. 1, which illustrates the problem addressed herein. Given the images of a measured velocity field u*, an inverse Navier-Stokes problem is solved to infer the boundary $\Omega$, the kinematic viscosity v, and the inlet velocity profile on $\Gamma_i$. The solution to this inverse problem is a reconstructed velocity field $u^\circ$, from which noise and artefacts ($u^* - Su^\circ$) have been filtered out. The upper left image shows the input image data, including artefacts, the central upper image shows the output, having had the noise and artefacts removed in accordance with the methods described herein, and the upper right image shows the residual noise and artefacts which needed to be subtracted from the input velocity to derive the reconstructed velocity field. The lower part of FIG. 1 shows the definitions of the various parts of the data. The entire imaging region is denoted I, the fluid is located in a subset of I, $\Omega$, with boundary $\partial \Omega = \Gamma \cup \Gamma_i \cup \Gamma_o$—that is, a boundary, $\Gamma$, delimiting regions of I which do and do not contain the fluid, and inlet and outlet boundaries, $\Gamma_i$, and $\Gamma_o$ respectively.

The regularization proceeds as follows. If $x \in L^2$ is an unknown parameter, one way to regularize the inverse problem (2.4) is to search for minimizers of the augmented functional $\mathscr{J} = \mathscr{E} + \mathscr{R}$, where:

$$\mathscr{R}(x) = \int \alpha(x - \bar{x})^2 + \beta(\nabla x - \nabla \bar{x})^2 \qquad (2.5)$$

is a regularization norm for a given prior assumption $\bar{x}$, and for given weights $\mathbb{R} \ni \alpha, \beta > 0$. This simple idea can be quite effective because by minimizing. $\mathscr{R}$ x is forced to lie in a subspace of $L^2$ having higher regularity, namely $H^1$, and as close to the prior value $\bar{x}$ as $\alpha$, $\beta$ allow. However, a drawback of this method is that, in this setting, the choice of $\alpha$, $\beta$, and even the form of $\mathscr{R}$, is arbitrary.

There is a more intuitive approach that recovers the form of the regularization norm $\mathscr{R}$ from a probabilistic viewpoint. In the setting of the Hilbert space $L^2$, the Gaussian measure has a probability distribution $\gamma \sim \mathscr{N}(m, C)$ and has the property that its finite-dimensional projections are multivariate Gaussian distributions, and it is uniquely defined by its mean $m \in L^2$ and its covariance operator $C: L^2 \to L^2$. This can be seen by noting the mean of a Gaussian measure in $L^2$ is given by:

$$m \equiv \mathbb{E}h := \int_{L^2} h\gamma(dh)$$

and the covariance operator and the covariance $C: L^2 \times L^2 \to \mathbb{R}$ are defined by:

$$Cx := \int_{L^2} h\langle x, h\rangle \gamma(dh), \; C(x, x') := \int_{L^2} h\langle x, h\rangle\langle x', h\rangle \gamma(dh)$$

noting that $\langle Cx, x' \rangle = C(x, x')$. The above (Bochner) integrals define integration over the function space $L^2$, and under the measure $\gamma$, and are well defined due to Fernique's theorem. These integrals can be directly computed by sampling the Gaussian measure with Karhunen-Loeve expansion (as set out below in the discussion of estimation of uncertainty).

It can be shown that there is a natural Hilbert space $H_\gamma$ that corresponds to $\gamma$, and that $$H_\gamma = \sqrt{C}(L^2)$$

In other words, if x is a random function distributed according to $\gamma$, any realization of x lies in $H_\gamma$, which is the image of $\sqrt{C}$. Furthermore, the corresponding inner product:

$$\langle x, x' \rangle_C = \left\langle C^{-\frac{1}{2}}x, C^{-\frac{1}{2}}x' \right\rangle \qquad (2.6)$$

is the covariance between x and x', and the norm $\|x\|_C^2 = \langle x, x \rangle_C$ is the variance of x. Therefore, if x is an unknown parameter for which a priori statistical information is available, and if the Gaussian assumption can be justified, the following form can be chosen:

$$\mathscr{R}(x) = \frac{1}{2}|x - \bar{x}|_C^2 \qquad (2.7)$$

In this way, $\mathscr{J} = \mathscr{E} + \mathscr{R}$ increases as the variance of x increases. Consequently, minimizing $\mathscr{J}$ penalizes improbable realizations of the reconstruction.

As mentioned previously, the unknown model parameters of the Navier-Stokes problem (2.1) are the kinematic viscosity v, the boundary conditions $g_i$, $g_o$, and the shape of $\Omega$. Since the kinematic viscosity v is considered to be constant, the regularizing norm is simply:

$$\frac{1}{2}|v - \bar{v}|_{\Sigma_v}^2 = \frac{1}{2\sigma_v^2}|v - \bar{v}|_\mathbb{R}^2 \qquad (2.8)$$

where $\bar{v} \in \mathbb{R}$ is a prior guess for v, and $\sigma_v^2$ is the variance of v. For the Dirichlet boundary condition, $g_i \in L^2(\Gamma_i)$, it is appropriate to choose the exponential covariance function:

$$C(x, x') = \frac{\sigma_{g_i}^2}{2\ell} \cdot \exp\left(\frac{-|x - \bar{x}|}{\ell}\right) \qquad (2.9)$$

with variance $\sigma_{g_i}^2 \mathbb{R}$ and characteristic length $\ell \in \mathbb{R}$. For zero-Dirichlet (no-slip) or zero-Neumann boundary conditions on $\partial \Gamma_i$ equation 2.9 leads to the norm:

$$\|g_i\|_{C_{g_i}}^2 \simeq \frac{1}{\sigma_{g_i}^2} \int_{\Gamma_i} g_i^2 + \ell^2(\nabla g_i)^2 \qquad (2.10)$$

Using integration by parts the covariance operator is found to be:

$$C_{g_i} = \sigma_{g_i}^2 (I - \ell^2 \tilde{\Delta})^{-1} \qquad (2.11)$$

where $\tilde{\Delta}$ is the $L^2$-extension of the Laplacian $\Delta$ that incorporates the boundary condition $g_i = 0$ on $\partial \Gamma_i$.

For the natural boundary condition, $g_o \in L^2(\Gamma_o)$, the same covariance operator can be used, but equip $\tilde{\Delta}$ with zero-Neumann boundary conditions, i.e. $\partial_n g_0 = 0$ on $\partial \Gamma_o$. Lastly, for the shape of $\Omega$, which is implicitly represented with a signed distance function $\phi_\pm$ (defined in more detail below), the following norm is an appropriate choice:

$$\frac{1}{2}\|\bar{\phi}_\pm - \phi_\pm\|_{C_{\phi_\pm}}^2 = \frac{1}{2\sigma_{\phi_\pm}^2}\|\bar{\phi}_\pm - \phi_\pm\|_{L^2(J)}^2 \qquad (2.12)$$

where $\sigma_{\phi_\pm} \in \mathbb{R}$ and $\bar{\phi}_\pm \in L^2(I)$, representing an initial guess for the signed distance function. Additional regularization for the boundary of (i.e. the zero level-set of $\phi_\pm$) is needed and it is described in more detail below. Based on the above results, the regularization norm for the unknown model parameters is $$\mathscr{R}(x, \phi_\pm) = \qquad (2.13)$$

$$\frac{1}{2}|v - \bar{v}|_{\Sigma_v}^2 + \frac{1}{2}\|g_i - \bar{g}_i\|_{C_{g_i}}^2 + \frac{1}{2}\|g_o - \bar{g}_o\|_{C_{g_o}}^2 + \frac{1}{2}\|\bar{\phi}_\pm - \phi_\pm\|_{C_{\phi_\pm}}^2$$

An additional constraint to be applied to the system is that of matching physical reality. This is achieved by forming an inverse Navier-Stokes problem. This sub-process begins by testing the Navier-Stokes problem (2.1) with functions (v,q) $\in H^1(\Omega) \times L^2(\Omega)$, and after integrating by parts, the weak form is obtained:

$$\mathscr{M}(\Omega)(u, p, v, q; x) \equiv \qquad (2.14)$$
$$\int_\Omega \left(v \cdot (u \cdot \nabla u) + v \nabla v : \nabla u - (\nabla \cdot v) p - q(\nabla \cdot u)\right) + \int_{\Gamma_o} (v \cdot g_o) +$$
$$\int_{\Gamma \cup \Gamma_i} v \cdot (-v \partial_n u + pn) + \mathscr{N}_{\Gamma_i}(v, q, u; g_i) + \mathscr{N}_\Gamma(v, q, u; 0) = 0$$

where $\mathscr{N}$ is the Nitsche penalty term:

$$\mathscr{N}_T(v, q, u; z) \equiv \int_T (-v \partial_n u + qn + \eta v) \cdot (u - z) \qquad (2.15)$$

which weakly imposes the Dirichlet boundary condition $z \in L^2(T)$ on a boundary T, given a penalization constant $\eta$. The augmented reconstruction error functional is then defined as:

$$\mathscr{J}(\Omega)(u, p, v, q; x) = \mathscr{E}(u) + \mathscr{R}(x, \phi_\pm) + \mathscr{M}(\Omega)(u, p, v, q; x) \qquad (2.16)$$

which contains the regularization terms $\mathscr{R}$ and the model constraint $\mathscr{M}$, such that u weakly satisfies (2.1). To reconstruct the measured velocity field u* and find the unknowns $(\Omega, x)$, $\mathscr{J}$ should be minimized. This can be achieved by solving its associated Euler-Lagrange system as set out in the following.

In order to derive the Euler-Lagrange equations for $\mathscr{J}$, consider the initial definition:

$$\mathscr{U}' = \{u' \in H^1(\Omega) : u'|_{\Gamma \cup \Gamma_i} \equiv 0\} \qquad (2.17)$$

to be the space of admissible velocity perturbations u', and $\mathscr{P}' \subset L^2(\Omega)$ to be the space of admissible pressure perturbations p', such that $-\partial_n u' + p'n|_{\Gamma_o} = 0$. Further defining the first variation (denoted $\delta_y \mathscr{L}$ for the first variation of function $\mathscr{L}$ with respect to variable y) of terms in the error functional $\mathscr{J}$ it is seen that:

$$\delta_u \mathscr{E} \equiv \frac{d}{d\tau} \mathscr{E}(u + \tau u')|_{\tau=0} = \qquad (2.18)$$
$$\int_\Omega -C_{u^*}^{-1}(u^* - Su) \cdot Su' = \int_\Omega -S^\dagger C_{u^*}^{-1}(u^* - Su) \cdot u' \equiv \langle D_u \mathscr{E}, u' \rangle_\Omega$$

Where † denotes the Hermitian adjoint of an operator, and $D_u$ represents a generalised derivative operator (with respect to u). Adding together the first variations of M with respect to (u, p) the following is derived:

$$\delta_u \mathscr{M} \equiv \frac{d}{d\tau} \mathscr{M}(u + \tau u', \ldots)|_{\tau=0},$$
$$\delta_p \mathscr{M} \equiv \frac{d}{d\tau} \mathscr{M}(\ldots, p + \tau p', \ldots)|_{\tau=0}$$

and after integrating by parts:

$$\delta_u \mathscr{M} + \delta_p \mathscr{M} = \int_\Omega \left(-u \cdot (\nabla v + (\nabla v)^\dagger) - v \Delta v + \nabla q\right) \cdot u' + \qquad (2.19)$$
$$\int_\Omega (\nabla \cdot v) p' + \int_{\partial \Omega} ((u \cdot n)v + (u \cdot v)n + v \partial_n v - qn)n \cdot u' +$$
$$\int_{\Gamma \cup \Gamma_i} v \cdot (-v \partial_n u' + p'n) + \mathscr{N}_{\Gamma \cup \Gamma_i}(v, q, u'; 0)$$

The integration by parts formulae for the nonlinear term in the above equation are:

$$\int_\Omega (u' \cdot \nabla u) \cdot v = \int_\Omega u'_j \partial_j u_i v_i = -\int_\Omega u'_j u_i \partial_j v_i +$$
$$\partial_j u' u_i v_i + \int_\Omega u'_j n_j u_i v_i = -\int_\Omega (u' \cdot (\nabla v)^\dagger) \cdot u' + \int_\Omega (u \cdot v)(n \cdot u')$$
$$\int_\Omega (u \cdot \nabla u') \cdot v = \int_\Omega u_j \partial_j u'_i v_i = -\int_\Omega \partial_j u_j u'_i v_i + u_j u'_i \partial_j v_i +$$
$$\int_\Omega u_j u'_i n_j v_i = -\int_\Omega (u \cdot \nabla v) \cdot u' + \int_\Omega (u \cdot n)(v \cdot u')$$

Since $\mathscr{R}$ does not depend on (u, p), (2.18) and (2.19) can be used to assemble the optimality conditions of $\mathscr{J}$ for (u, p):

$$\langle D_u \mathscr{J}, u' \rangle_\Omega = 0, \langle D_p \mathscr{J}, p' \rangle_\Omega = 0 \qquad (2.20)$$

For (2.20) to hold true for all perturbations (u', p') $\in \mathscr{U}' \times \mathscr{P}'$, it can be deduced that (v,q) must satisfy the following adjoint Navier-Stokes problem:

$$\qquad (2.21)$$
$$-u \cdot (\nabla v + (\nabla v)^\dagger) - v \Delta v + \nabla q = -D_u \mathscr{E} \quad \text{in } \Omega$$
$$\nabla \cdot v = 0 \quad \text{in } \Omega$$
$$v = 0 \quad \text{on } \Gamma \text{ and } \Gamma_i \text{ where an inlet exists}$$
$$(u \cdot n)v + (u \cdot v)n + v \partial_n v - qn = 0 \quad \text{on } \Gamma_{on} \text{ where an outlet exists};$$

In this context, v is the adjoint velocity and q is the adjoint pressure, which both vanish when u=u*. Note also that boundary conditions for the adjoint problem (2.21) are chosen to make the boundary terms of (2.19) vanish, and that these boundary conditions are subject to the choice of U', which, in turn, depends on the boundary conditions of the (primal) Navier-Stokes problem.

To find the shape derivative of an integral defined in $\Omega$, when the boundary $\partial \Omega$ deforms with speed: $\mathscr{V}$, Reynold's transport theorem may be used. For the bulk integral of a function $f: \Omega \to \mathbb{R}$, it is calculated that:

$$\frac{d}{d\tau}\left(\int_{\Omega(\tau)} f\right)\bigg|_{\tau=0} = \int_\Omega f' + \int_{\partial \Omega} f(\mathscr{V} \cdot n) \qquad (2.22)$$

and for the boundary integral of $f$:

$$\frac{d}{d\tau}\left(\int_{\partial\Omega(\tau)} f\right)\bigg|_{\tau=0} = \int_{\partial\Omega} f' + (\partial_n + \kappa)f(\mathscr{V}\cdot n) \quad (2.23)$$

where $f'$ is the shape derivative of $f$ (due to $\mathscr{V}$), $\kappa$ is the summed curvature of $\partial\Omega$, and $\mathscr{V} \equiv \zeta n$, with $\zeta \in L^2(\partial\Omega)$, is the Hadamard parameterization of the speed field. In other words, the boundary deforms (i.e. is perturbed) in a direction perpendicular to the boundary at all points, with a speed $\zeta$. Any boundary that is a subset of $\partial I$, i.e. the edge of the image (or imaging region) $I$, is non-deforming (is not perturbed) and therefore the second term of the above integrals vanishes. The only boundary that deforms is $\Gamma \cup \partial\Omega$. For brevity, $\delta_{\mathscr{V}} I$ is used to denote the shape perturbation of an integral $I$.

Using (2.22) on $\mathscr{E}$:

$$\delta_{\mathscr{V}}\mathscr{E} = \langle D_u \mathscr{E}, u \rangle_{\Omega} \quad (2.24)$$

where $D_u \mathscr{E}$ is given by (2.18). Using (2.22) and (2.23) on $\mathscr{M}$, the shape derivatives problem for $(u', p')$ is obtained:

$$-u' \cdot \nabla u + u \cdot \nabla u' - \nu\Delta u' + \nabla p' = 0 \quad \text{in } \Omega \quad (2.25)$$

$$\nabla \cdot u' = 0 \quad \text{in } \Omega$$

$$u' = -\partial_n u(\mathscr{V} \cdot n) \quad \text{on } \Gamma$$

$$u' = 0 \quad \text{on } \Gamma_i \text{ where an inlet exists}$$

$$-\nu\partial_n u' + p'n = 0 \quad \text{on } \Gamma_o \text{ where an outlet exists}$$

which can be used directly to compute the velocity and pressure perturbations for a given speed field $\mathscr{V}$. It is observed that $(u', p') \equiv 0$ when $\mathscr{V} \cdot n = \partial \equiv 0$. Testing the shape derivatives problem (2.25) with $(v,q)$, and adding the appropriate Nitsche terms for the weakly enforced Dirichlet boundary conditions, the following expression is obtained:

$$\delta_{\mathscr{V}}\mathscr{M} = \int_{\Omega} \left(v \cdot (u' \cdot \nabla u + u \cdot \nabla u') + \nu\nabla v : \nabla u' - (\nabla \cdot v)p' - q(\nabla \cdot u')\right) + \quad (2.26)$$

$$\int_{\Gamma \cup \Gamma_i} v \cdot (-\nu\partial_n u' + p'n) + \mathscr{N}_{\Gamma_i}(v, q, u'; 0) + \mathscr{N}_{\Gamma}^*(v, q, u'; -\zeta\partial_n u) = 0$$

If $I_i$ represents the four integrals in (2.19), integrating by parts (2.26) yields:

$$\delta_{\mathscr{V}}\mathscr{M} = \sum_{i=1}^{4} I_i + \mathscr{N}_{\Gamma_i}(v, q, u'; 0) + \mathscr{N}_{\Gamma}^*(v, q, u'; -\zeta\partial_n u) = 0 \quad (2.27)$$

and, due to the adjoint problem (2.21):

$$\delta_{\mathscr{V}}\mathscr{M} = \delta_{\mathscr{V}}\mathscr{E} + \int_{\Gamma}(-\nu\partial_n v + qn) \cdot \zeta\partial_n u = 0 \quad (2.28)$$

since $u'|_{\Gamma_i} = 0$, and $u|_{\Gamma} \equiv 0$. Therefore, the shape perturbation of $\mathscr{J}$ is:

$$\delta_{\mathscr{V}}\mathscr{J} \equiv \langle D_{\mathscr{V}}\mathscr{J}, \mathscr{V} \cdot n \rangle_{\Gamma} \equiv \langle D_{\zeta}\mathscr{J}, \zeta \rangle_{\Gamma} = \delta_{\mathscr{V}}\mathscr{E} + \delta_{\mathscr{V}}\mathscr{M} + \delta_{\mathscr{V}}\mathscr{R} = 0 \quad (2.29)$$

which, due to (2.28) and $\delta_{\mathscr{V}}\mathscr{R} \equiv 0$, takes the form:

$$\langle D_{\zeta}\mathscr{J}, \zeta \rangle_{\Gamma} = \langle \partial_n u \cdot (-\nu\partial_n v + qn), \zeta \rangle_{\Gamma} \quad (2.30)$$

where $D_{\zeta}\mathscr{J}$ is the shape gradient. Note that the shape gradient depends on the normal gradient of the (primal) velocity field and the traction, $(-\nu\nabla v + qI)$, that the adjoint flow exerts on $\Gamma$.

The unknown model parameters $\{x\}$ (that is the set of parameters $\{x\}$) have an explicit effect on $\mathscr{M}$ and $\mathscr{R}$, and can therefore be obtained by taking their first variations. For the Dirichlet-type boundary condition at the inlet this gives:

$$\langle D_{g_i}\mathscr{J}, g_i' \rangle_{\Gamma_i} = \langle \nu\partial_n v - qn - \eta v + C_{g_i}^{-1}(g_i - \overline{g}_i), g_i' \rangle_{\Gamma_i} \quad (2.31)$$

$$= \langle \nu C_{g_i}(\partial_n v - qn - \eta v) + g_i - \overline{g}_i, g_i' \rangle_{C_{g_i}} =$$

$$\langle \hat{D}_{g_i}\mathscr{J}, g_i' \rangle_{C_{g_i}}$$

where $\hat{D}_{g_i}\mathscr{J}$ is the steepest descent direction that corresponds to the covariance-weighted norm. For the natural boundary condition at the outlet:

$$\langle D_{g_o}\mathscr{J}, g_o' \rangle_{\Gamma_o} = \langle v + C_{g_o}^{-1}(g_o - \overline{g}_o), g_o' \rangle_{\Gamma_o} \quad (2.32)$$

$$= \langle C_{g_o}v + g_o - \overline{g}_o, g_o' \rangle_{C_{g_o}} = \langle \hat{D}_{g_o}\mathscr{J}, g_o' \rangle_{C_{g_o}}$$

Lastly, since the kinematic viscosity is considered to be constant within $\Omega$ its generalized gradient is $$\langle D_{\nu}\mathscr{J}, \nu' \rangle_{\mathbb{R}} = \left(\int_{\Omega} \nabla v : \nabla u + \sum_{\nu}^{-1}(\nu - \overline{\nu}), \nu'\right)_{\mathbb{R}} \quad (2.33)$$

$$\left(\sum_{\nu}\int_{\Omega} \nabla v : \nabla u + (\nu - \overline{\nu}), \nu'\right)_{\Sigma_{\nu}} = \langle \hat{D}_{\nu}\mathscr{J}, \nu' \rangle_{\Sigma_{\nu}}$$

For a given step size $\mathbb{R} \ni \tau > 0$ the steepest descent directions (2.31) to (2.33) can be used either to update an unknown parameter x through:

$$x_{k+1} = x_k + \tau s_k \quad (2.34)$$

with $s_k = \hat{D}_x\mathscr{J}$. It is also possible to update the parameters by reconstructing an approximation $\tilde{\Delta}$ of the inverse Hessian matrix, in the context of a quasi-Newton method, and thereby to compute $s_k = -\tilde{H}\hat{D}_x\mathscr{J}$. This latter approach is set out in more detail below.

To deform the boundary $\partial\Omega$ using the simple update formula (2.34) it is convenient to use a parametric surface representation. Several methods are possible, but here a choice is made to implicitly represent $\partial\Omega$ using signed distance functions $\phi_\pm$. The object $\Omega$ and its boundary $\partial\Omega$ are then identified with a particular function $\phi_\pm$ so that:

$$\Omega = \{x \in \Omega: \phi_\pm(x) < 0\}, \partial\Omega = \{x \in \Omega: \phi_\pm(x) = 0\}$$

A signed distance function $\phi_\pm$ for can be obtained by solving the Eikonal equation:

$$|\nabla\phi_\pm(x)| = 1 \text{ subject to } \phi_\pm|_{\partial\Omega} = 0 \quad (2.35)$$

One way to solve this problem is with level-set methods (see for example: "Fronts propagating with curvature-dependent speed: Algorithms based on Hamilton-Jacobi formulations" *Journal of Computational Physics* 79 (1), 12-49; "A fast marching level set method for monotonically advancing fronts" *Proceedings of the National Academy of Sciences of the United States of America* 93 (4), 1591-1595; "A level set method for inverse problems" *Inverse Problems* 17 (5), 1327-1355; "A framework for the construction of level set methods for shape optimization and reconstruction" *Interfaces and Free Boundaries* 5 (3), 301-329; "A Survey in Mathematics for Industry: A survey on level set methods for inverse problems and optimal design" *European Journal of Applied Mathematics* 16 (2), 263-301; "Combined state and parameter estimation in level-set methods" *Journal of Computational Physics* 399, 108950, arXiv: 1903.00321).

There is, however, a different approach, which relies on the heat equation (developed in "On the behavior of the fundamental solution of the heat equation with variable coefficients" *Communications on Pure and Applied Mathematics* 20 (2), 431-455; "Diffusion processes in a small time interval" *Communications on Pure and Applied Mathematics* 20 (4), 659-685; and "The heat method for distance computation" *Communications of the ACM* 60 (11), 90-99). The main result that to be drawn from these, in order to justify the use of the heat equation for the approximation of $\phi_\pm$ states that:

$$d(x, \partial\Omega) = \lim_{\tau_1 \to 0}\left(-\frac{\sqrt{\tau_1}}{2}\log u(x, \tau_1)\right), x \in I \quad (2.36)$$

where d $(x, \partial\Omega)$ is the Euclidean distance between any point $x \in I$ and $\partial\Omega$, and u is the solution of heat propagation away from $\partial\Omega$:

$$(I - \tau_1)u = 0 \text{ in } I \quad (2.37)$$
$$u = 1 \text{ on } \partial\Omega$$

This result has been used to implement a smoothed distance function (see e.g. "The heat method for distance computation" *Communications of the ACM* 60 (11), 90-99), where it was referred to as the "heat method". Here, this method is slightly adapted to compute signed distance functions $\phi_\pm$ in truncated domains. To compute $\phi_\pm$, therefore, equation (2.37) is solved for $\tau \ll 1$, and then $\phi_\pm$ obtained by solving:

$$\nabla \cdot \nabla\phi_\pm = \nabla \cdot X \quad (2.38)$$
$$\partial_n \phi_\pm = X \cdot n$$
$$\phi_\pm = 0$$

where:

$$X = -\text{sgn}(\psi)\frac{\nabla u}{|\nabla u|}$$

with X being the normalized heat flux and $\psi$ being a signed function such that $\psi(x)$ is negative for points x in $\Omega$ and positive for points x outside $\Omega$—i.e. to ensure that the extended normal vector points away from the boundary. This intermediate step (the solution of two Poisson problems (2.37)-(2.38) instead of one) is taken to ensure that $|\nabla\phi_\pm(x)|=1$, as required by equation 2.35. To deform the boundary $\partial\Omega$, $\phi_\pm$ is transported under the speed field $\mathscr{V} \equiv \partial n$. The convection-diffusion problem for $\phi_\pm(x, t)$ then reads:

$$\partial_t \phi_\pm + \mathscr{V}\nabla\phi_\pm - \epsilon_{\phi_\pm}\Delta\phi_\pm = 0 \text{ in } I \times (0, \tau] \quad (2.39)$$
$$\phi_\pm = \phi_{\pm 0} \text{ in } I \times \{t = 0\}$$
$$\text{in which } \epsilon_{\phi_\pm} = \frac{|\mathscr{V}|_\infty l}{Re_{\phi_\pm}}$$

where $\phi_{\pm 0}$ denotes the signed distance function of the current domain, $\Omega$, $\epsilon_{\phi_\pm}$ is the diffusion coefficient, l is a length scale, $Re_{\phi_\pm}$ is a Reynolds number, and $\dot{\mathscr{V}}: I \to \mathbb{R} \times \mathbb{R}$ is an extension of $\mathscr{V}: \partial\Omega \to \mathbb{R} \times \mathbb{R}$. That is, $\dot{\mathscr{V}}$ extends $\mathscr{V}$ from its usual domain only on the boundary to the entire imaging region.

When 2.39 is solved for $\phi_\pm(x, \tau)$ the implicit representation of the perturbed domain is obtained, at time $t=\tau$ (the step size), but to do so it is necessary to extend $\mathscr{V}$ to the whole space of the imaging region I.

To extend $\mathscr{V}$ to I the normal vector n and the scalar function $\zeta$, which are both initially defined on $\partial\Omega$, are extended across I. The normal vector extension is easily obtained by:

$$\dot{n}(x) = \frac{\nabla\phi_\pm}{|\nabla\phi_\pm|} = \nabla\phi_\pm, x \in I \quad (2.40)$$

since $|\nabla\phi_\pm|=1$, and an outward-facing extension is given by:

$$\dot{n}_o(x) = -\text{sgn}(\phi_\pm)\dot{n} \quad (2.41)$$

This extended normal vector $\dot{n}_o$ is then used to extend $\zeta \in L^2(\partial\Omega)$ to $\dot{\zeta} \in L^2(I)$, using the convection-diffusion problem:

$$\partial_t \dot{\zeta} + \dot{n}_o \cdot \nabla\dot{\zeta} - \epsilon_\zeta \Delta\dot{\zeta} = 0 \text{ in } I \times (0, \tau_\zeta] \quad (2.42)$$
$$\dot{\zeta} = \zeta \text{ on } \partial\Omega \times (0, \tau_\zeta]$$
$$\dot{\zeta} = 0 \text{ on } I \times \{t = 0\}$$
$$\text{in which } \epsilon_\zeta = \frac{|\dot{n}_o|_\infty l}{Re_\zeta}$$

In other words, $\zeta$ is convected along the predefined $\dot{n}_o$-streamlines and isotropic diffusion is added for regularization. Note that the streamlines may have complicated behaviour and without diffusion there may be no unique solution to the problem. The choice of $\epsilon_{\phi_\pm}$ in (2.39) and $\epsilon_\zeta$ in (2.42) has been made in order for the shape regularization to depend only on the length scale i and the Reynolds numbers $Re_\zeta$, $Re_{\phi_\pm}$.

More precisely, the shape regularization depends only on $Re_\zeta$ and $Re_{\phi_\pm}$ because the length scale l is fixed to equal the smallest possible length scale of the modelled flow, which is the numerical grid spacing h for a uniform cartesian grid, such as used on performing finite element analyses. For illustration, if $\zeta$ is considered to be the concentration of a dye on $\partial\Omega$, the using a simplified scaling argument similar to the growth of a boundary layer on a flat plate, it is observed that the diffusing dye at distance d from $\partial\Omega$ will extend over a width $\delta$ such that:

$$\delta \sim \sqrt{\frac{\epsilon_\zeta d}{|\dot{n}_o|_\infty}} = \sqrt{\frac{\iota d}{Re_\zeta}}, \text{ or } \frac{\delta}{\iota} \sim \sqrt{\frac{\alpha}{Re_\zeta}} \text{ when } d = \alpha \iota \quad (2.43)$$

The above scaling approximation describes the dissipation rate of small-scale features such as roughness away from $\partial\Omega$. This is therefore how $Re_\zeta$ and $Re_{\phi_\pm}$ control the regularity of the boundary $\partial\Omega_\tau$ at time t=$\tau$, which is given by (2.39). The parameter $\tau_\zeta$ can be taken to be large enough to find a steady-state for (2.42). The linear initial value problems (2.39) and (2.42) are recast into their corresponding boundary value problems using backward-Euler temporal discretization because the time dependent solution is not of interest in the present context.

The extended shape gradient (2.30), after taking into account the regularizing term for $\phi_\pm$, is therefore given by:

$$\langle D_\zeta \mathscr{F}, \zeta' \rangle_I = \langle \zeta + C_{\phi_\pm}^{-1}(\overline{\phi}_\pm - \phi_\pm), \zeta' \rangle_I \quad (2.44)$$
$$= \langle C_{\phi_\pm}\zeta + \overline{\phi}_\pm - \phi_\pm, \zeta' \rangle_{C_{\phi_\pm}} = \langle \hat{D}_\zeta \mathscr{F}, \zeta' \rangle_{C_{\phi_\pm}}$$

where $\dot{\zeta}$ is the extension of the shape gradient $\zeta = \partial_n \mathbf{u} \cdot (-\nu \partial_n \mathbf{v} + q\mathbf{n})$, for x on $\Gamma$.

Figure 2:
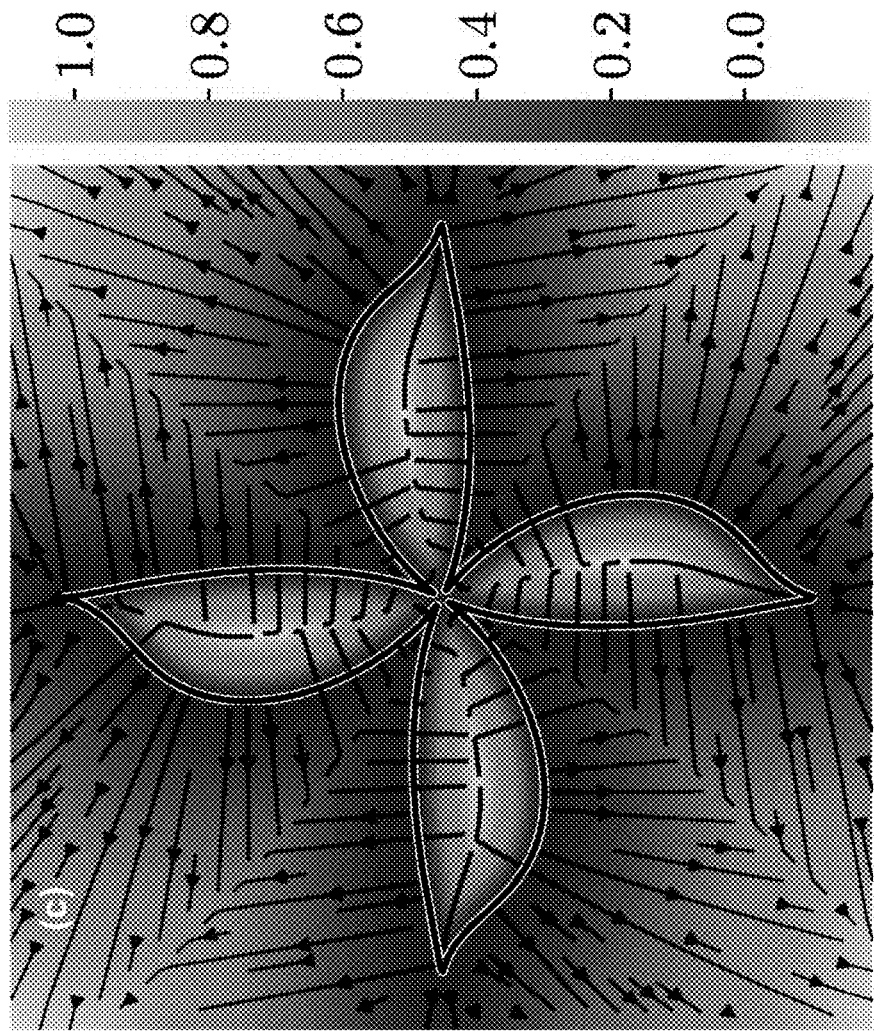
FIGS. 2a to 2f illustrate the procedure for extending parameters normally defined only on a boundary across the entire imaging region, in order to formalise the discussion of perturbations of the boundary location.
Figure 2:
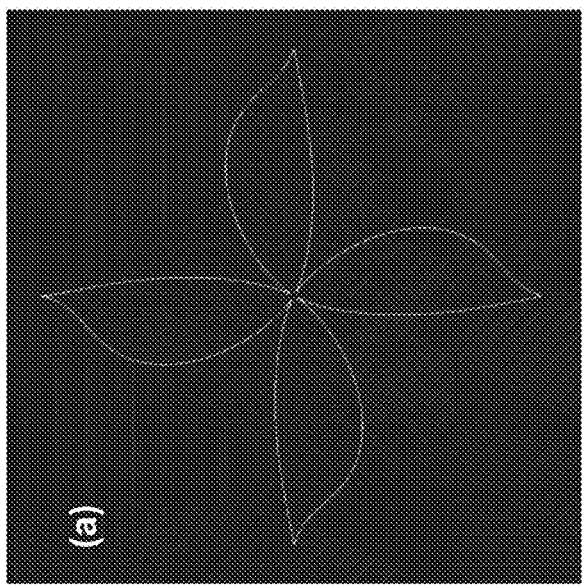
Figure 2:
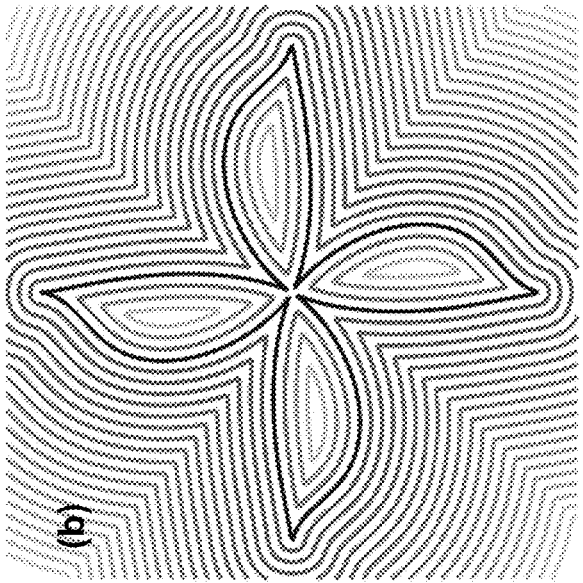
Figure 2:
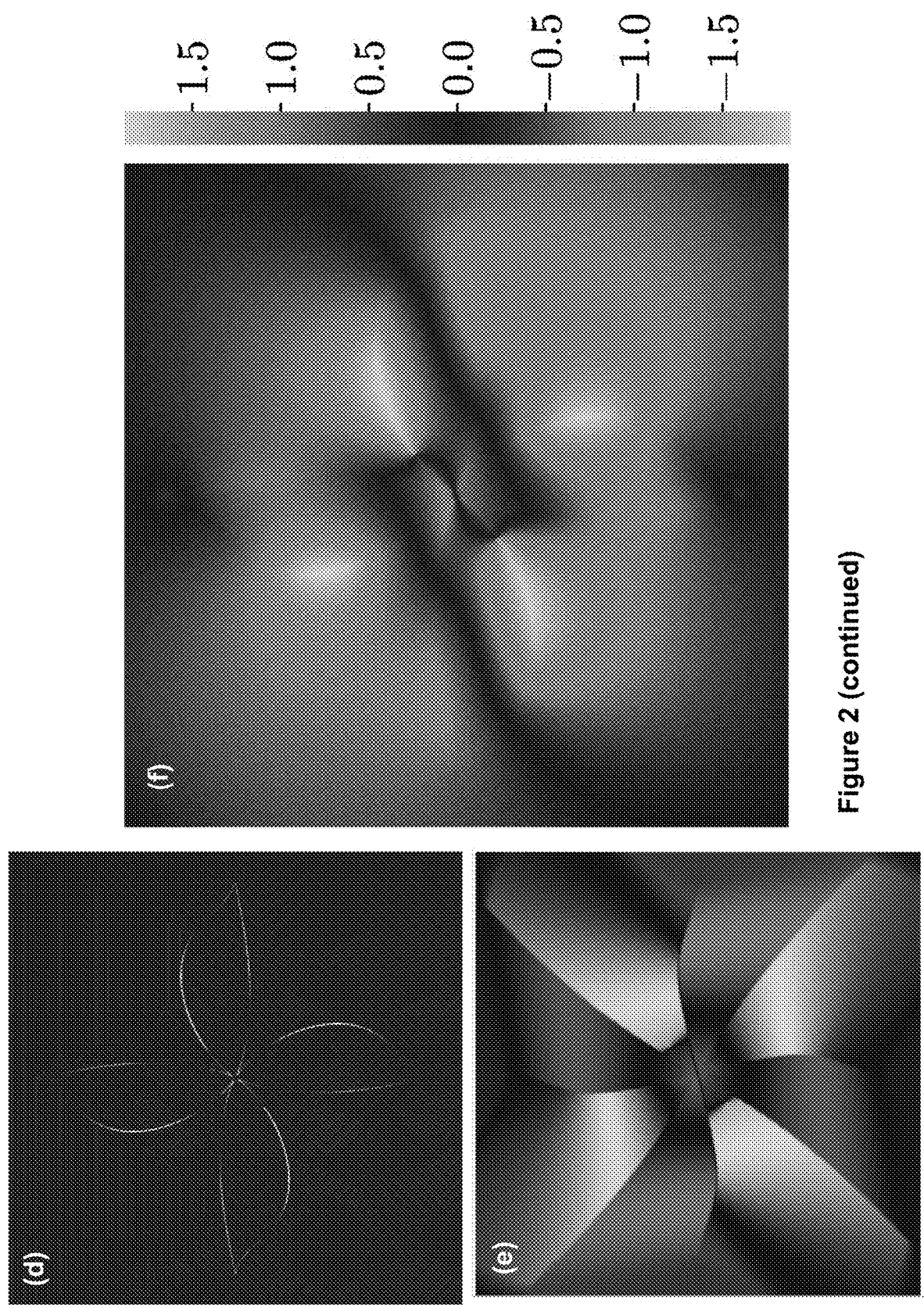

These principles are illustrated in FIG. 2. Here, the geometric flow of $\partial\Omega$ (outline shown in FIG. 2a, i.e. the shape of $\partial\Omega$) relies on the computation of its signed distance field $\phi_\pm$ (FIG. 2b—showing the level sets of $\phi_\pm$—with black being the zero (boundary) portions, negative values are located inside the boundary, and positive values outside, values having magnitude not equal to zero are shown in greyscale) and its normal vector extension n superimposed on the magnitude of $\phi_\pm$—with portions inside an being negative, portions outside being positive (FIG. 2c).

The shape gradient $\zeta$, which is initially defined on $\partial\Omega$ (FIG. 2d), is extended to the whole image I (the imaging region). The extension of $\zeta$ to the whole image, $\dot{\zeta}$, is shown in FIGS. 2e and 2f. Shape regularization is achieved by increasing the diffusion coefficient $\epsilon_\zeta$ in order to mitigate small scale perturbations when assimilating noisy velocity fields u*. FIG. 2f shows results at a lower value of $Re_\zeta$ than FIG. 2e—equal to 1 in FIG. 2e and equal to 0.01 in FIG. 2f.

The inverse Navier-Stokes problem for the reconstruction and the segmentation of noisy flow velocity images u* can now be written as:

$$\text{find } u^o \equiv \underset{\Omega, x}{\text{argmin}} \; \mathscr{F}(\Omega)(u, p, v, q; x) \quad (2.45)$$

where $\mathscr{F}$ is given by (2.16). The above optimization problem leads to a Euler-Lagrange system whose optimality conditions have been formulated above.

To precondition the steepest descent directions (2.31)-(2.33) and (2.44), the approximated inverse Hessian $\tilde{H}$ of each unknown is reconstructed using the BFGS quasi-Newton method (see Fletcher, R: *Practical Methods of Optimization*—pub. John Wiley & Sons) with damping. Due to the large scale of the problem, it is most convenient to work with the matrix-vector product representation of $\tilde{H}$. Consequently, the search directions are given by:

$$s = -\begin{pmatrix} \tilde{H}_\zeta & \cdots & \cdots & \cdots \\ \cdots & \tilde{H}_{g_i} & \cdots & \cdots \\ \cdots & \cdots & \tilde{H}_{g_o} & \cdots \\ \cdots & \cdots & \cdots & \tilde{H}_v \end{pmatrix} \begin{pmatrix} \hat{D}_\zeta \mathscr{F} \\ \hat{D}_{g_i} \mathscr{F} \\ \hat{D}_{g_o} \mathscr{F} \\ \hat{D}_v \mathscr{F} \end{pmatrix} \quad (2.46)$$

and the unknown variables x are updated according to (2.34). The signed distance function $\phi_\pm$ is perturbed according to (2.39), with $\dot{\mathscr{V}} = -(\tilde{H}_\zeta \hat{D}_\zeta \mathscr{F})\dot{n}$ Each line search is started with a global step size $\tau=1$, and the step size is halved until $\mathscr{F}((\phi_\pm, x)_{k+1}) < \mathscr{F}((\phi_\pm, x)_k)$, where k is an indexing parameter which indicates how many iterations of the procedure have been completed. To update the flow field $u_k$ to $u_{k+1}$ the Oseen problem for the updated parameters is solved:

$$u_k \cdot \nabla u_{k+1} + \nu \Delta u_{k+1} + \nabla p_{k+1} = 0 \quad (2.47)$$
$$\nabla \cdot u' = 0$$

with the boundary conditions given by (2.1). The process terminates when certain predetermined conditions are met. For example, the process may terminate in some cases if the covariance-weighted norm for the perturbations of the model parameters is below a user-specified tolerance. In other cases, the procedure may terminate if the line search fails to reduce $\mathscr{F}$ on a subsequent iteration.

In algorithmic format, the procedure set out above for reconstruction and segmentation of noisy flow velocity images may be written:
Input: u*, initial guesses for the unknowns ($\Omega_0$; $x_0$), regularization parameters controlling the form and weighting of the penalty terms.
begin $k \leftarrow 0$ (equations 2.37 and 2.38)

$(\phi_\pm)_k \leftarrow$ signed distance field $(u, p)_k \leftarrow$ Navier–Stokes problem for $(\phi_\pm, x)_k$ (equation 2.1)

while convergence criterion is not met do:

$(v, q) \leftarrow$ adjoint Navier–Stokes problem with $u_k$ (equation 2.21)
$(u, p)_k \leftarrow$ Navier–Stokes problem for $(\phi_\pm, x)_k$ (equation 2.1)
$\hat{D}_{(\cdot)} \mathscr{J} \leftarrow$ Steepest ascent directions (equations 2.31 – 2.33 and 2.44)
$s, \tau \leftarrow$ search directions and step–size (equation 2.46)
$(\phi_\pm, x)_{k+1} \leftarrow$ perturb $\phi_\pm$ and model parameters,
$\quad x$(equations 2.39 and 2.34)
$(u, p)_{k+1} \leftarrow$ linearised Navier–Stokes problem for
$\quad (\phi_\pm, x)_{k+1}$(equation 2.47)
$k \leftarrow k + 1$ $(u^\circ, p^\circ) \leftarrow (u, p)_k$
$(\Omega^\circ, x^\circ) \leftarrow (\phi_\pm, x)_k$ Output: reconstruction ($u^\circ$, $p^\circ$) and inferred model parameters ($\Omega^\circ$, $x^\circ$).

From the above formulation, the reconstructed inverse Hessian $\tilde{H}$ can be used to provide estimates for the uncertainties of the model parameters. To simplify the description, let x denote an unknown parameter distributed according to $\mathscr{N}(x_k, C_k)$. The linear approximation to the data $u^*$ is given by:

$$u^* = \mathcal{Z}x + \varepsilon, \varepsilon \sim N(0, C_k) \quad (2.48)$$

where $u = \mathcal{Z} x$, and where $\mathcal{Z}$ is the operator that encodes the linearized Navier-Stokes problem around the solution $u_k$. To solve (2.45), x is updated as follows:

$$x_{k+1} = x_k + C\mathcal{Z}^\dagger C_{u^*}^{-1}(u^* - \mathcal{Z}x_k), \text{ with } C = (\mathcal{Z}^\dagger C_{u^*}^{-1}\mathcal{Z} + C_x^{-1})^{-1} \quad (2.49)$$

where $\mathcal{Z}^\dagger$ is the operator that encodes the adjoint Navier-Stokes problem, and C is the posterior covariance operator. It can be shown that:

$$C = (\mathcal{Z}^\dagger C_{u^*}^{-1}\mathcal{Z} + C_x^{-1})^{-1} = (C_x \mathcal{Z}^\dagger C_{u^*}^{-1} \mathcal{Z} + I)^{-1} C_x \approx \tilde{H}_x C_x \quad (2.50)$$

where $\tilde{H}_x$ is the reconstructed inverse Hessian for x. Note that $\tilde{H}$ by itself approximates $(C_x \mathcal{Z}^\dagger C_u^{-1} \mathcal{Z} + I)^{-1}$, and not C, because prior-preconditioned gradients are used (i.e. steepest ascent directions $\hat{D}_{(\cdot)} \mathscr{J}$), instead of the gradients $D_{(\cdot)} \mathscr{J}$, in the BFGS formula. Therefore, if $\tilde{C} \equiv \tilde{H}_x C_x$ is the approximated covariance matrix, then samples $x_{k+1}^s$ from the posterior distribution can be drawn using the Karhunen-Loève expansion:

$$x_{k+1}^s = x_k + \sum_k \eta_k \sqrt{\lambda_k}\, \varphi_k, \text{ with } \eta_k \sim \mathcal{N}(0, 1) \quad (2.51)$$

where $(\lambda, \phi)_k$ is the eigenvalue/eigenvector pair of $\tilde{C}$. The variance of $x_{k+1}$ can then be directly computed from the samples.

The above boundary value problems can be solved numerically. In this case immersed boundary finite element method is used. In particular, the fictitious domain cut-cell finite element method (FEM), (introduced in "La pénalisation fantôme" *Comptes Rendus Mathematique* 348 (21-22), 1217-1220 and "Fictitious domain finite element methods using cut elements: II. A stabilized Nitsche method" *Applied Numerical Mathematics* 62 (4), 328-341) is implemented for the Poisson problem, and extended (in "A Stabilized Nitsche Fictitious Domain Method for the Stokes Problem" *Journal of Scientific Computing* 61 (3), 604-628, arXiv: 1206.1933; and "A stabilized Nitsche cut finite element method for the Oseen problem" *Computer Methods in Applied Mechanics and Engineering* 328, 262-300, arXiv: 1611.02895) to the Stokes and the Oseen problems.

$\mathcal{T}_{h\,h}$ is defined to be a tessellation of I produced by square cells (pixels) $K \in \mathcal{T}_h$, having sides of length h. Also defined is the set of cut-cells $\mathcal{T}_h^{\triangleright}$ consisting of the cells that are cut by the boundary $\partial \Omega$, and $\mathcal{T}_h^{\triangleright}$ is the set of cells that are found inside $\Omega$ and which remain intact (not cut)—see lower image in FIG. 1. It is assumed that the boundary $\partial \Omega$ is well-resolved, i.e. $\ell_{\partial\Omega}/h \gg 1$ where $\ell_{\partial\Omega}$ is the smallest length scale of $\partial\Omega$ (i.e. that the grid size is such that $\partial\Omega$ can be accurately represented with negligible loss of detail).

The discretized space is generated by assigning a bilinear quadrilateral finite element $Q_f$ to every cell K. To compute the integrals a standard Gaussian quadrature procedure is used for cells $K \in \mathcal{T}_h^{\triangleright}$, while for cut-cells $\mathcal{T}_h^{\triangleright}$, where integration must be considered only for the intersection $K \cap \mathcal{T}_h \Omega$, the approach in "Fast and Accurate Computation of Polyhedral Mass Properties" *Journal of Graphics Tools* 1 (2), 31-50 may be used, which relies on the divergence theorem and simply replaces the integral over $K \cap \Omega$ with an integral over $\partial(K \cap \Omega)$.

The boundary integral on $\partial(K \cap \Omega)$ is then easily computed using one-dimensional Gaussian quadrature. Since an inf-sup unstable finite element pair $(Q_f\text{-}Q_f)$ is used, a pressure-stabilizing Petrov-Galerkin formulation is also used, including $\nabla$-div stabilization for preconditioning.

To solve the Navier-Stokes problem fixed-point iteration (Oseen linearization) is used and the coupled system is solved using the Schur complement; with an iterative solver (LGMRES) for the outer loops, and a direct sparse solver (UMFPACK) for the inner loops. The immersed FEM solver, and all the necessary numerical operations of the algorithm may be implemented in Python, using its standard libraries for scientific computing, namely SciPy and NumPy. Computationally intensive functions are accelerated using Numba and CuPy.

Examples

In this section results are presented of reconstruction and segmentation of noisy flow images by solving the inverse Navier-Stokes problem (2.45) using the algorithms described above. The reconstructed velocity field is then used to estimate the wall shear rate on the reconstructed boundary.

The signal-to-noise ratio (SNR) of the $u_x^*$ image is defined as:

$$SNR_x = \frac{\mu_x}{\sigma_{u_x^*}},\; \mu_x = \frac{1}{|\Omega^\bullet|}\int_{\Omega^\bullet} |u_x^*| \quad (3.1)$$

where $\sigma_{u^*}$ is the standard deviation, $\Omega^\bullet$ is the ground truth domain, $|\Omega^\bullet|$ is the volume of this domain, and $|u_x^\bullet|$ is the magnitude of the ground truth x-velocity component in $\Omega^\bullet$.

Also defined is the component-wise averaged, noise relative reconstruction error $\mathscr{E}_x^\bullet$, and the total relative reconstruction error $\mathscr{E}^\bullet$ by:

$$\mathscr{E}_x^\bullet \equiv \log\left(\frac{1}{|\Omega|}\int_\Omega \frac{|u_x^\bullet - Su_x^\circ|}{\sigma_{u_x^\star}}\right) \text{ and } \mathscr{E}^\bullet \equiv \frac{\|u^\bullet - Su^\circ\|_{L^1(I)}}{\|u^\bullet\|_{L^1(I)}} \quad (3.2)$$

Similar measures also apply for the $u_y^*$ image (and also for the z-dimension when 3D data is considered).

The volumetric flow rate Q, the cross-section area at the inlet A, and the diameter at the inlet D are all defined in setting up the problem. The Reynolds number is based on the reference velocity U=Q/A, and the reference length D.

Example 1: Synthetic Data for 2D Flow in a Converging Channel

Testing the algorithm is initially performed on a flow through a symmetric converging channel having a taper ratio of 0.67. To generate synthetic 2D Navier-Stokes data the Navier-Stokes problem (2.1) is solved for a parabolic inlet velocity profile ($g_i$), zero-traction boundary conditions at the outlet ($g_o$=0), and Re≅534, in order to obtain the ground truth velocity $u^\bullet$. The synthetic data u* is then generated by corrupting the components of $u^\bullet$ with white Gaussian noise such that $SNR_x = SNR_y = 3$.

This test case only tries to infer $\Omega$ and $g_i$. Note that, in the present method, the initial guess $x_0$ of an unknown x equals the mean of its prior distribution $\bar{x}$, i.e. $x_0 = \bar{x}$. The algorithm is initiated using bad initial guesses (high uncertainty in priors) for both the unknown parameters (see Table 1). The initial guess for $\Omega$, labelled $\Omega_0$, is a rectangular domain with height equal to 0.7D, centred in the image domain. For $g_{i0}$ a parabolic velocity profile is used with a peak velocity of approximately 2 U that fits the inlet of 0. For comparison, $g_i^\bullet$ has a peak velocity of 1.5 U, while it is also defined on a different domain, namely $\Omega^\bullet$. The algorithm manages to reconstruct and segment the noisy flow images in thirty-nine iterations, with total reconstruction error $\mathscr{E}^\bullet \cong 1.44\%$.

Figure 3:
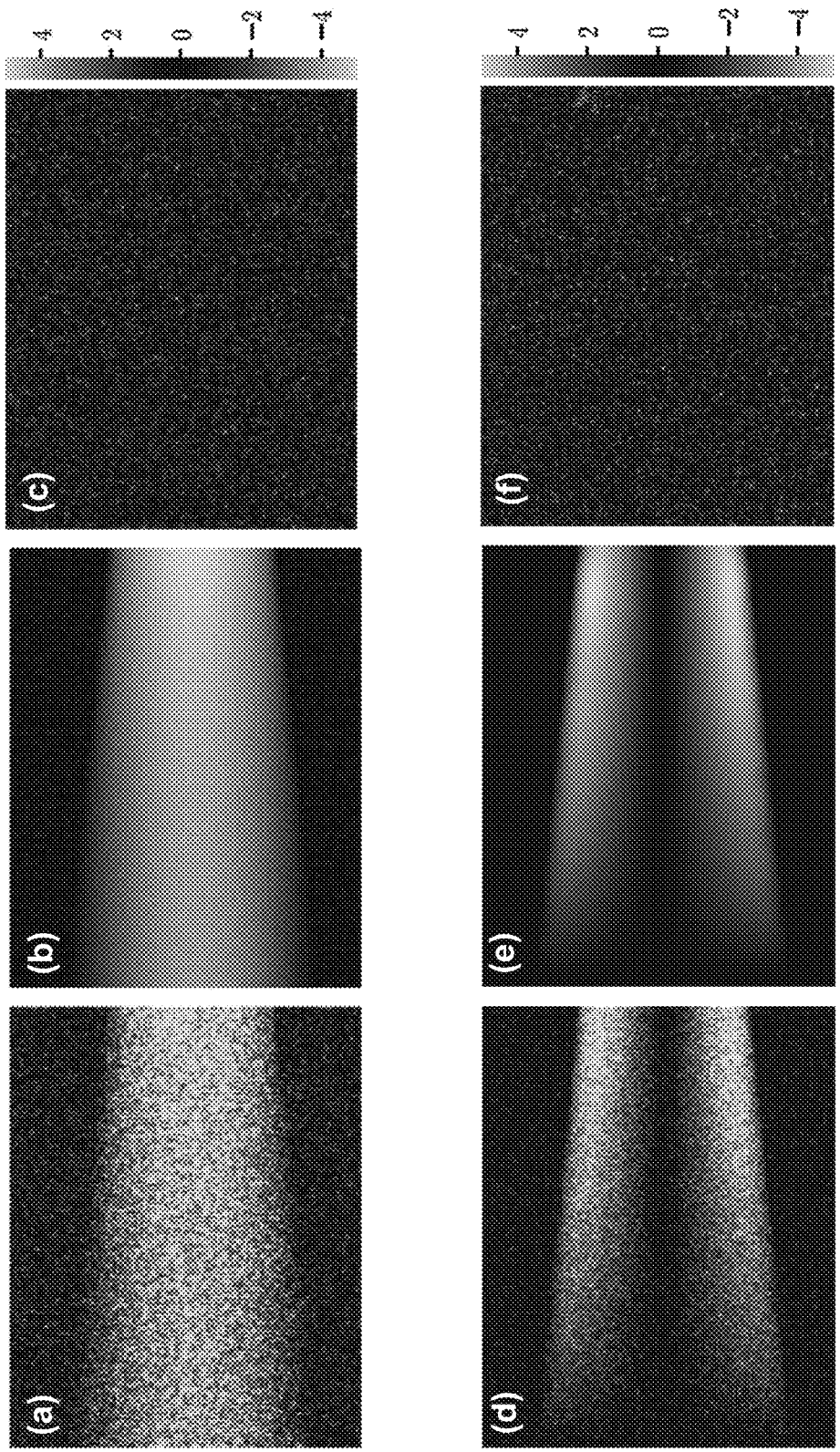
FIGS. 3a to 3j show results of the reconstruction process on synthetic MRV data of flow through a converging nozzle.
Figure 3:
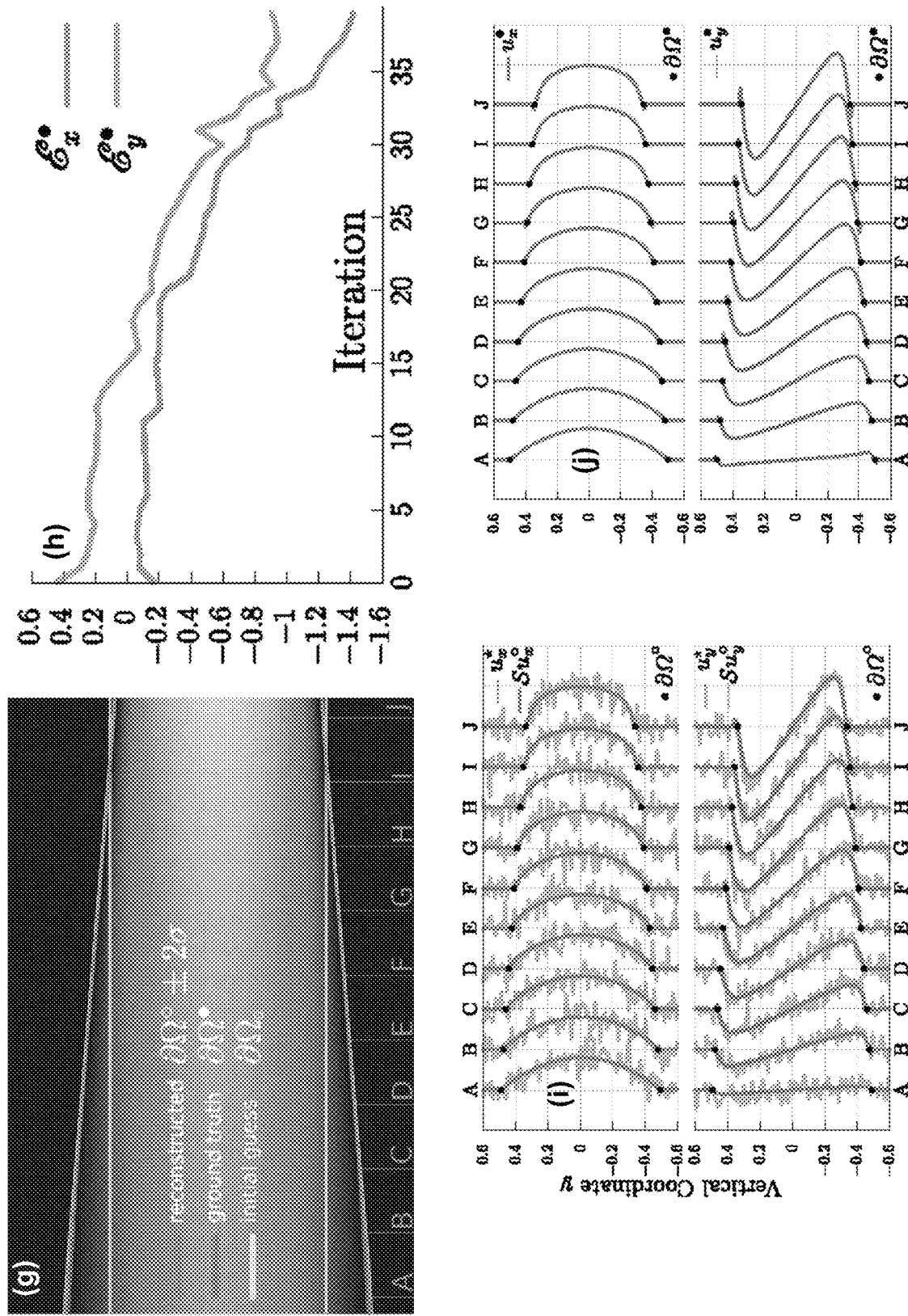

The results are presented in FIG. 3, which illustrates reconstruction and segmentation of synthetic images depicting the flow (from left to right) in a converging channel. FIGS. 3a-3b and 3d-3e show the horizontal, $u_x$, and vertical, $u_y$, velocities respectively. The FIGS. 3a and 3b show positive flow, while the upper stripe in FIGS. 3d and 3e has the opposite sign (negative) to the lower stripe (which is positive). FIGS. 3c and 3f show the discrepancy between the noisy velocity data and the reconstruction (a measure of the noise and artefacts which have been filtered out by the procedure). FIG. 3g depicts the reconstructed boundary $\partial\Omega^\circ$, the ground truth boundary $\partial\Omega^\bullet$. In this view the reconstructed boundary and the ground truth boundary lie almost entirely on top of one another, with small deviations towards the left edge of the Figure. FIG. 3g also shows a 2σ confidence region computed from the approximated posterior covariance $\widetilde{C}_\zeta = \tilde{H}_\zeta C_{\phi\pm}$ which appears like a slight broadening the reconstructed boundary in this view. FIG. 3h shows the error as a function of iteration number. Velocity slices are drawn for ten equidistant cross-sections (labelled with the letters A to J) for both the reconstructed image (FIG. 3i) and the ground truth (FIG. 3j).

It can be seen that the inverse Navier-Stokes problem performs very well in filtering the noise ($u^*-Su^\circ$) (see in particular FIGS. 3c and 3f), providing effectively noiseless images for each component of the velocity as shown in FIGS. 3b and 3e. As expected, the discrepancies $\sigma_{u^*}^{-1}(u^*-Su^\circ)$ shown in FIGS. 3c and 3f consist mainly of Gaussian white noise, except at the corners of the outlet (FIG. 3f), where there is a weak correlation. For a more detailed presentation of the denoising effect, FIGS. 3i and 3j plot slices of the reconstructed velocity and the ground truth velocity respectively. The light grey background lines represent the noisy input data, while the darker grey foreground lines represent the reconstruction.

Figure 5A:
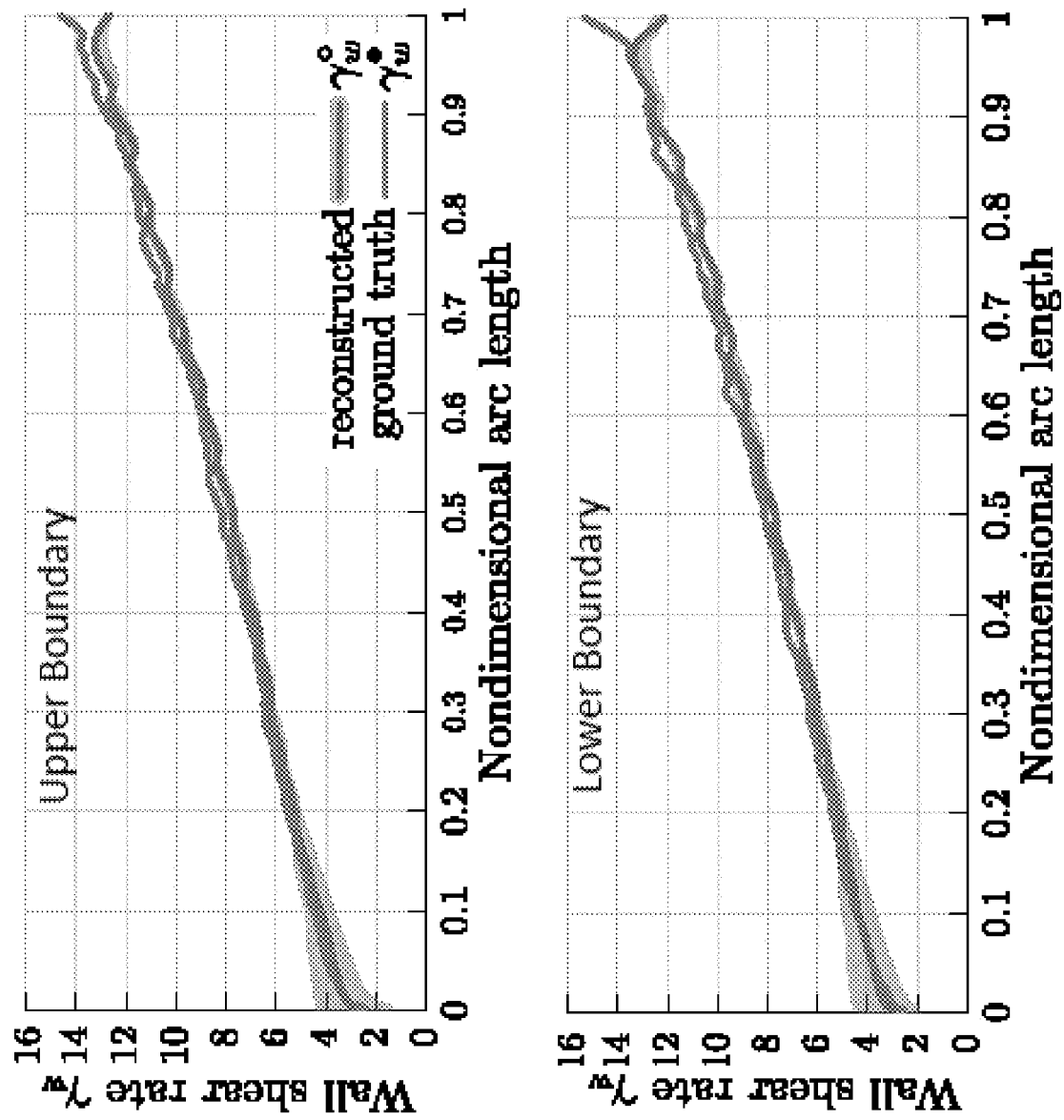
FIGS. 5a and 5b compare extracted wall shear rate for each of the synthetic datasets presented in FIGS. 3a to 3j and 4a to 4j.

Having obtained the reconstructed velocity $u^\circ$, the wall shear rate $\gamma_w^\circ$ is computable on the reconstructed boundary $\partial\Omega^\circ$, which is compared with the ground truth $\gamma_w^\bullet$ in FIG. 5a. Using the upper $\partial\Omega_+^\circ$ and lower $\partial\Omega_-^\circ$ limits of the 2σ confidence region for $\gamma_w^\circ$ (as in FIG. 3g) a confidence region for $\gamma_w^\circ$ can be estimated; although this has to be interpreted carefully. Note that, for example, $\partial\Omega_+^\circ$ and $\partial\Omega_-^\circ$ can be smoother than the mean $\partial\Omega^\circ$, and, therefore, $\partial\Omega^\circ$ may be found outside this confidence region. A better estimate of the confidence region could be obtained by sampling the posterior distribution of $\partial\Omega^\circ$ in order to solve a Navier-Stokes problem for each sample $\partial\Omega_k$ and find the distribution of $\gamma_w^\circ$. Since the latter approach would be computationally intensive, only the estimate is provided here, which requires the solution of only two Navier-Stokes problems.

Example 2: Synthetic Data for 2D Flow in a Simulated Blood Vessel

Next, the algorithm is tested in a channel that resembles the cross-section of a small abdominal aortic aneurysm, with $D_{max}/D \cong 1.5$, where $D_{max}$ is the maximum diameter at the midsection. Synthetic images are generated for u* as in section 3.1, again for $SNR_x = SNR_y = 3$, but now for Re=153. The ground truth domain $\Omega^\bullet$ has horizontal symmetry but the inlet velocity profile deliberately breaks this symmetry. The inverse problem is the same as that in Example 1 but with different input parameters (see Table 1). The initial guess $\Omega_0$ is a rectangular domain with height equal to 0:85D, centred in the image domain. For $g_{i0}$ a skewed parabolic velocity profile is used with a peak velocity of approximately 2 U that fits the inlet of $\Omega_0$. The algorithm manages to reconstruct and segment the noisy flow images in thirty-nine iterations, with total reconstruction error $E^\bullet \cong 2.87\%$.

TABLE 1

| | Image dimension | Model dimension | $\sigma_{u^*_x}/U$ | $\sigma_{u^*_y}/U$ | |
|---|---|---|---|---|---|
| Converging channel (2D) | 192 × 192 | 200 × 200 | 3.97 × 10⁻¹ | 8.97 × 10⁻³ | |
| Simulated blood vessel (2D) | 192 × 192 | 200 × 200 | 2.80 × 10⁻¹ | 5.26 × 10⁻³ | |

| Regularisation | $\sigma_{\phi\pm}/D$ | $\sigma_{g_i}/U$ | $\sigma_\nu/UD$ | $Re_{\phi\pm}$ | $Re_\zeta$ | $\tilde{m}$ |
|---|---|---|---|---|---|---|
| Converging channel (2D) | 1.0 | 2.0 | — | 0.025 | 0.025 | 3 |
| Simulated blood vessel (2D) | 1.0 | 2.0 | — | 0.1 | 0.1 | 3 |

Input Parameters for the Inverse 2D Navier-Stokes Problem with Synthetic Data.

Figure 4:
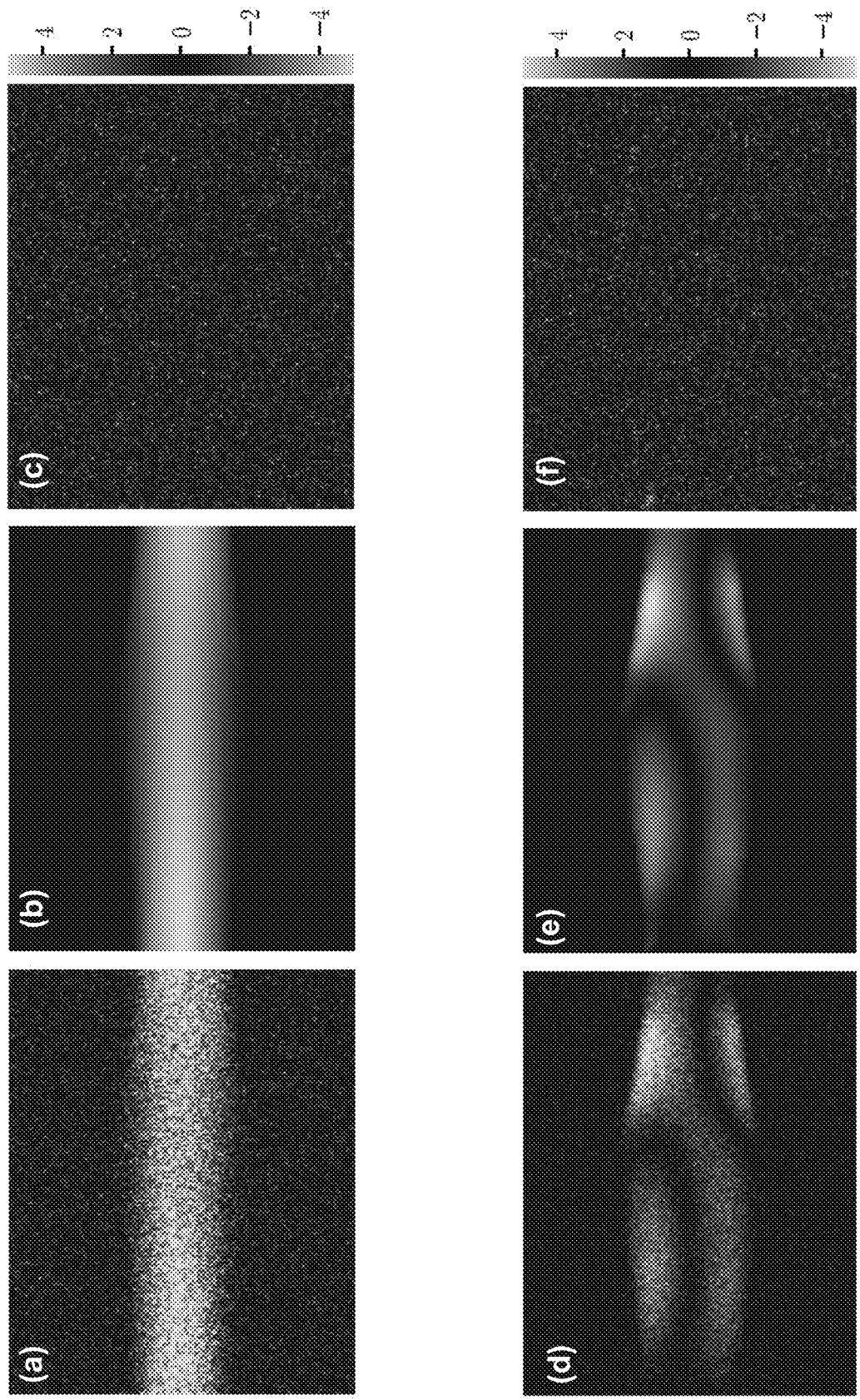
FIGS. 4a to 4j show results of the reconstruction process on synthetic MRV data of flow through a simulated blood vessel.
Figure 4:
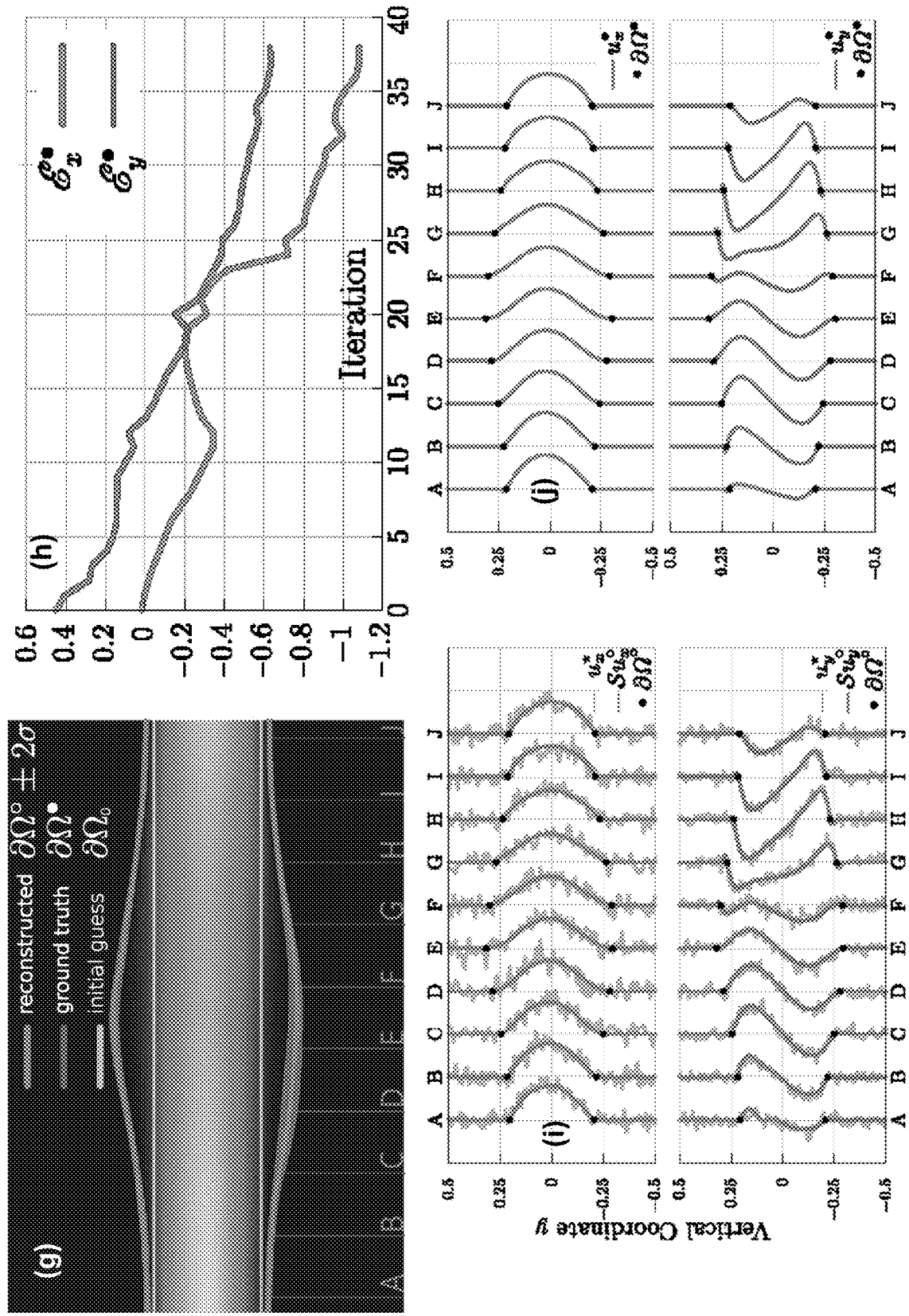

The results are presented in FIG. 4, which illustrates reconstruction and segmentation of synthetic images depicting the flow (from left to right) in a simulated blood vessel as in Example 2. FIGS. 4a, 4b and 4d, 4e show the horizontal, $u_x$, and vertical, $u_y$, velocities respectively. Once more the horizontal velocity field is positive, while the contiguous central portion of the vertical field is the opposite sign (negative) to the upper left and lower right portions (which are positive).

Figure 5B:
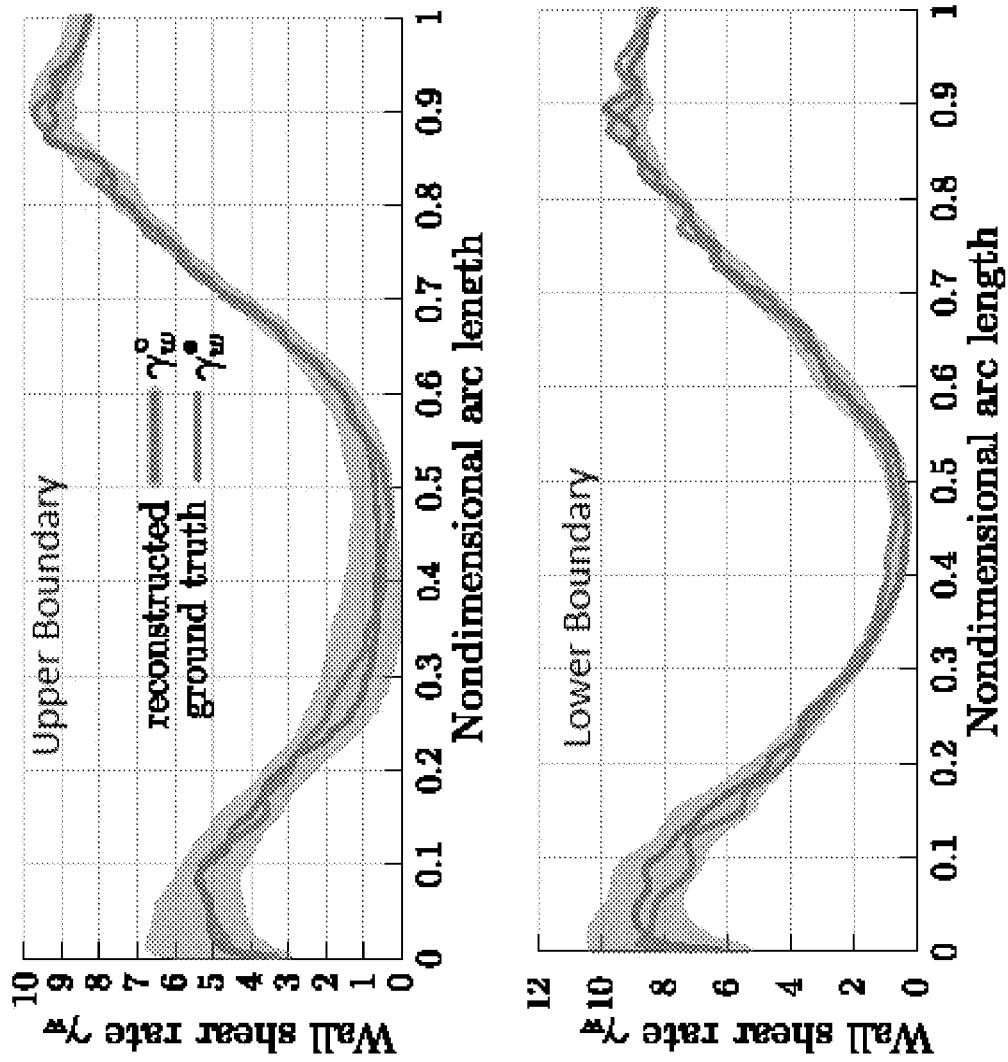

The discrepancy can be seen to consist mainly of Gaussian white noise (FIGS. 4c and 4f). Again, some correlations are visible in the discrepancy of the y-velocity component at the upper inlet corner and the upper boundary of the simulated blood vessel. FIG. 4g depicts the reconstructed boundary $\partial\Omega^\circ$, the ground truth boundary an $\partial\Omega^\bullet$. In this view the reconstructed boundary and the ground truth boundary lie almost entirely on top of one another. FIG. 4g also shows a $2\sigma$ confidence region computed from the approximated posterior covariance $\widetilde{C}_\zeta = \widetilde{H}_\zeta C_{\phi\pm}$ which provides a reasonably wide envelope around $\partial\Omega^\circ$ towards the centre of the lower part of the boundary. The latter correlations (FIG. 4f) can be explained by the associated uncertainty in the predicted shape $\partial\Omega^\circ$ (FIG. 4g), which is well estimated for the upper boundary but slightly underestimated for the upper inlet corner. It is interesting to note that the upward skewed velocity profile at the inlet creates a region of low velocity magnitude on the lower boundary. The velocity profiles in this region produce low wall shear stresses, as seen in FIGS. 4i, 4j, and 5b. These conditions are particularly challenging when one tries to infer the true boundary $\partial\Omega^\bullet$ because the local SNR is low (SNR<<1), meaning that there is considerable information loss there. Despite the above difficulties, the algorithm manages to approximate the posterior distribution of $\partial\Omega^\circ$ well, and successfully predicts extra uncertainty in this region (FIG. 4g).

As before, FIG. 4h shows the error as a function of iteration number. Velocity slices are drawn for ten equidistant cross-sections (labelled with the letters A to J) for both the reconstructed image (FIG. 4i) and the ground truth (FIG. 4j). FIGS. 4i and 4j plot slices of the reconstructed velocity and the ground truth velocity respectively. The light grey background lines represent the noisy input data, while the darker grey foreground lines represent the reconstruction.

Using the reconstructions $u^\circ$ and $\partial\Omega^\circ$ the wall shear rate is computed and compared with the ground truth in FIG. 5b. It can be observed that the reconstructed solution approximates the ground truth well, even for very low signal to noise ratios (SNR=3). Note that the waviness of the ground truth $\gamma_w^\bullet$ is due to the relatively poor resolution of the level set function that was intentionally used to implicitly define this domain.

FIG. 5 compares the derived wall shear rate $\gamma_w = \tau \cdot \partial_n u$ where $\tau$ is the unit tangent vector of $\partial\Omega$ for the two test cases with synthetic data—(a) the converging channel (Example 1); and (b) the simulated blood vessel (Example 2). The wall shear stress is found by multiplying this by the viscosity. The reconstructed wall shear rate ($\gamma_w^\circ$) is calculated on $\partial\Omega^\circ$ and for $u^\circ$, while the ground truth ($\gamma_w^\bullet$) is calculated on $\partial\Omega^\bullet$ and for $u^\bullet$. The light grey region is bounded by the two wall shear rate distributions for $u^\circ$, calculated on the upper ($\partial\Omega_+^\circ$) and lower ($\partial\Omega_-^\circ$) limits of the $2\sigma$ confidence region of $\partial\Omega^\circ$. Note that the reconstructed solution can sometimes be found outside the light grey region because the reconstructed shape $\partial\Omega^\circ$ may be less regular than $\partial\Omega_+^\circ$ or $\partial\Omega_-^\circ$.

Magnetic Resonance Velocimetry Experimental Set Up

Figure 6:
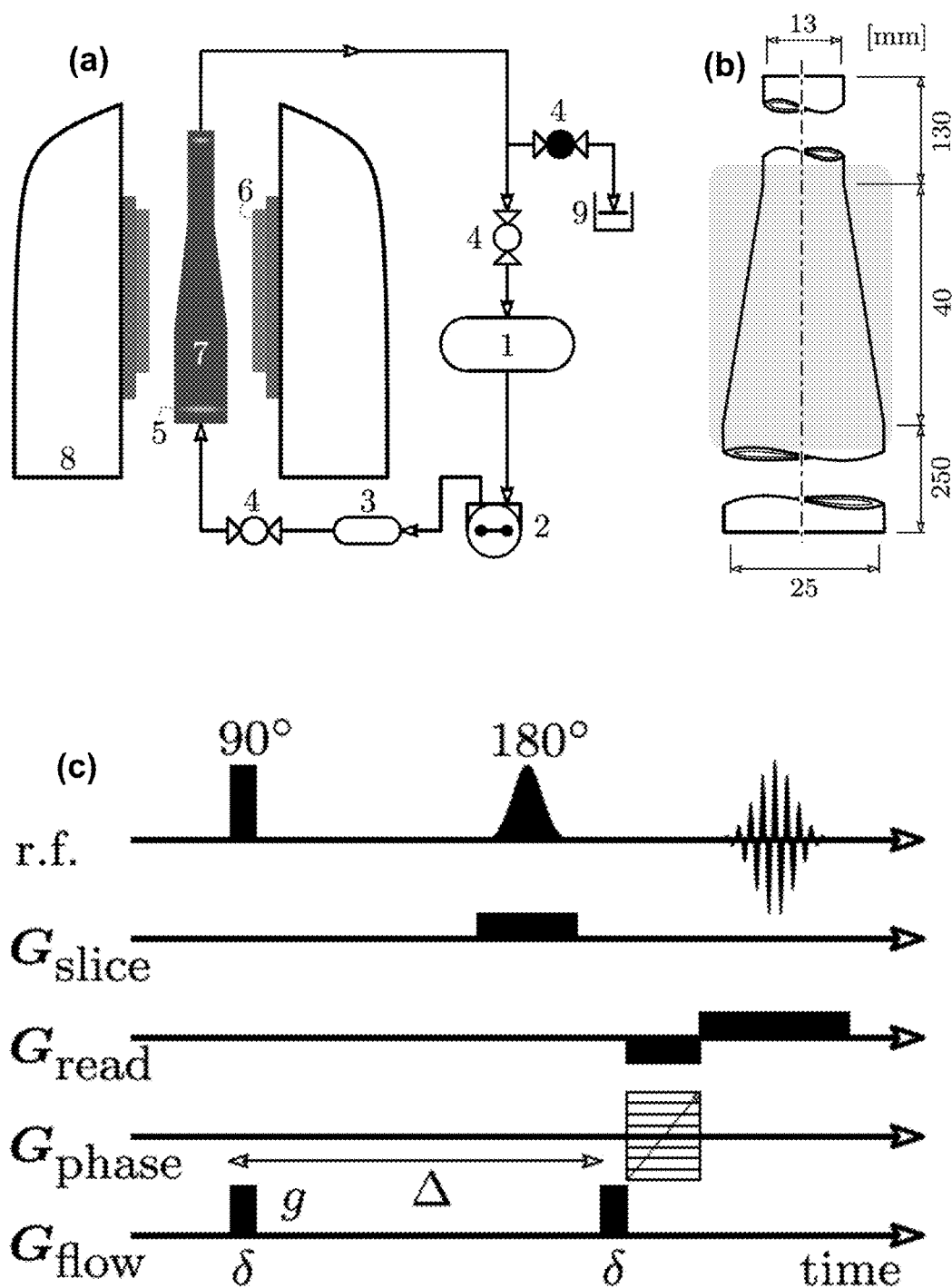
FIG. 6a shows a schematic of the experimental apparatus for deriving MRV data.
FIG. 6b shows a detailed view of the converging nozzle.
FIG. 6c is a schematic representing the pulse sequences used.

The flow through a converging nozzle was measured using magnetic resonance velocimetry (MRV). The nozzle converges from an inner diameter of 25 mm to an inner diameter of 13 mm, over a length of 40 mm (FIG. 6b). On either side of the converging section, the entrance to-exit length equals 10 times the local diameter (FIG. 6b) in order to ensure the absence of entrance/exit effects. Velocity images were acquired for a Reynolds number of 162 (defined at the nozzle outlet). A 40 wt % glycerol in water solution was used as the working fluid in order to increase the viscosity and minimize the effect of thermal convection in the resulting velocity field due to the temperature difference between the magnet bore and the working fluid. The nozzle is made of polyoxymethylene to minimize magnetic susceptibility differences between the nozzle wall and the working fluid.

FIG. 6a depicts the schematic of the flow loop of the MRV experiment. A 20 L holding tank 1 stores a reservoir of the water/glycerol solution. Clamp valves 4 are disposed about the flow circuit to control the flow. To pump the water/glycerol solution a peristaltic pump 2 (Watson Marlow 505S (Watson Marlow, Falmouth UK)) was used with a 2 L dampening vessel 3 at its outlet to dampen flow oscillations introduced by the peristaltic pump 2. To make the flow uniform, porous polyethylene distributor plates 5 were installed (SPC technologies, Fakenham UK) at the entrance and the exit of the nozzle.

The MRV system comprises radiofrequency probe 6 and a 4.7 T superconducting magnet 8. Within the bore of the magnet 8 a converging nozzle 7 (FIG. 6b provides a detailed sketch of the nozzle 7) is located and supplied with the water/glycerol solution, which flows through the nozzle. The MRV system images the flow through the nozzle 7 as described elsewhere in this document, and the results of the imaging are processed in accordance with the methods described herein. A volumetric cylinder 9 is provided for flow measurements.

The velocity images were acquired on a Bruker Spectrospin DMX200 with a 4.7 T superconducting magnet, which is equipped with a gradient set providing magnetic field gradients of a maximum strength of 13.1 $\text{Gcm}^{-1}$ in three orthogonal directions, and a birdcage radiofrequency coil tuned to a $^1$H frequency of 199.7 MHz with a diameter and a length of 6.3 cm. To acquire 2D velocity images slice-selective spin-echo imaging was used combined with pulsed gradient spin-echo (PGSE) for motion encoding (see FIG. 6c). Each of the three orthogonal velocity components were measured in a 1 mm thick transverse slice through the converging section of the nozzle, which is centered along the nozzle centerline.

The flow images acquired have a field of view of 84.2× 28.6 mm at 512×128 pixels, giving an in-plane resolution of 165×223 μm. For velocity measurements in the net flow direction, a gradient pulse duration, δ, of 0.3 to 0.5 ms and flow observation times, Δ, of 9 to 12 ms were used. For velocity measurements in the perpendicular to the net flow direction, an increased gradient pulse duration, δ, of 1.0 ms and an increased observation time, Δ, of 25 to 30 ms were used, due to the lower velocity magnitudes in this direction. The amplitude, g, of the flow encoding gradient pulses was set to ±3 $\text{Gcm}^{-1}$ for the direction parallel to the net flow and to +1.5 $\text{Gcm}^{-1}$ for the direction perpendicular to the net flow, in order to maximize phase contrast whilst avoiding velocity aliasing by phase wrapping. To obtain an image for each velocity component, the phase difference between two images acquired with flow encoding gradients having equal magnitude g but opposite signs was taken. To remove any phase shift contributions that are not caused by the flow, the measured phase shift of each voxel was corrected by subtracting the phase shift measured under zero-flow conditions. The gradient stabilization time used is 1 ms and the signal was acquired with a sweep width of 100 KHz. Hard 90° excitation pulses with a duration of 85 µs and a 512 µs Gaussian-shaped soft 180° pulse were used for slice selection and spin-echo refocusing. FIG. 6c shows the spin-echo sequence in detail, including slice selective refocusing and flow encoding.

It was found that the $T_1$ relaxation time of the glycerol solution was 702 ms, as measured by an inversion recovery pulse sequence. To allow for magnetization recovery between the acquisitions, a repetition time of 1.0 s was used. To eliminate unwanted coherences and common signal artefacts, such as DC offset, a four step phase cycle was used.

To be consistent with the standard definition used in MRI/MRV, the SNR of each MRV image is defined using (3.1), but with $\mu_x$ replaced by the mean signal intensity (images of the $^1$H spin density) over the nozzle domain ($\mu_I$), and $\sigma_{u^*_x}$ replaced by the standard deviation of the Rayleigh distributed noise in a region with no signal ($\sigma_I$). The standard deviation for the phase is therefore $\sigma_\varphi = 1/SNR$. The MRV images are acquired by taking the sum/difference of four phase images, and then multiplying by the constant factor $\frac{1}{2}\gamma g\delta\Delta$, where $\gamma$ is the gyromagnetic ratio of $^1$H (linear relation between the image phase and the velocity). The error in the MRV measured velocity is therefore $\sigma_u = \sigma_\varphi / \gamma g\delta\Delta$. To acquire high SNR images (FIG. 7), 32 scans were averaged, resulting in a total acquisition time of 137 minutes per velocity image (~4.6 hours for both velocity components). To evaluate the denoising capability of the algorithm poor SNR images were also acquired by averaging only 4 scans (the minimum requirement for a full phase cycle) and decreasing the repetition time to 300 ms, resulting in a total acquisition time of 5.1 minutes per velocity image (10.2 minutes for both velocity components).

To verify the quantitative nature of the MRV experiment the volumetric flow rates calculated from the MRV images (using 2D slice-selective velocity imaging in planes normal to the direction of net flow) were compared with the volumetric flow rates measured from the pump outlet. The results agree with an average error of ±1.8%.

Example 3: Magnetic Resonance Velocimetry Data in a Converging Nozzle

Figure 7:
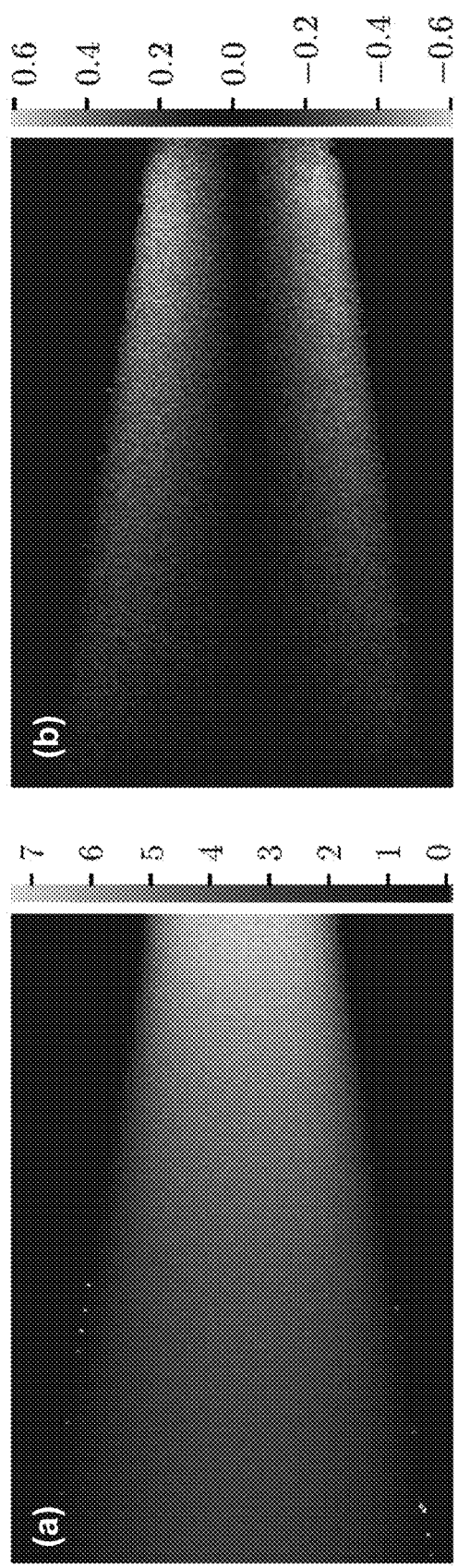
FIGS. 7a and 7b show high signal-to-noise ratio (SNR) MRV data derived from the apparatus and pulse in FIGS. 6a to 6c.

The algorithm may also be used to reconstruct and segment the low SNR images (u*) that were acquired during the MRV experiment described above, and they are then compared them with the high SNR images of the same flow (u$^\bullet$ in FIG. 7). The flow is axisymmetric with zero swirl.

The subscript 'x' is replaced by 'z', which denotes the axial component of velocity, and the subscript 'y' is replaced by 'r', which denotes the radial component of velocity. The low SNR images (SNR$_z$=6.7, SNR$_r$=5.8) required a total scanning time of 5.1 minutes per velocity image (axial and radial components), and the high SNR images (SNR$_z$=44.2, SNR$_r$=34.4) required a total scanning time of 137 minutes per velocity image. FIG. 7 shows high SNR images in the r and z directions. (average of 32 scans with SNR$_z$≅44; SNR$_r$≅34) for the flow through the converging nozzle (units in [cm/s]).

Since the signal intensity of an MRV experiment corresponds to the 1H spin density, the spin density image is segmented using a thresholding algorithm in order to obtain a mask $\psi$, such that $\psi=1$ inside $\Omega$ (the nozzle) and $\psi=0$ outside $\Omega$. $\psi$ is considered to be the prior information for the geometry of the nozzle, which also serves as an initial guess for $\Omega$ ($\Omega_0$). For $g_{i0}$ a parabolic velocity profile is taken, having a peak velocity of 0.6 U, where U≅5 cm/s is the characteristic velocity for this problem.

In this case the kinematic viscosity is treated as an unknown, with a prior distribution $\mathcal{N}(\bar{v},(0.1\bar{v})^2)$, and $\bar{v}=4\times10^{-6}$ m$^2$/s. Note that the axis of the nozzle is not precisely known beforehand, and since it is only necessary to solve an axisymmetic Navier-Stokes problem on the z-r half-plane, an unknown variable is also introduced for the vertical position of the axis.

The axisymmetric Navier-Stokes problem is:

$$u \cdot \nabla u - v\Delta u + \nabla p + f = 0, \nabla \cdot u = 0$$

where:

$$u = u_z \hat{z} + u_r \hat{r}, \nabla u = (\partial_z u, \partial_r u), \Delta u = \partial_z^2 u_z + \partial_r^2 u_r + \frac{1}{r}\partial_r u_r$$

$$\nabla \cdot u = \partial_z u_z + \partial_r u_r + \frac{u_r}{r}, f = \left(0, \frac{vu_r}{r^2}\right)$$

for unit vectors $\hat{z}$ and $\hat{r}$ in the axial and radial directions respectively. The nonlinear term u·∇u retains the same form as in the Cartesian frame.

In order to compare the axisymmetric modelled velocity field with the MRV images, two new operators are introduced: i) the reflection operator $\mathcal{R}: \mathbb{R}^+ \times \mathbb{R} \to \mathbb{R} \times \mathbb{R}$ and ii) a rigid transformation $\mathcal{T}: \mathbb{R}^2 \times \mathbb{R}^2$. The reconstruction error is then expressed by:

$$\mathcal{E}^I(u) \equiv \frac{1}{2}\|u^\star - \mathcal{STR}u\|^2_{C_{u^\star}} := \frac{1}{2}\int_I (u^\star - \mathcal{STR}u)C_{u^\star}^{-1}(u^\star - \mathcal{STR}u)dxdy$$

An unknown variable is introduced for the vertical position of the axisymmetry axis by letting $\mathcal{T}u=u(x,y+y_0)$, for $y_0$ being constant. Then, the generalized gradient for $y_0$ is:

$$\langle D_{y_0'} \mathcal{E}, y_0' \rangle_\mathbb{R} = \left\langle -\int_I C_{u^\star}^{-1}(u^\star - \mathcal{STR}u)(u^\star - \mathcal{STR}\partial_y u), y_0' \right\rangle_\mathbb{R}$$

and $y_0$ is treated in the same way as the inverse Navier-Stokes problem unknowns {x}.

Figure 8:
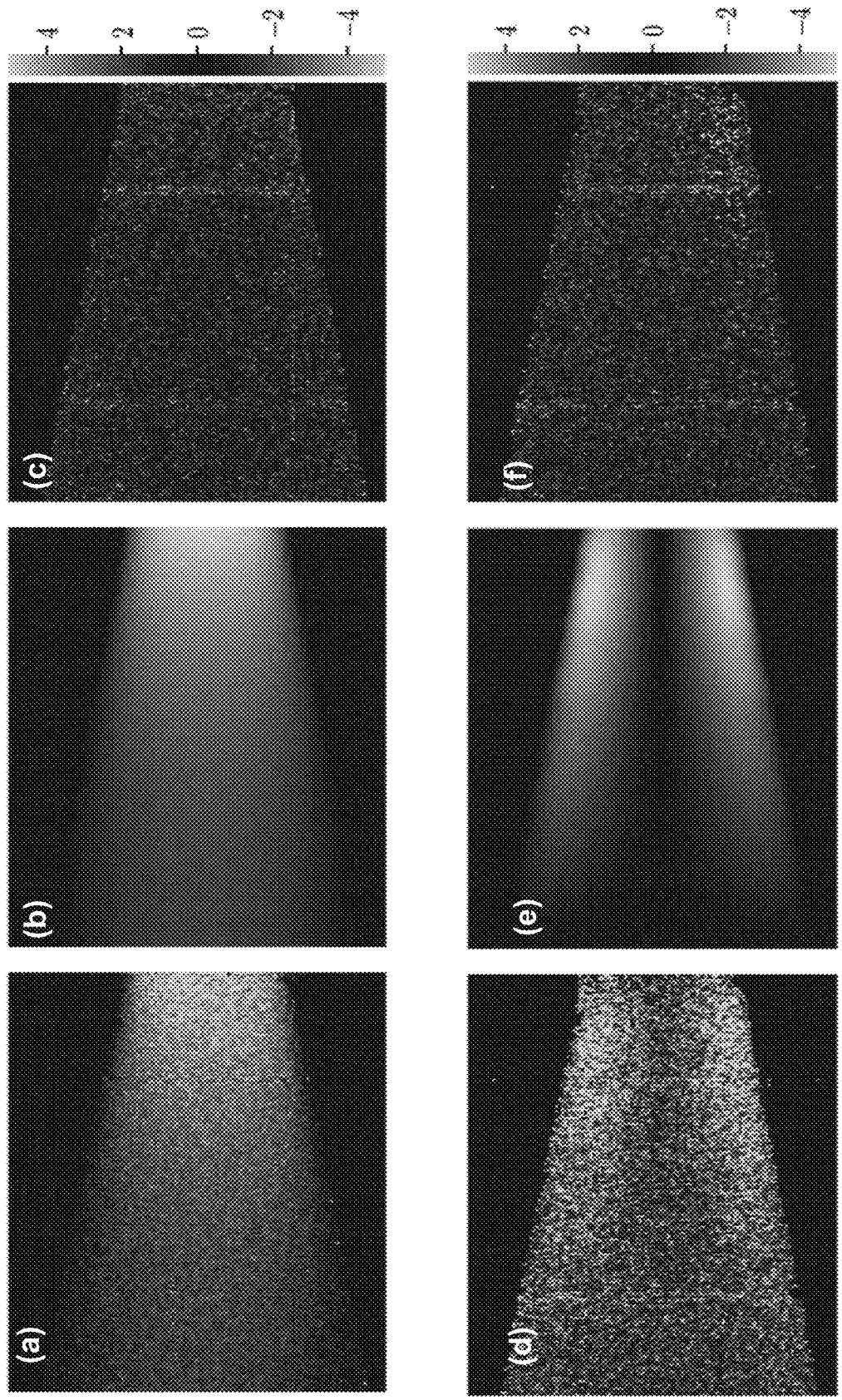
FIGS. 8a to 8j show low SNR images of the same flow system as FIG. 7, including a reconstruction of those images in line with the reconstruction process set out herein.
Figure 8:
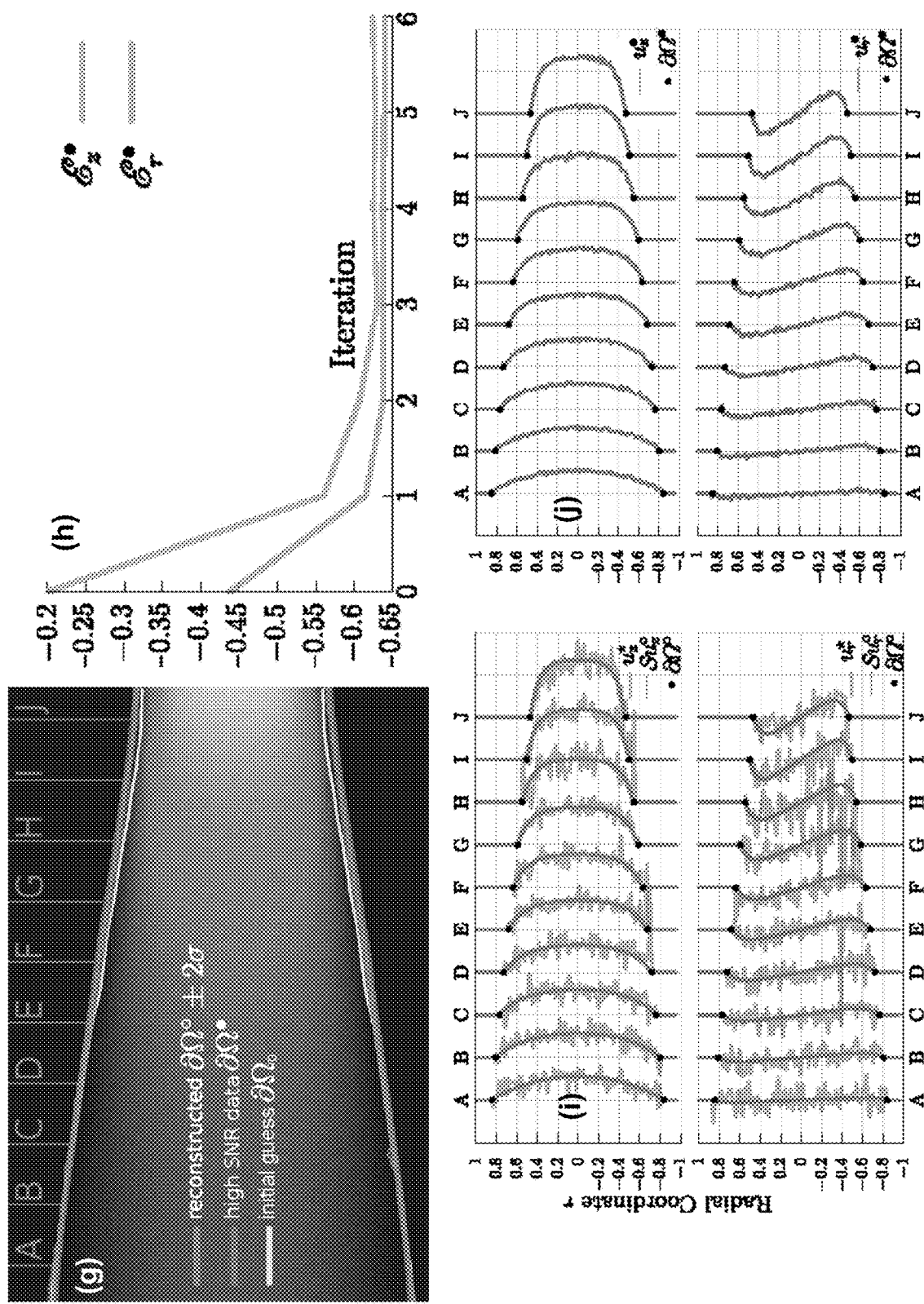

Using the input parameters of Table 2, the algorithm manages to reconstruct the noisy velocity image and reduce segmentation errors in just six iterations, with total reconstruction error $E^\bullet \cong 5.94\%$ The results for the low SNR MRV images are presented in FIG. 8, showing axial už in FIG. 8a, $u_r^*$ in FIG. 8d, the axial and radial reconstruction velocity fields in FIGS. 8b and 8e respectively and the axial and radial discrepancy terms $\sigma_{u^*_z}^{-1}(u_z^* - Su_z^\circ)$ and $\sigma_{u^*_z}^{-1}(u_z^* - Su_z^\circ)$ in FIGS. 8c and 8f.

As with similar other figures, FIG. 8g shows the velocity magnitude |u$^\circ$| and shape $\partial\Omega^\circ$ (with a 2σ confidence interval. FIG. 8h shows the reconstruction error history and FIGS. 8i and 8j show respectively low and high SNR data (light grey background) and reconstruction (dark grey foreground). Similar comments apply as for FIG. 3, but noting that FIG. 8 shows the magnetic resonance velocimetry images of the axisymmetric flow (from left to right) in a converging nozzle. The reconstructed flow u$^\circ$ is axisymmetric by construction, therefore $u_z^\circ$ depicts an even reflection and $u_r^\circ$ depicts an odd reflection, so that they can be compared with the MRV images.

It can be seen that the algorithm manages to filter out the noise, the outliers, and the acquisition artefacts of the low SNR MRV images depicting the axial $u_z^*$ (FIG. 8a) and the radial $u_r^*$ (FIG. 8d) component of velocity. A notable difference between these real MRV images and the synthetic MRV images in Examples 1 and 2, is that the real MRV images display artefacts and contain outliers. The MRV images have not been pre-processed for example by removing outliers. The estimated posterior uncertainty of $\partial\Omega^\circ$ is depicted in FIG. 8g, in which it can be observed that regions with gaps in the data coincide with regions of higher uncertainty.

Although the kinematic viscosity v is treated as an unknown parameter, the posterior distribution of v remains effectively unchanged. More precisely, a kinematic viscosity is inferred of $v^\circ = 3.995 \times 10^{-6} \cong \bar{v}$, with a posterior variance of $(0.1005\bar{v})^2$. This is because a Bayesian approach is used in approaching this inverse problem, where the prior information for v is already rich enough. Technically, the reconstruction functional $\mathscr{E}$ is insensitive to small changes of v (or 1/Re), and, as a result, the prior term in the gradient of v (equation (2.33)) dominates; i.e. the model $\mathscr{M}$ is not informative. Physically, it is not possible to infer v (with reasonable certainty) for this particular flow without additional information on pressure.

Figure 9:
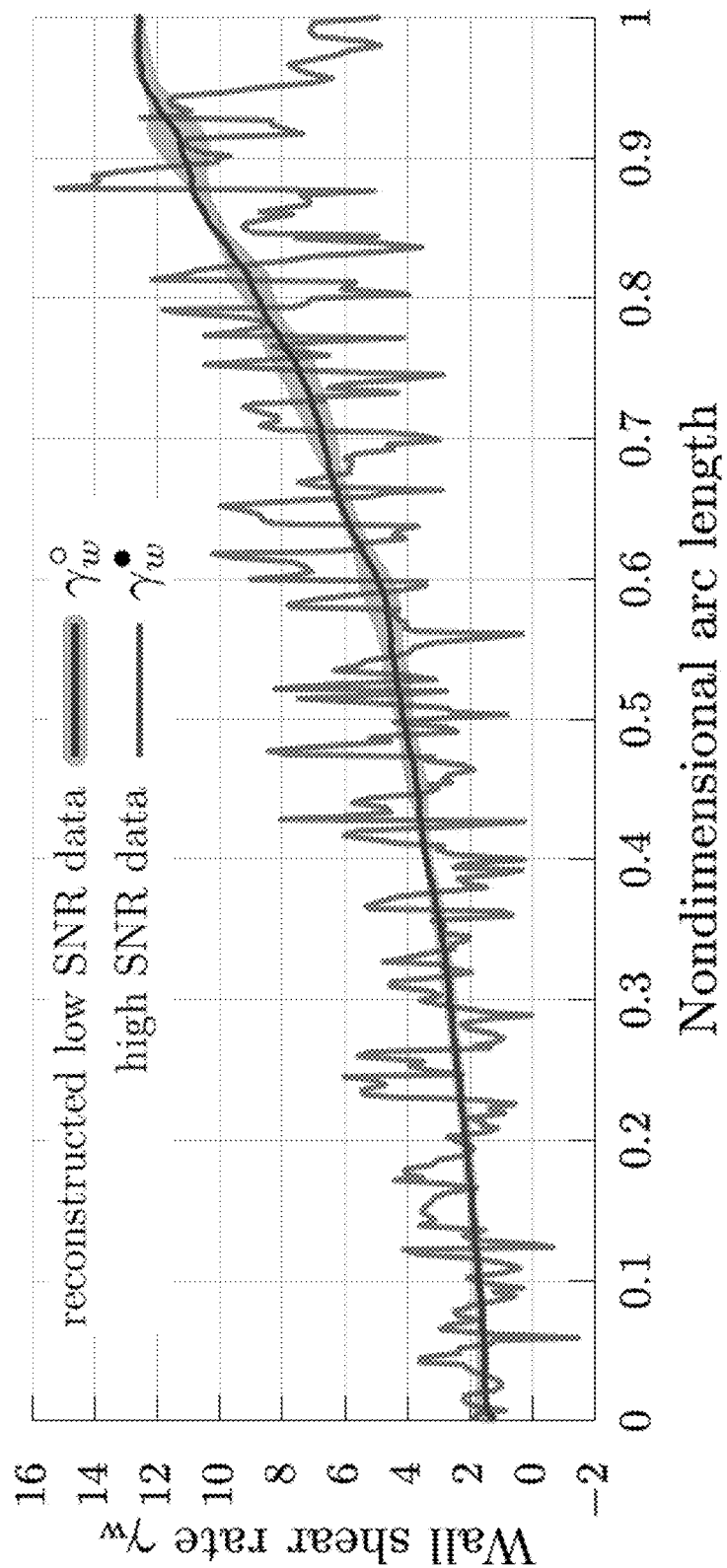
FIG. 9 shows extracted wall shear rate for each of the datasets presented in FIGS. 7a, 7b and 8a to 8j.

FIG. 9 shows the reconstructed wall shear rate $\gamma_w^\circ$, derived from MRV images of axisymmetric flow in a converging nozzle, computed for the reconstructed velocity field $u^\circ$ on the segmented shape $\partial\Omega^\circ$, and compares it with the ground truth wall shear rate $\gamma_w^\bullet$, computed for the high SNR velocity field $u^\bullet$ (see FIG. 7) on the high SNR shape $\partial\Omega^\bullet$ ($^1$H spin density). It is seen that the ground truth wall shear rate is particularly noisy, as MRV suffers from low resolution and partial volume effects near the boundaries $\partial\Omega$. It is clear that the lighter grey background (high SNR) performs very poorly in extracting this parameter, due to averaging over many datasets. The darker grey foreground line (with pale grey confidence interval) performs much better, because of the physical realism requirements imposed by the procedure. The wall shear rate may be of particular use in designing fluid transport components (in fields ranging from medical devices, e.g. stents, to petrochemical or other chemical engineering contexts), or in determining whether to proceed with a repair operation (e.g. whether surgery is necessary or replacement of a faulty component should occur) since the shear rate is an important factor in determining whether a boundary will rupture under given flow conditions. The confidence interval is again useful here, in allowing the user to make a determination based on the data, secure in the knowledge that they have the appropriate amount of trust in their determination.

Certainly, it is possible to smooth the boundary $\partial\Omega^\bullet$ using conventional image processing algorithms. However, the velocity field $u^\bullet$ will not be consistent with the new smoothed boundary (the no-slip boundary condition will not be satisfied). The method proposed here for the reconstruction and segmentation of MRV images tackles exactly this problem: it infers the most likely shape of the boundary ($\partial\Omega^\circ$) from the velocity field itself, without requiring an additional experiment (e.g. CT, MRA) or manual segmentation using another software.

Furthermore, in this Bayesian setting it is possible to use the $^1$H spin density to introduce a priori knowledge of $\partial\Omega$ in the form of a prior, which would prove useful in areas of low velocity magnitudes where the velocity field itself does not provide enough information in order to segment the boundaries. As a result, the algorithm performs very well in estimating the posterior distribution of wall shear rate, a quantity which depends both on the velocity field and the boundary shape, and which is hard to measure otherwise.

TABLE 2

| | Image dimension | Model dimension | $\sigma_{u^*_x}/U$ | $\sigma_{u^*_y}/U$ |
|---|---|---|---|---|
| Nozzle (3D) | 255 × 128 | 300 × 130 | $1.4168 \times 10^{-1}$ | $3.0679 \times 10^{-2}$ |
| Regularisation | $\sigma_{\phi_\pm}/D$ | $\sigma_{g_i}/U$ | $\sigma_v/UD$ | $Re_{\phi_\pm}$ $Re_\xi$ $\sqrt{h}$ |
| Nozzle (3D) | 0.25 | 0.5 | $6.2 \times 10^{-4}$ | 0.025 0.025 3 |

Input Parameters for the Inverse 3D

Regularization is crucial in order to successfully reconstruct the velocity field and segment the geometry of the nozzle in the presence of noise, artefacts, and outliers. Regularization comes from the Navier-Stokes problems (primal and adjoint) ($\mathscr{M}$) and the regularization of the model parameters ($\mathscr{R}$). For example, overfitting of the shape $\partial\Omega$ is avoided by choosing the Reynolds numbers for the geometric flow to be $Re_{\phi_\pm} = Re_\xi = 0.025$. Increasing these Reynolds numbers to around 1.0, it is seen that the assimilated boundary becomes more susceptible to noise in the image. From numerical experiments it has been observed that typical successful values for the Reynolds numbers $Re_{\phi_\pm}$, $Re_\xi$ lie in the interval (0.01, 0.1) for low SNR images (SNR<10), in (0.1; 1.0) for higher SNR images (SNR>10), and above 1.0 for geometries with regions of high curvature.

Figure 10:
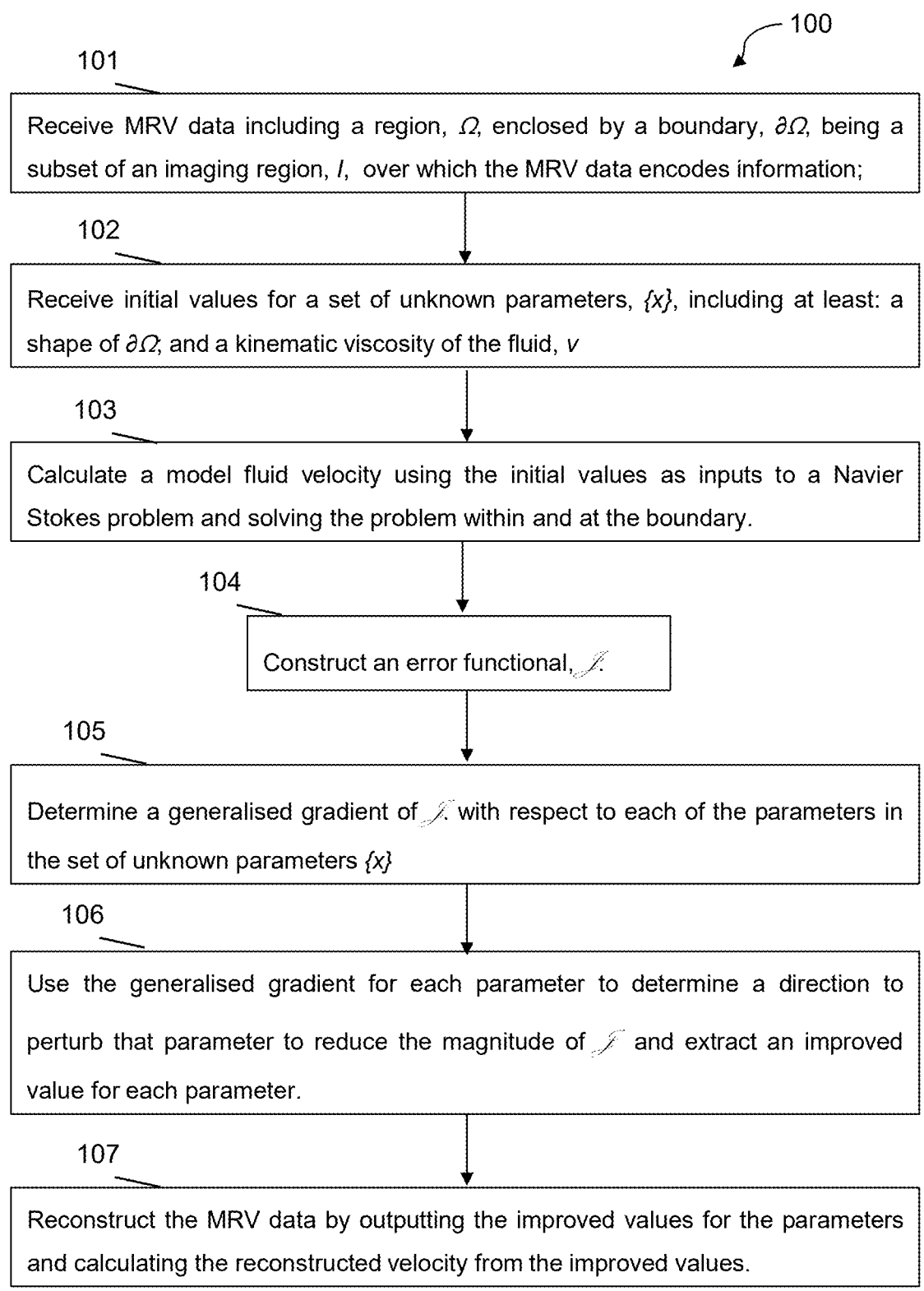
FIG. 10 is a flow chart describing the general operational steps of the method.

In summary, the procedure described above may be thought of as a series of process steps, as captured in the flow chart 100 depicted in FIG. 10, the process starts at step 101, in which MRV data encoding information relating to a fluid velocity field, u*, are received. A subset of the MRV data forms a region, $\Omega$, enclosed by a boundary, $\partial\Omega$. The boundary includes at least a physical boundary portion, $\Gamma$. As an example, the boundary optionally further includes an inlet portion, $\Gamma_i$, and/or an outlet portion, $\Gamma_o$. The region $\Omega$ is a subset of an imaging region, I, over which the MRV data encodes information.

Next, at step 102, initial values for a set of unknown parameters, {x}, are received. The set of unknown parameters includes at least a shape of the boundary, $\partial\Omega$, within which the fluid is located; and a kinematic viscosity of the fluid, v. Optionally, the initial values for parameters may also include an inlet boundary condition for the fluid, $g_i$ where an inlet portion exists; and/or an outlet boundary condition for the fluid, $g_o$ where an outlet portion exists;

At step 103 a model fluid velocity field, $u^\circ$, is calculated, using the initial values as inputs to a Navier-Stokes problem. This problem is then solved for the velocity field within and at the boundary.

In order to optimise the input parameters, an error functional, $\mathscr{J}$, is constructed in step 104. This error functional has the form:

$$\mathscr{J} = \mathscr{E} + \mathscr{R} + \mathscr{M}$$

in which $\mathscr{E}$ is a penalty term which penalises deviations in $u^\circ$ from the received MRV data; $\mathscr{R}$ is a penalty term which penalises outcomes for in $u^\circ$ which arise from statistically unlikely values for the parameters in the set of unknown parameters, {x}, and $\mathscr{M}$ is a penalty term which penalises deviations in $u^\circ$ from the Navier Stokes problem.

At step 105, a generalised gradient of $\mathcal{J}$ with respect to each of the unknown parameters in the set {x} is determined. These generalised gradients are then used in step 106 to determine a direction in which to perturb each parameter, by evaluating each generalised gradient at the initial value of its respective parameter. The generalised gradients allow the determination of a direction of perturbation of that parameter which will lead to a reduction in the magnitude of $\mathcal{J}$. The initial value for each parameter is then updated to an improved parameter by taking a step in the direction determined by the evaluation of the generalised gradient.

From this point, an improved velocity field can be extracted. At step 107, the MRV data is reconstructed by outputting the improved values from step 106 and calculating the reconstructed velocity, u, across at least the region $\Omega$, based on the improved values. As noted above, the procedure may be an iterative one in the sense that some of the steps may be repeated multiple times to converge on the optimal set of values such that the parameters minimise $\mathcal{J}$ as best they can.

Reconstruction of Sparse k-Space Magnetic Resonance Velocimetry Data

Moving on to an extension of the methods set out above, in which the MRV data is supplied as sparse MRV data. It has been realised by the inventors that the Navier-Stokes equation contains much more information than purely mathematical variational methods. This permits reconstruction and/or segmentation of even sparser signals.

MRV data may be supplied in a sparse format for many reasons, but the primary motivation for developing an algorithm to handle sparse MRV data is to allow a reduction in MRV signal acquisition time and thereby speed up the overall time to acquire high quality, low noise images.

The discussion above assumes that the MRV samples have already been processed to extract the flow (i.e. velocity field) information. This is typically performed by acquiring signals, s, in frequency space (sometimes referred to as k-space), and taking the inverse Fourier transform of s, $\mathcal{F}^{-1}$ s. The magnitude ($|\mathcal{F}^{-1} s|$) and phase ($\arg(\mathcal{F}^{-1} s)$) of the result are then used to extract information on the density and velocity of fluids in the imaging region.

To extract velocity at least 4 signals (4 individual scans) are required, each signal acquired with a specific magnetic gradient pulse. The velocity image along a direction is then recovered by combining 4 phase images, i.e. $\arg(\mathcal{F}^{-1} s_i)$ for i=1, 2, 2 4.

Consequently, to measure a 2D velocity field at least 8 scans are needed, and for a 3D velocity field at least 12 scans are required. When k-space is fully-sampled there is a unique correspondence between the signal s and the measured velocity field u*, then the methodology presented above is generally preferable because it is simpler. However, when k-space is sparsely-sampled there is not a unique correspondence between s and u*, because s is not measured at every point of the frequency space (there are gaps in k-space). One option is to fill these gaps with zeros, and then take the inverse Fourier transform, but this introduces artefacts and produces images of low quality.

Figure 11:
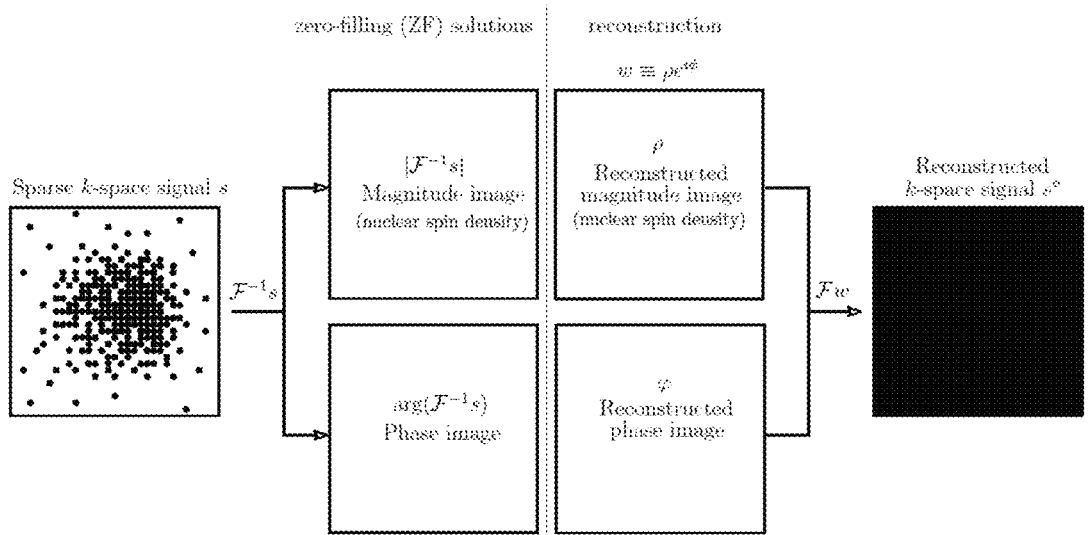
FIG. 11 is an illustration of the differences between zero-filling and reconstructing in the context of k-space data.

A comparison between zero-filling and reconstruction is shown schematically in FIG. 11. As can be seen, rather than simply accepting the absence of information inherent in the missing k-space information, a reconstruction process similar to that described above is used to infer the missing k-space data. As will be seen below, where the reconstruction makes use of physical reality (via the Navier-Stokes equations) and statistical likelihood (via Bayesian inference), the reconstruction of missing k-space data is possible with a good degree of accuracy.

In order to obtain reconstructed images of similar quality to the method set out above, the functional to be minimised is changed to the following form:

$$\mathcal{J} = \mathcal{E}' + \mathcal{R} + \mathcal{R}_u + \mathcal{M} + \mathcal{S}$$

in which the $\mathcal{R}$ and $\mathcal{M}$ terms have the same form as set out above, the $\mathcal{R}_u$ term is a velocity regularisation term, which penalises non-compliance between the measured data $u_k^*$ and the modelled data $u_k$, and has the form:

$$\mathcal{R}_u = \frac{1}{2}\sum_{k=1}^{d}\|u_k^* - Su_k\|_{C_{u_k}}^2$$

where S is the projection from model space to data space, k is an index indicating the physical direction of velocity which is being regularised, d is the number of physical dimensions in which reconstruction is to occur, and $C_{u_k}$ is an appropriate covariance operator for generating a norm in a covariance-weighted $L^2$ space (denoted $\|\ldots\|_C$ for a covariance operator C). The effect of the covariance operator is to introduce Gaussian noise into this penalty term.

Similarly, the $\mathcal{E}'$ error term helps to ensure consistency in between the k-space sampling and the modelled data, and has the form:

$$\mathcal{E}' = \frac{1}{2n\sigma^2}\sum_{j=1}^{4d}\|s_j - \mathcal{PF}(\rho_j e^{i\varphi_j})\|_{\ell^2(\mathbb{C}^n)}^2$$

where n is the number of samples (and is less than the dimension of frequency space, m in which samples are taken, which defines the "sparse sampling" condition, in other words n<<m), j is an index representing each data set, d is the number of physical dimensions in which reconstruction is to occur, $$\frac{1}{2n\sigma}\|\ldots\|_{\ell^2(\mathbb{C}^n)}$$

represents a Euclidean norm in the space of complex numbers, $\mathbb{C}$, representing a multivariate normal distribution, and in which $\sigma$ is the variance of that distribution, $\mathcal{P}$ is a sparse sampling operator mapping reconstructed data back to the sparse raw data space, $\mathcal{F}$ is the Fourier transform operator, $\rho_j$ is the reconstructed magnitude of the $j^{th}$ data set, e is Euler's constant, $i=\sqrt{-1}$ and $\varphi_j$ is the reconstructed phase of the $j^{th}$ data set.

Finally, the $\mathcal{S}$ regularisation term is a function of two level segmentation constants $\alpha_j$, $\beta_j$ for the Chan-Vese algorithm, corresponding to a given magnitude image, $\rho_j$, in other words $$\mathcal{S} = \mathcal{S}(\alpha_j, \beta_j, \rho_j).$$

In the above, $u_k^*$ is the measured velocity in direction, k, given from the phase information from each of 12 scans (in general, for 3D information), as follows:

$$u_1^* = c_1(\varphi_1 - \varphi_2 - \varphi_3 + \varphi_4)$$
$$u_2^* = c_2(\varphi_5 - \varphi_6 - \varphi_7 + \varphi_8)$$
$$u_3^* = c_3(\varphi_9 - \varphi_{10} - \varphi_{11} + \varphi_{12})$$

for known constants $c_j$. Clearly, where only 1 or 2 dimensions are required, only the first or second lines need be considered and only 4 or 8 scans are required.

The two additional terms $\mathscr{E}'$ and $\mathscr{S}$ introduce 4×4 additional unknown parameters to solve for each physical dimension being imaged: $\alpha_j, \beta_j, \rho_j, \sigma_j$ for each of four scans (j) per dimension.

In further examples, prior information from the nuclear spin density (magnitude signal) is incorporated into the procedure to derive an improved boundary shape/location. To exploit information about $\partial\Omega$ from the nuclear spin density images an energy-based segmentation functional $\mathscr{S}$, is used, which assumes that the image consists of two regions with approximately uniform magnitudes. The functional is given by:

$$\mathscr{S}(\rho, \phi_\pm, \alpha, \beta) \equiv$$
$$\frac{1}{8d}\sum_{j=1}^{4d}\frac{1}{\sigma_{\rho_j}^2}\left(\|(\rho_j - \alpha)\mathscr{SH}(\phi_\pm)\|_{L^2(I_\omega)}^2 + \|(\rho_j - \beta)(\mathscr{SH}(\phi_\pm) - 1)\|_{L^2(I_\omega)}^2\right)$$

where the mean value of the average magnitude inside $\Omega$ is $\alpha \in \mathbb{R}$ and outside $\Omega$ is $\beta \in \mathbb{R}$. In addition, $\sigma_{\rho_j}^2$ is the standard deviation of noise in the magnitude image, and $\mathscr{H}$ denotes the (modified) Heaviside function such that $\mathscr{H}(t)=1$ if $t<0$ and is equal to 0 otherwise. Taking into account the prior contribution, the combined functional is given by:

$$\mathscr{S}_\rho(\rho, \phi_\pm, \alpha, \beta) \equiv \mathscr{S} + \frac{1}{2}\sum_{j=1}^{4d}\|\rho_j - \bar{\rho}\|_{\mathcal{E}_{\rho_j}}^2$$

In which $\mathcal{E}_{\rho_j} = \sigma_{\rho_j}^2(C * \cdot)$.

Therefore, to reduce signal acquisition time further, we can obtain more accurate spin density (magnitude) images separately (without encoding velocity) and use them as priors for an $\partial\Omega(\phi_\pm)$. Similarly, we can obtain d−1 dimensional scans for the inlet velocity boundary condition, and use them as priors for $\bar{g}_i$. Conventional MRI or PC-MRI cannot measure $g_o$ and v, but v is usually known with high certainty compared to the other parameters.

An algorithm to capture the general methods set out herein can be written as follows:

Input: Sparse MRV signals, s, initial guesses for the unknowns (($\rho_0)_j$, ($\varphi_0)_j$, $\Omega_0$; $x_0$), regularization parameters controlling the form and weighting of the penalty terms.
begin
k←0
$u_k^*$←measured velocity from $\varphi_0$
($\phi_\pm)_k$←signed distance field from $p_0$
$(u,p)_k$←Navier-Stokes problem for $(\phi_\pm, x)_k$
while convergence criterion is not met do:

```
begin
k ← 0
u*_x - measured velocity from φ0
(Φ±)_k ← signed distance field from po
(u, p)_k ← Navier-Stokes problem for (Φ±, x)_k
while convergence criterion is not met do:

(v, q) ← adjoint Navier-Stokes problem with u_k and u*_k (equation 2.21)
  D̂_(.)𝒥 ← Steepest ascent directions (equations 2.31-2.33 and 2.44)
  s, τ ← search directions and step-size (equation 2.46)
  (φ±, x)_{k+1} ← perturb φ± and model parameters, x (equations 2.39 and 2.34)
  (u, p)_{k+1} ← linearised Navier-Stokes problem for (φ±, x)_{k+1} (equation 2.47)
  (ρ_{k+1}, φ_{k+1}) ← phase and magnitude reconstruction given u_k and (φ±)_k
  u_{k+1} update measured velocity field
  k* ← k + 1

(u °, p°) ← (u, p)_k
(Ω°, x°) ← (Φ±, x)_k
Output: reconstruction (u°, p°) and inferred model parameters (Ω°, x°).
```

Output: reconstruction ($u^\circ, p^\circ$) and inferred model parameters ($\Omega^\circ, x^\circ$).

Example 4: Reconstruction of MRV Data which is Sparsely Sampled in k-Space

Figure 12:
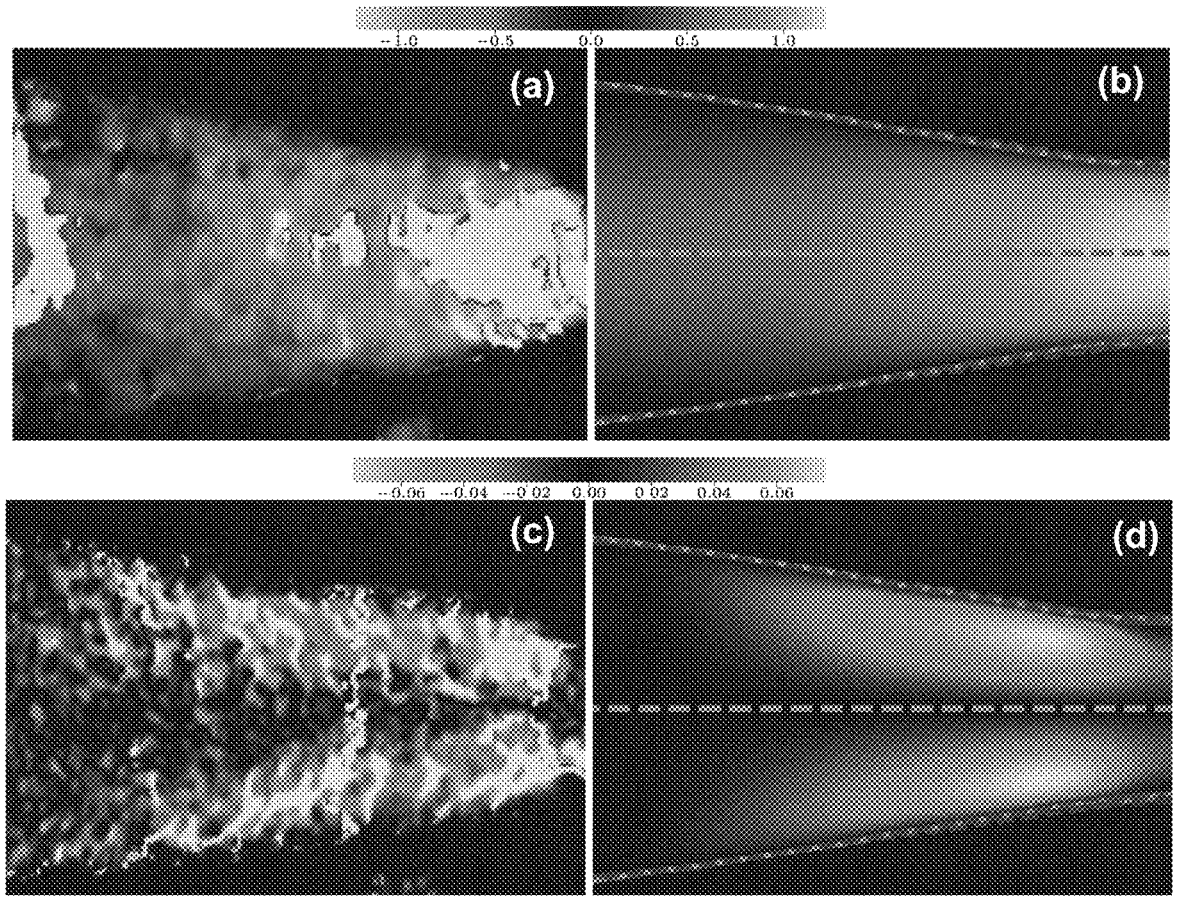
FIGS. 12a to 12d compares the zero-filling and reconstruction methods using real MRV data, similar to that presented in FIGS. 8a to 8j.

FIG. 12 shows an example reconstruction for a sparsely-sampled MRV signal for the flow through a converging nozzle (as above) using the above method. In FIG. 2, axisymmetric flow is from left to right). Here the sparse sampling results in the number of samples, n, being equal to 0.1 of the dimension of k-space, m, i.e. n=m/10. In other words, 90% of the information is missing from the k-space input.

In line with the above images (see e.g. FIG. 8 for a comparison of the same experiment derived from fully sampled k-space data), the axisymmetric flow need only be shown in 2D, i.e. axial, z, and radial, r, directions. FIGS. 12a and 12c show respectively the axial and radial reconstructions where zero-filling of the k-space data has been implemented. Here very clear artefacts and velocity aliasing may be seen due to phase wrapping. These manifest in each Figure as large areas of uniform apparent velocity, typically at the extrema of the velocity scale.

By contrast, the application of the full reconstruction method set out above results in FIGS. 12b and 12d, showing respectively the axial and radial reconstructions under the extension of the method to sparse k-space signals. A clear improvement is seen, in that not only are the artefacts and aliasing removed, but it is apparent that the spare k-space information has not resulted in the determination of the boundary location changing too much, nor in velocity fields differing greatly from their fully sampled counterparts. The ground truth and inferred (plus confidence interval) boundary locations lie largely on top of one another towards the left end of the images, and deviate slightly towards the right hand end.

This illustrates the power in using a robust physical and statistical model to infer the parameters from noisy and incomplete input data, since non-physical features of the velocity images are removed, providing noiseless velocity fields that satisfy the fluid flow (Navier-Stokes) equations and the no-slip condition on the boundary (walls).

Figure 13:
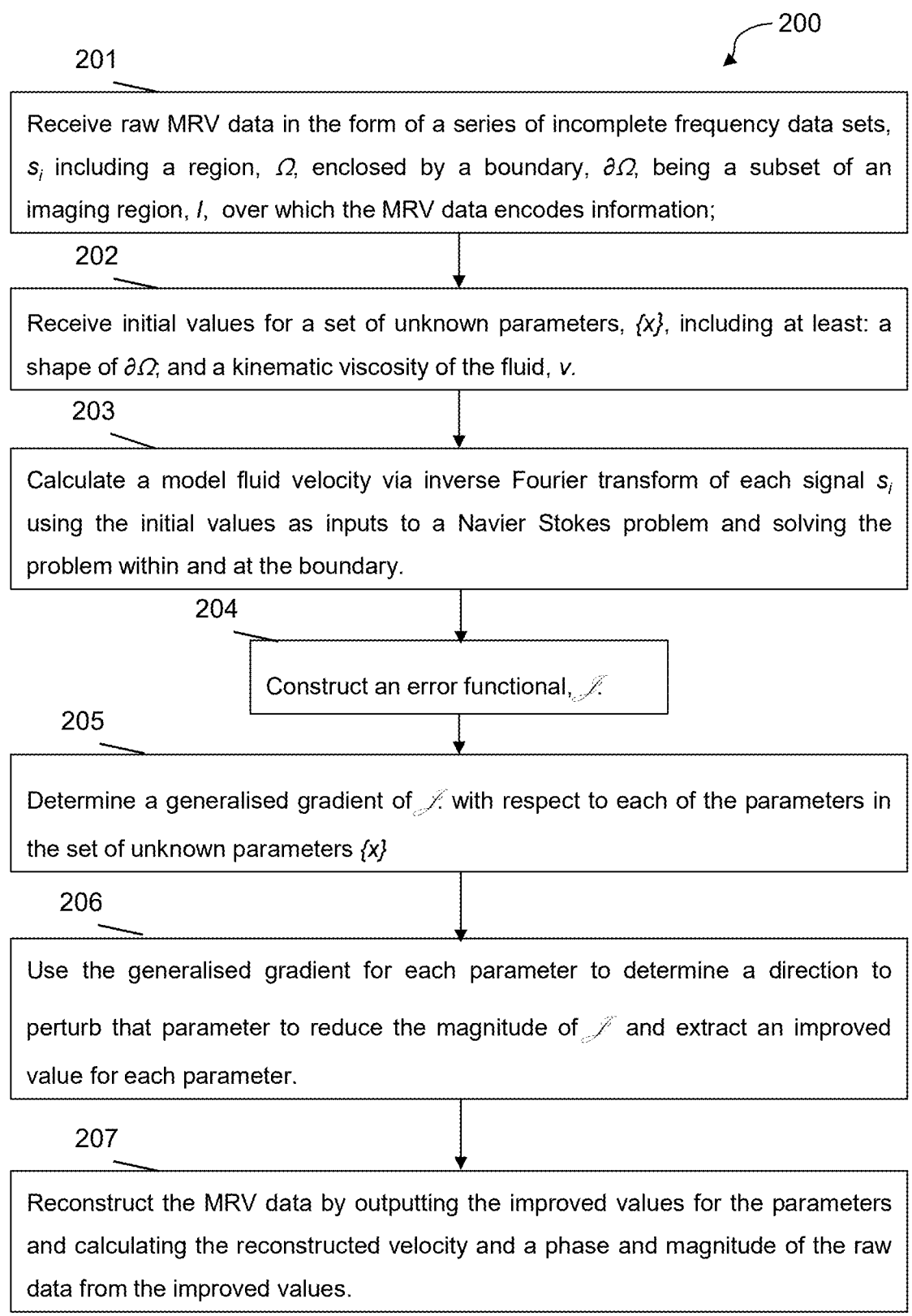
FIG. 13 is a flow chart describing the general operational steps of the method when the data are sparse in k-space

In summary, the procedure described above may be thought of as a series of process steps, as captured in the flow chart 200 depicted in FIG. 13. The process of reconstruction of magnetic resonance velocimetry starts at step 201, in which raw MRV data are received in the form of a series of incomplete frequency space data sets, $s_j$, encoding information relating to a fluid velocity field, $u^*$, within a subset of the MRV data forming a region, $\Omega$, enclosed by a boundary, $\partial\Omega$. As above, the boundary includes at least a physical boundary portion, $\Gamma$, and optionally further includes an inlet portion, $\Gamma_i$, and/or an outlet portion, $\Gamma_o$. The region $\Omega$ is a subset of an imaging region, I, over which the MRV data encodes information.

At step 202, initial values for a set of unknown parameters, $\{x\}$, are received, which include at least: a shape of the boundary, $\partial\Omega$, within which the fluid is located and a kinematic viscosity of the fluid, v. Optionally an inlet boundary condition for the fluid, $g_i$ is also supplied, where an inlet portion exists, and/or an outlet boundary condition for the fluid, $g_o$ where an outlet portion exists may be supplied. Initial values for the density and phase of the MRV data and for the two parameters for the two-level Chan-Vese segmentation algorithm may also be supplied or extracted from the MRV data, for use in the procedure at this stage.

At step 203, a model fluid velocity field, $u^o$, is calculated using the initial values as inputs to a Navier-Stokes problem, which is then solved for the velocity field within and at the boundary and calculating the measured velocity field, $u^*$, by performing an inverse Fourier transform on each $s_j$, $\mathcal{F}^{-1} s$ and deriving $u^*$ from the arguments of $\mathcal{F}^{-1} s_j$;

At step 204, an error functional, $\mathcal{J}$, is constructed, of the form:

$$\mathcal{J} = \mathcal{E}^I + \mathcal{P} + \mathcal{F}_u + \mathcal{M} + \mathcal{S}$$

in which $\mathcal{E}^I$ is a penalty term which penalises deviations in $u^o$ from the received MRV data; $\mathcal{P}$ h is a penalty term which penalises outcomes for in $u^o$ which arise from statistically unlikely values for the parameters in the set of unknown parameters, $\{x\}$, $\mathcal{M}$ is a penalty term which penalises deviations in $u^o$ from the Navier Stokes problem, $\mathcal{S}$ is a segmentation term for partitioning the raw data and in which $\mathcal{F}_u$ is a penalty term which penalises deviations in $u^o$ from the calculated measured velocity field $u^*$;

$\mathcal{F}_u$ may have the form:

$$\mathcal{F}_u = \frac{1}{2}\sum_{k=1}^{d} \|u_k^* - Su_k\|^2_{C_{u_k}}$$

where S is the projection from model space to data space, k is an index indicating the physical direction of velocity which is being regularised, d is the number of physical dimensions in which reconstruction is to occur, and $C_{u_k}$ is an appropriate covariance operator for generating a norm in a covariance-weighted $L^2$ space (denoted $\| \ldots \|_C$ for a covariance operator C). The effect of the covariance operator is to introduce Gaussian noise into this penalty term.

Similarly, the $\mathcal{E}^I$ penalty term may have the form:

$$\mathcal{E}^I = \frac{1}{2n\sigma^2}\sum_{j=1}^{4d} \|s_j - \mathcal{P}\mathcal{F}(\rho_j e^{i\varphi_j})\|^2_{l^2(\mathbb{C}^n)}$$

where n is the number of samples (and is less than the dimension of frequency space in which samples are taken, which defines the "sparse sampling" condition) j is an index representing each data set, d is the number of physical dimensions in which reconstruction is to occur, $$\frac{1}{2n\sigma}\| \cdots \|_{l^2(\mathbb{C}^n)}$$

represents a Euclidean norm in the space of complex numbers representing a multivariate normal distribution, and in which $\sigma$ is the variance of that distribution, $\mathcal{P}$ is a sparse sampling operator mapping reconstructed data back to the sparse raw data space, $\mathcal{F}$ is the Fourier transform operator, $\rho_j$ is the reconstructed magnitude of the $j^{th}$ data set, e is Euler's constant, $i=\sqrt{-1}$ and $\varphi_j$ is the reconstructed phase of the $j^{th}$ data set. Step 205 includes determining a generalised gradient of $\mathcal{J}$ with respect to each of the unknown parameters in the set $\{x\}$.

At step 206, for each of the unknown parameters in the set $\{x\}$, using the generalised gradient for that parameter, evaluated at the initial value of all of the parameters, a direction in which perturbing each parameter reduces the magnitude of $\mathcal{J}$ is determined. From this, improved values for each of the unknown parameters in the set $\{x\}$ can be determined.

Finally at step 207, the MRV data are reconstructed by outputting the improved values from step 206 and calculating the reconstructed velocity, u, across at least the region $\Omega$ and reconstructing a phase and magnitude of the received raw data from the reconstructed velocity field, u.

Figure 14:
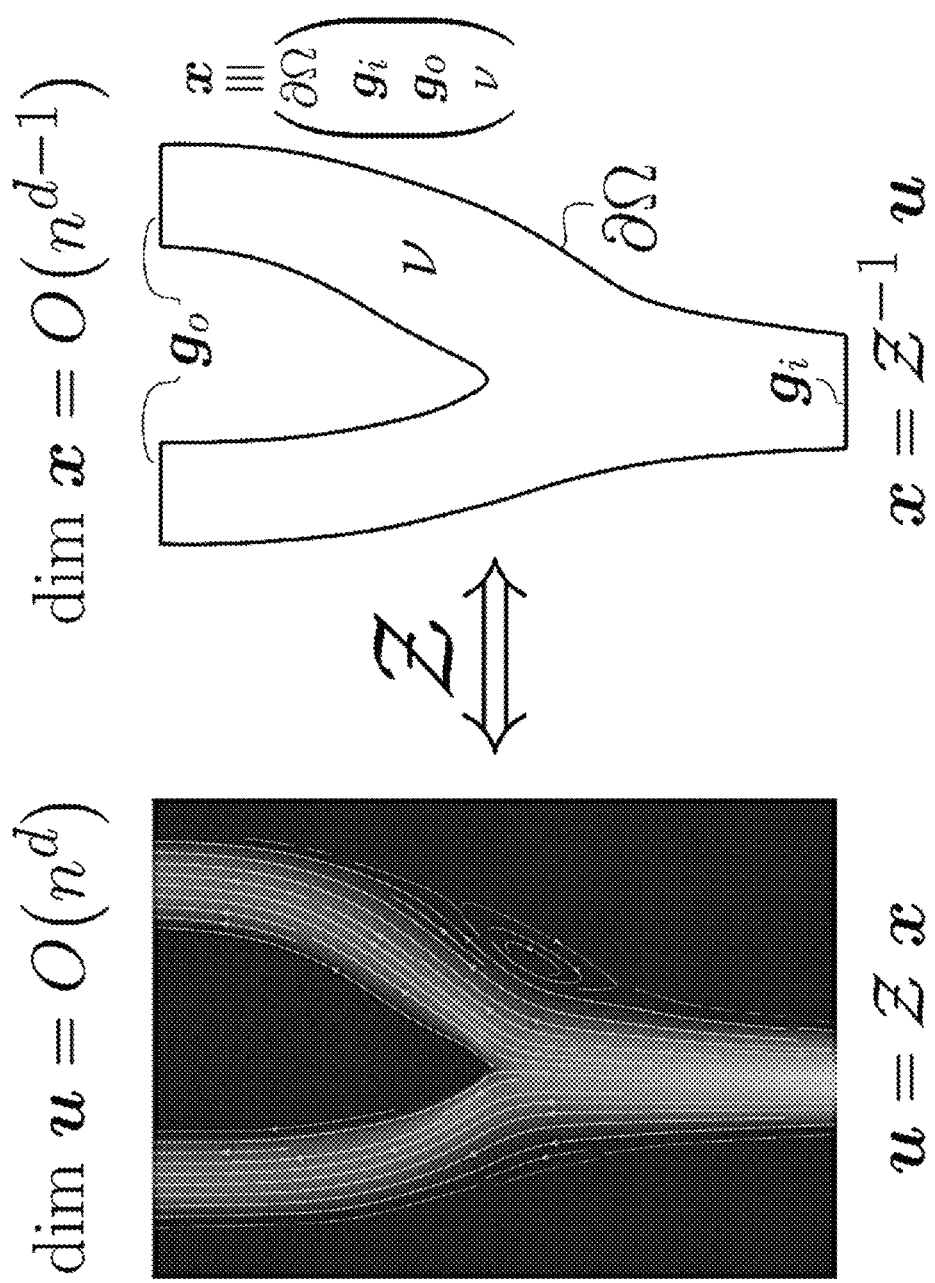
FIG. 14 represents a conceptualisation of a compression algorithm in which a d-dimensional flow field is encoded in a (d−1)-dimensional form

The sampling density can be further decreased (for fixed reconstruction error) if the a priori information on $\{x\}$ becomes more accurate. The present application also discloses the finding that when the Navier-Stokes problem is an accurate and descriptive model, only the boundary $\partial\Omega$, the boundary conditions $g_i$, $g_o$, and the kinematic viscosity are needed in order to find the velocity field. The interplay between the full flow field and these parameters is illustrated in FIG. 14. It is clear in FIG. 14 for example that the full flow field across a 2D region (left part of the Figure) is described by an underlying 1D structure encoded in the parameters $\{x\}$. A transform Z is used to convert between the two representations, and it can be seen from the methods described above that Z corresponds to solving a Navier-Stokes problem (to decompress $\{x\}$ into a full flow field) or to solving an inverse Navier-Stokes problem (to compress the measured or modelled flow field into the parameters $\{x\}$). That is to say that Images of $n^d$ voxels depicting the d velocity components can be compressed/decompressed by solving an inverse/forward Navier-Stokes problem.

This approach to physics-informed compressed sensing extends the standard notion of sparsity used in conventional compressed sensing methods to a more general notion of a structure, which is dictated by the N-S problem. Instead of enforcing sparsity during the nonlinear optimization process, a sparse (hidden) structure of the velocity field is recovered by enforcing the Navier-Stokes problem as a constraint. This is what FIG. 1 illustrates, showing that the velocity exhibits an underlying low-dimensional structure (specifically a (d−1) dimensional structure encodes a d-dimensional flow field) that is encoded in the unknown parameters $\{x\}$. Based on this, a velocity field can be compressed/decompressed by solving an inverse/forward Navier-Stokes problem. No other work comes close to this. Typical prior methods, for example, take a conventional sparsity-promoting and physics-informed velocity regularization method (see e.g. I. Bright, G. Lin, and J. N. Kutz, "Compressive sensing based machine learning strategy for characterizing the flow around a cylinder with limited pressure measurements," *Physics of Fluids*, vol. 25, no. 12, 2013.). These approaches rely on a pre-existing database (library) containing the dominant eigenmodes of a Navier-Stokes problem that is defined in a pre-set geometry, with pre-set inlet boundary condition, and so necessarily cannot adapt to unknown geometries in the manner which the present application does.

Figure 15:
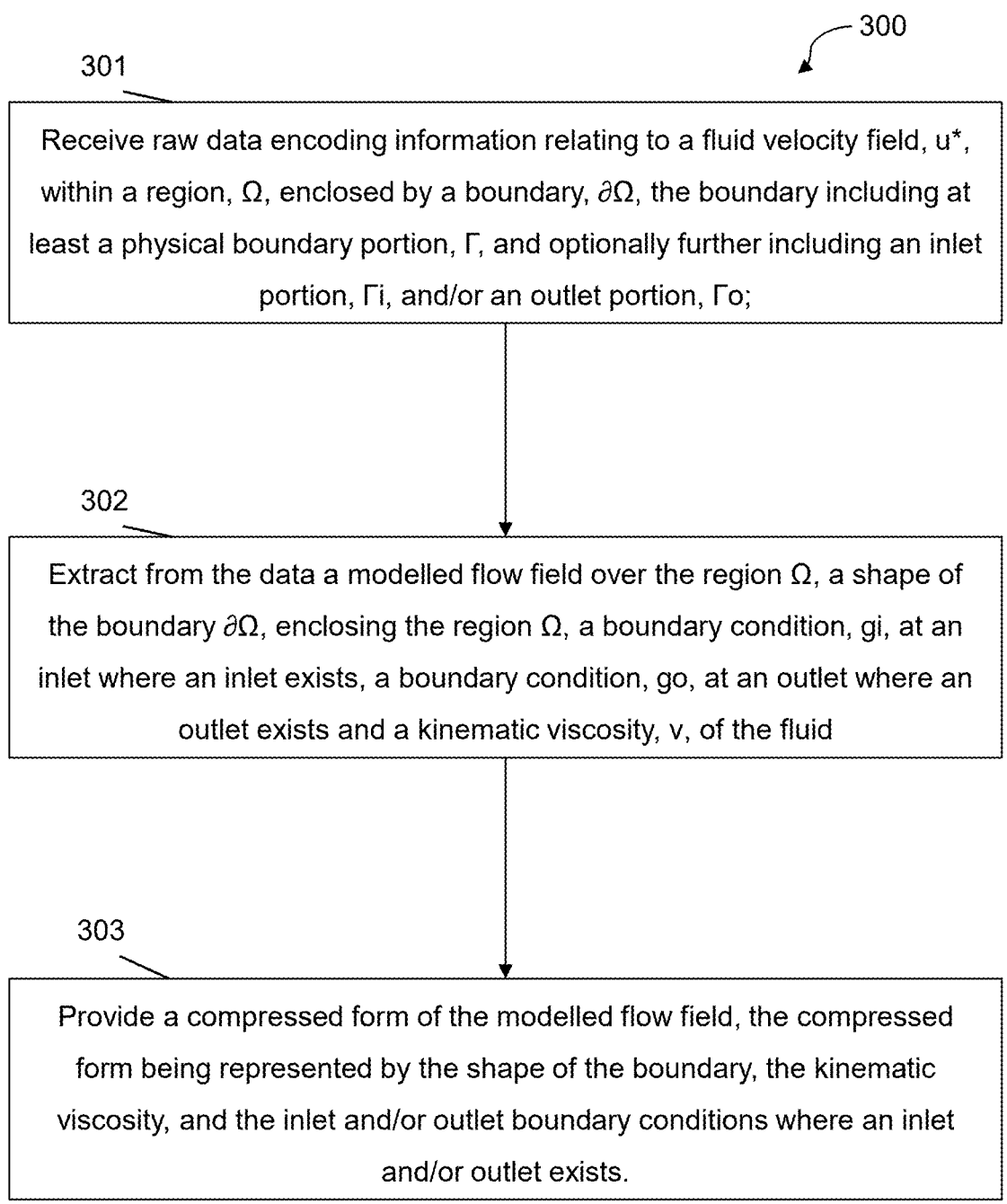
FIG. 15 is a flow chart illustrating a compression algorithm
Figure 16:
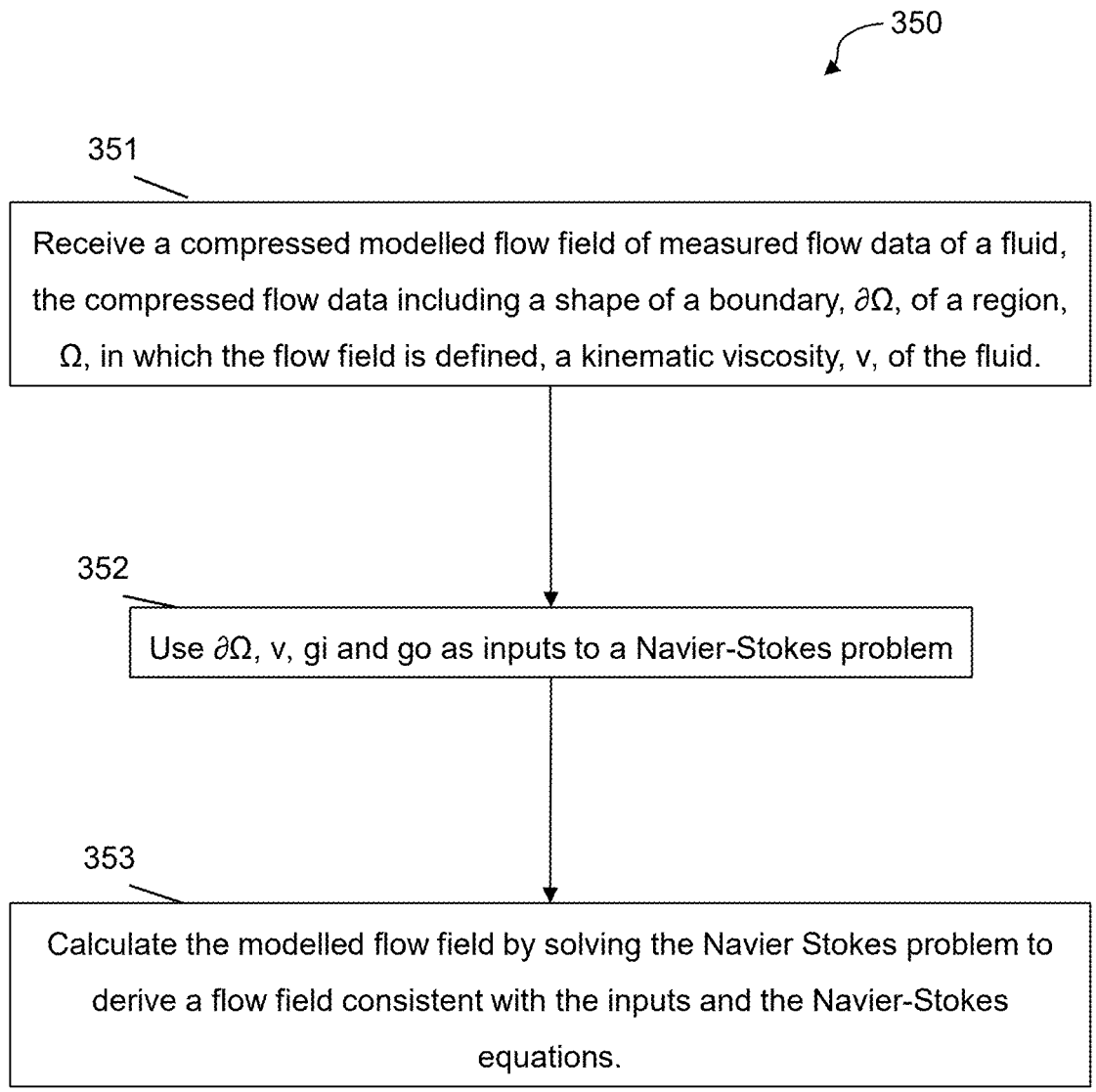
FIG. 16 is a flow chart illustrating a decompression algorithm.

This approach leads to the compression and decompression algorithms described herein and illustrated generally in FIGS. 15 and 16 respectively. The compression algorithm 300 of FIG. 15 begins at step 301 with a receiving step in which raw data encoding the information relating to a fluid velocity field is received. As noted elsewhere, this may be the MRV data inputs discussed elsewhere herein, but in fact a core finding of the present work is that any suitably high-definition flow field can be compressed in the manner described herein. The raw data which are received in this step encode information in an imaging region I relating to a fluid velocity field, u*, within a subset of the imaging region I forming a region, $\Omega$, enclosed by a boundary, $\partial\Omega$, the boundary including at least a physical boundary portion, $\Gamma$, and optionally further including an inlet portion, $\Gamma_i$, and/or an outlet portion, $\Gamma_o$.

At step 302, the method proceeds to extract from the data a modelled flow field which includes the set of parameters $\{x\}$, including the shape of the boundary, $\partial\Omega$, enclosing the region $\Omega$, the kinematic viscosity, v, of the fluid and optionally the inlet and outlet boundary conditions, $g_i$, $g_o$, respectively where an inlet and or outlet is present in the system being modelled.

The compressed form of the modelled flow field is then provided in step 303 in which the compressed form is represented by the shape of the boundary, the kinematic viscosity, and the inlet and/or outlet boundary conditions where an inlet and/or outlet exists respectively. This form of the modelled flow field requires much less storage capacity and/or transmission bandwidth to store or transmit. In particular the full flow field may be discarded once the compressed form has been provided, and the compressed version may be locally stored for later use, or transmitted elsewhere.

Turning now to FIG. 16, which shows a decompression method 350. This begins at step 351 in which the compressed flow data are received. As noted above, the compressed flow field data include the parameters $\{x\}$, which are a shape of a boundary, $\partial\Omega$, of a region, $\Omega$, in which the flow field is defined, a kinematic viscosity, v, of the fluid, and an inlet boundary condition, $g_i$, and/or an outlet boundary condition, $g_o$, where an inlet and/or outlet exists.

At step 352, the parameters $\{x\}$ are supplied as inputs to a Navier-Stokes problem. Finally at step 353, the Navier Stokes problem is solved, thereby calculating the modelled flow field consistent with the inputs (i.e. parameters $\{x\}$) and the Navier-Stokes equations.

Note that the decompression protocols in FIG. 16 may follow the compression protocol in FIG. 15, interleaved by at least one of a transmission and/or a storage step, such that the decompression is applied to the compressed form following the compression of the flow field, with the decompression occurring at a later time and/or a different location.

Another way to further decrease the sampling density is briefly discussed now. In the examples above, the phase space is only sparsely sampled. In order to provide a good test of the theory, fully sampled k-space signals are used to provide a baseline for comparison. Then the fully sampled signals are passed through a sparse sampling filter to restrict the received information and simulate the effect of an incomplete signal being received.

There is a choice in the design of the sparse sampling filter, and the results in applying each can be compared to one another. These results may then be used to design sparse sampling patterns which provide the best results for a given sampling density. For example, the inventors have tested two probabilistic sampling patterns in k-space, a 1D and 2D Gaussian distribution.

Using this approach it has been found that the 2D Gaussian distribution sampled at 15% coverage of the k-space region produces slightly better results than the 1D Gaussian distribution generated at 25% coverage. Note that the 2D case adequately covers the centre of k-space, while the 1D case leaves gaps. This can be corrected by fully-sampling the central region of k-space and then sparsely-sampling regions that are not as important. To identify the important regions, the algorithm set out herein can be used to back-propagate the errors from the velocity images to the k-space. In general, this approach can be used to identify important k-space regions and tailor the raw data acquisition to capture information in those regions, leaving the less important regions with only sparse k-space information.

Figure 17:
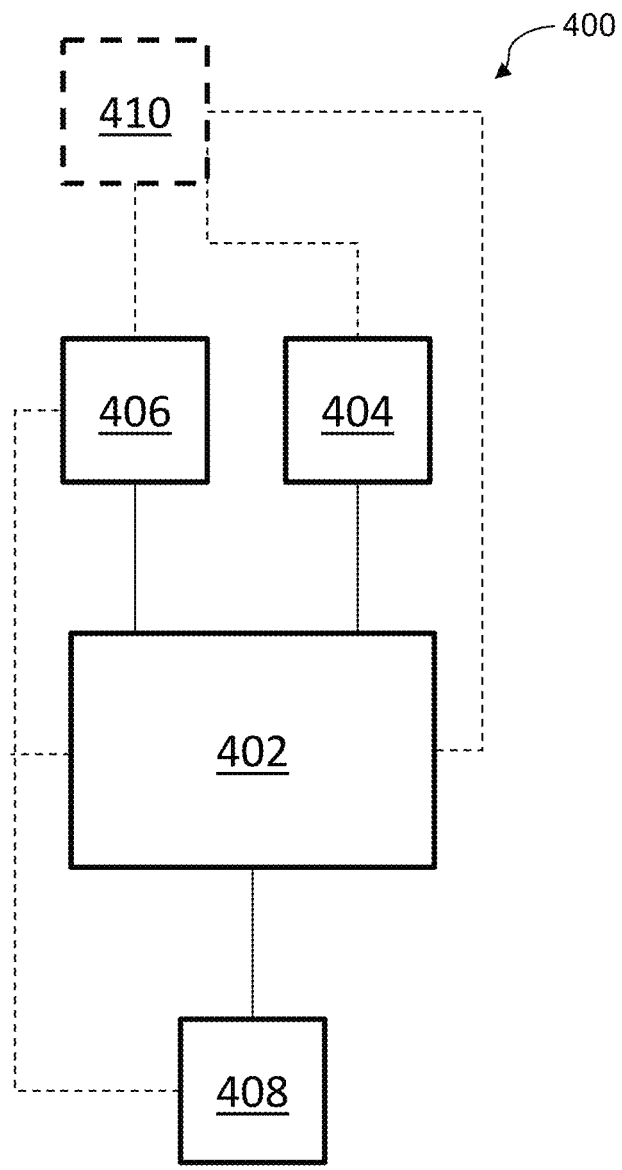
FIG. 17 is a schematic of a system on which the methods described above may be executed.

Any of the methods set out herein may be implemented on a computer. As shown in FIG. 17, an example system 400 for implementing the method includes a receiving module 406 for receiving data and, for example, for receiving parameter initial values and processing parameters controlling the application and weighting of the various optimisation routines. An input module 404 for receiving user input is also supplied, which can allow a user to adjust parameters and to control the operation of the system 400. Processor 402 is provided to perform the calculations. Although not shown, the processor has access to memory for storing input values, intermediate values, output values, MRV data, computer code comprising instructions for enacting the method, and so forth. An output module 408 is provided for delivering the data derived from the process set out above.

The processor 402 is provided for performing the method steps set out in detail above. The processor 402 may for example have software, firmware, application specific integrated circuits, etc. which contain instructions which, when run on the processor 402, cause the method steps to be executed. In some cases, the software may be provided separately on a physical or other tangible medium, for running on a general purpose computer, to provide the method set out above, and derive the advantage of fast processing of MRV data to achieve high quality, low noise MRV data.

Dashed lines indicate optional features. In this case, the output module 408 may feed into either the receiving module 406 or the processor 402, in order to provide the iterative improvements to the model parameters discussed above.

Also optional is the presence of a magnetic resonance imaging (MRI) or magnetic resonance velocimetry (MRV) system 410. This MRI/MRV imaging system 410 may feed data directly into the processor 402, or indirectly into the process via input module 404 or receiving module 406. In any event, the MRV data is supplied to the process from the MRI/MRV imaging system 410 in either a raw (possibly incomplete) k-space format—see Example 4, or in the form of a raw (unprocessed) velocity field—see Example 3.

Note that although shown as separate modules, more than one of the modules may form part of a single entity capable of fulfilling multiple roles simultaneously. As a particular example of this, the MRI/MRV imaging system may include the processor 402, input module 404, receiving module 406, and/or output module 408. That is to say the invention extends to an MRI/MRV imaging system which includes the processing capabilities discussed above to reconstruct the raw image data and thereby provide a single system capable of outputting high quality, low-noise MRV image data in accordance with the present disclosure.

The invention claimed is:

1. A computer implemented method for reconstruction of magnetic resonance velocimetry, MRV, data, the method comprising the steps of:
   (a) receiving MRV data encoding information relating to a fluid velocity field, u*, within a subset of the MRV data forming a region, $\Omega$, enclosed by a boundary, $\partial\Omega$, the boundary including at least a physical boundary portion, $\Gamma$, and optionally further including an inlet portion, $\Gamma_i$, and/or an outlet portion, $\Gamma_o$; and
   wherein the region $\Omega$ is a subset of an imaging region, I, over which the MRV data encodes information;
   (b) receiving initial values for a set of unknown parameters, {x}, including at least:
   a shape of the boundary, $\partial\Omega$, within which the fluid is located;
   a kinematic viscosity of the fluid, v; and optionally
   an inlet boundary condition for the fluid, $g_i$ where an inlet portion exists; and/or
   an outlet boundary condition for the fluid, $g_o$ where an outlet portion exists;
   (c) calculating a model fluid velocity field, $u^o$, using the initial values as inputs to a Navier-Stokes problem, and solving for the velocity field within and at the boundary;
   (d) constructing an error functional, J, of the form:

$$J = E + R + M$$

in which E is a penalty term which penalises deviations in $u^o$ from the received MRV data; R is a penalty term which penalises outcomes for in $u^o$ which arise from statistically unlikely values for the parameters in the set of unknown parameters, {x}, and M is a penalty term which penalises deviations in $u^o$ from the Navier Stokes problem;
   (e) determining a generalised gradient of J with respect to each of the unknown parameters in the set {x};
   (f) for each of the unknown parameters in the set {x}, using the generalised gradient for that parameter, evaluated at the initial value of all of the parameters, to determine a direction in which perturbing each parameter reduces the magnitude of J and thereby determining improved values for each of the unknown parameters in the set {x}; and
   (g) reconstructing the MRV data by outputting the improved values from step (f) and calculating the reconstructed velocity, u, across at least the region $\Omega$.

2. The method of claim 1, wherein the Navier-Stokes problem constrains u such that u satisfies:

$$u \cdot \nabla u - v\Delta u + \nabla p = 0 \text{ in } \Omega \quad \text{(i)}$$

$$\nabla \cdot u = 0 \text{ in } \Omega \quad \text{(ii)}$$

-continued $$u = 0 \text{ on } \Gamma \quad \text{(iii)}$$

$$u = g_i \text{ on } \Gamma_i \text{ where an inlet exists} \quad \text{(iv)}$$

$$-v\partial_n u + pn = g_o \text{ on } \Gamma_o \text{ where an outlet exists} \quad \text{(v)}$$

wherein p is the reduced pressure, $p_0/\rho$, $\rho$ is a density of the fluid, $p_0$ is the pressure, n is a unit normal vector on $\partial\Omega$, and on $\partial_n \equiv n\cdot\nabla$ is a normal derivative on $\partial\Omega$.

3. The method of claim 1, wherein the M penalty term includes Nitsche penalty terms for weakly imposing a Dirichlet boundary condition on at least a portion of the boundary, $\partial\Omega = \Gamma \cup \Gamma_i \cup \Gamma_o$.

4. The method of claim 1, wherein the error functional, J, is minimised using Euler-Lagrange equations, constrained to spaces of admissible perturbations in u and p, denoted u' and p' respectively, where p is the reduced pressure, $p_0/\rho$, where $\rho$ is a density of the fluid and $p_0$ is the pressure.

5. The method of claim 1, wherein the calculation of the R penalty term includes assuming that some or all of the unknown parameters follows a Gaussian distribution of likelihood and improbable realisations are penalised by forming R as a linear sum of an error functional term for each unknown parameter in the set {x} which is assumed to have a Gaussian distribution of the form:

$$R(x) = \frac{1}{2}\|x - \bar{x}\|_C^2$$

in which x represents any of the unknown parameters which is assumed to have a Gaussian distribution, $\bar{x}$ represents a prior value for that unknown parameter, and C is an appropriate covariance operator for that unknown parameter.

6. The method of claim 1, in which the shape of the boundary is perturbed under a speed field $V = \zeta n$, in which $\zeta$ represents the magnitude of the speed at which points on the boundary are perturbed and n is the unit vector normal to each point on the boundary.

7. The method of claim 1. wherein the reconstructed velocity, u, is updated by solving an O seen problem for the improved parameters:

$$u_k \cdot \nabla u_{k+1} + v\Delta u_{k+1} + \nabla p_{k+1} = 0$$

$$\nabla \cdot u' = 0$$

with boundary conditions:

$$u = 0 \text{ on } \Gamma$$

$$u = g_i \text{ on } \Gamma_i \text{ where an inlet exists}$$

$$-v\partial_n u + pn = g_o \text{ on } \Gamma_o \text{ where an outlet exists}$$

in which k is an index to distinguish input values at k and improved values at k+1, p is the reduced pressure, $p_0/\rho$, $\rho$ is a density of the fluid, $p_0$ is the pressure, n is a unit normal vector on $\partial\Omega$, and on $\partial_n \equiv n\cdot\nabla$ Vis a normal derivative on $\partial\Omega$.

8. The method of claim 1, further comprising outputting values of p, the pressure field, and the improved values for the unknown parameters in the set {x} as part of step (g).

9. The method of claim 1, wherein the received MRV data is raw data in the form of a series of incomplete frequency space data sets, $s_j$; wherein:

the method includes the step of calculating the measured velocity field, u*, by performing an inverse Fourier transform on each $s_j$, $F^{-1}s$ and deriving u* from the arguments of $F^{-1}s_j$;

the construction of the error functional modifies the E penalty term to:

$$E' = \frac{1}{2n\sigma^2} \Sigma_{j=1}^{4d} \|s_j - PF(\rho_j e^{i\varphi_j})\|_{\ell^2(\mathbb{C}^n)}^2$$

in which j is an index representing each data set, d is the number of physical dimensions in which reconstruction is to occur, $$\frac{1}{2n\sigma^2}\| \cdots \|_{\ell^2(\mathbb{C}^n)}$$

represents a Euclidean norm in the space of complex numbers representing a multivariate normal distribution, and in which σ is the variance of that distribution, P is a sparse sampling operator mapping reconstructed data back to the sparse raw data space, F is the Fourier transform operator, $\rho_j$ is the reconstructed magnitude of the $j^{th}$ data set, e is Euler's constant, $i=\sqrt{-1}$ and $\varphi_j$ is the reconstructed phase of the $j^{th}$ data set;

the error functional, J, has the form:

$$J = E' + R + R_u + M + S$$

in which S is a segmentation term for partitioning the raw data and in which the additional term $R_u$ has the form:

$$R_u = \frac{1}{2} \sum_{k=1}^{d} \|u_k^* - S'u_k\|_{C_{u_k}}^2$$

where S is the projection from model space to data space, k is an index indicating the physical direction of velocity which is being considered and wherein step (g) of the method further includes reconstructing a phase and magnitude of the received raw data from the reconstructed velocity field, u.

10. The method of claim 1, wherein a magnitude value of magnetic resonance imaging data is used as an input to provide an initial value for the shape of the boundary, ∂Ω.

11. The method of claim 1, further comprising a step of providing a compressed form of the modelled flow field, the compressed form being represented by the shape of the boundary, the kinematic viscosity, and the inlet and/or outlet boundary conditions where an inlet and/or outlet exists.

12. An apparatus for reconstruction of magnetic resonance velocimetry, MRV, data, the apparatus comprising:
a processor configured to perform the steps of claim 1.

13. A non-transient computer readable medium comprising instructions which cause a computer to enact the method steps of claim 1.

14. The method of claim 4, wherein the Euler-Lagrange equations are formed by considering the first variations of the M and E penalty terms with respect to {x}, u and p.

15. The method of claim 5, wherein:
the covariance operator for the boundary condition at the inlet, $C_{g_i}$, in cases where an inlet exists, is:

$$C_{g_i} = 2\sigma_{g_i}^2 \left(\frac{1}{\ell}I - \ell\tilde{\Delta}_i\right)^{-1}$$

in which $\sigma_{g_i}$ is the variance of $g_i$, $\ell$ is a characteristic length scale of an exponential covariance function, I is the identity matrix and $\tilde{\Delta}_i$ is the Laplacian operator extended to incorporate the boundary condition that $g_i=0$ on $\Gamma_i$, and/or wherein the covariance operator for the boundary condition at the outlet, $C_{g_o}$, in cases where an outlet exists, is:

$$C_{g_o} = 2\sigma_{g_o}^2 \left(\frac{1}{\ell}I - \ell\tilde{\Delta}_o\right)^{-1}$$

in which $\sigma_{g_o}$, is the variance of $g_o$, $\ell$ is a characteristic length scale of an exponential covariance function, I is the identity matrix and $\tilde{\Delta}_o$ is the Laplacian operator extended to incorporate the boundary condition that $\partial_n g_o=0$ on $\Gamma_o$.

16. The method of claim 6, wherein the perturbation of the shape of the boundary is used to derive a shape derivatives problem defined over the permissible perturbations of u and p, denoted u' and p', respectively, the shape derivatives problem having the form:

$$-u' \cdot \nabla u + u \cdot \nabla u' - \nu \Delta u' + \nabla p' = 0 \text{ in } \Omega \qquad \text{(x)}$$

$$\nabla (\cdot u)' = 0 \text{ in } \Omega \qquad \text{(xi)}$$

$$u' = -\partial_n u(V \cdot n) \text{ on } \Gamma \qquad \text{(xii)}$$

$$u' = 0 \text{ on } \Gamma_i \text{ where an inlet exists} \qquad \text{(xiii)}$$

$$-\nu \partial_n u' + p'n = 0 \text{ on } \Gamma_o \text{ where an outlet exists.} \qquad \text{(xiv)}$$

17. The method of claim 6, wherein the boundary is represented implicitly by signed distance functions, φ± defined across the imaging region, I, in which the boundary is represented by parts of φ± which are equal to zero, and the magnitude of φ± at a given point represents a shortest distance between that point and the boundary.

18. The method of claim 11, further comprising decompressing the compressed form by:
using ∂Ω, ν, $g_i$ and $g_o$ as inputs to a Navier-Stokes problem; and
calculating the modelled flow field by solving the Navier Stokes problem to derive a flow field consistent with the inputs and the Navier-Stokes equations.

19. The apparatus of claim 12 further comprising a magnetic resonance imaging system, arranged to provide Magnetic Resonance Velocimetry and/or Magnetic Resonance Imaging data.

20. The method of claim 14, wherein first variations of the M and E penalty terms provide an adjoint Navier-Stokes problem:

$$-u \cdot \left(\nabla v + (\nabla v)^\dagger\right) - \nu \Delta v + \nabla q = -D_u E \text{ in } \Omega \quad \text{(vi)}$$

$$\nabla \cdot v = 0 \text{ in } \Omega \quad \text{(vii)}$$

$$v = 0 \text{ on } \Gamma \text{ and } \Gamma_i \text{ where an inlet exists} \quad \text{(viii)}$$

$$(u \cdot n)v + (u \cdot v)n + \nu \partial_n v - qn = 0 \text{ on } \Gamma_o \text{ where an outlet exists;} \quad \text{(ix)}$$

in which v is an adjoint velocity and q an adjoint pressure, $(\nabla v)^\dagger$ represents the adjoint of $(\nabla v)$, and $D_u E$ is a generalised gradient of E with respect to u.

* * * * *